(12) United States Patent
Fiedler

(10) Patent No.: US 11,109,644 B2
(45) Date of Patent: Sep. 7, 2021

(54) FASTENER DEVICE HAVING A WINDING ELEMENT

(71) Applicant: Fidlock GmbH, Hannover (DE)

(72) Inventor: Joachim Fiedler, Hannover (DE)

(73) Assignee: Fidlock GmbH, Hannover (DE)

( * ) Notice: Subject to any disclaimer, the term of this patent is extended or adjusted under 35 U.S.C. 154(b) by 65 days.

(21) Appl. No.: 16/461,168

(22) PCT Filed: Feb. 28, 2018

(86) PCT No.: PCT/EP2018/054971
§ 371 (c)(1),
(2) Date: May 15, 2019

(87) PCT Pub. No.: WO2019/096447
PCT Pub. Date: May 23, 2019

(65) Prior Publication Data
US 2020/0268108 A1    Aug. 27, 2020

(30) Foreign Application Priority Data

Nov. 14, 2017   (DE) ..................... 10 2017 220 305.6
Jan. 23, 2018   (DE) ..................... 10 2018 201 021.8

(51) Int. Cl.
*A43C 11/16*    (2006.01)
*A45C 13/10*    (2006.01)
(Continued)

(52) U.S. Cl.
CPC ........ *A43C 11/165* (2013.01); *A45C 13/1069* (2013.01); *A43C 7/00* (2013.01);
(Continued)

(58) Field of Classification Search
CPC ....... A43C 11/008; A43C 11/14; A43C 11/16; A43C 11/165; A43C 7/00; A44D 2203/00;
(Continued)

(56) References Cited

U.S. PATENT DOCUMENTS 7,076,843 B2   7/2006   Sakabayashi
8,910,353 B2   12/2014  Polegato Moretti
(Continued)

FOREIGN PATENT DOCUMENTS

CN          1618363 A    5/2005
CN        102326922 A    1/2012
(Continued)

*Primary Examiner* — Robert Sandy
*Assistant Examiner* — David M Upchurch
(74) *Attorney, Agent, or Firm* — The Webb Law Firm

(57) ABSTRACT

A fastener device includes a first fastener part and a second fastener part which can be mounted on one another along a closing direction, are held against one another in a closed position, and are releasable from one another in order to open the fastener device. The second fastener part has an actuating element with a first engagement means and has a winding element which is arranged on the actuating element and which is rotatable in a winding direction in order to wind up a tension element and which has a second engagement means. The first and the second engagement means, in a release position, are not in engagement with one another, such that the winding element is rotatable relative to the actuating element, and can be placed in engagement with one another, such that, in an engagement position, the winding element is rotatable by means of the actuating element.

18 Claims, 47 Drawing Sheets

(51) Int. Cl.
*A43C 7/00* (2006.01)
*A43C 11/00* (2006.01)
*F16B 1/00* (2006.01)

(52) U.S. Cl.
CPC ........ *A43C 11/008* (2013.01); *A44D 2203/00* (2013.01); *F16B 2001/0035* (2013.01)

(58) Field of Classification Search
CPC . A45C 13/10; A45C 13/1069; A45C 13/1084; F16B 2001/0035; F16B 21/02
See application file for complete search history.

(56) References Cited

U.S. PATENT DOCUMENTS

| | | | |
|---|---|---|---|
| 9,072,341 | B2 | 7/2015 | Jungkind |
| 9,635,906 | B2 | 5/2017 | Midorikawa |
| 9,706,814 | B2 | 7/2017 | Converse et al. |
| 10,212,993 | B2 | 2/2019 | Fiedler et al. |
| 2003/0204938 | A1 | 11/2003 | Hammerslag |
| 2005/0098673 | A1 | 5/2005 | Huang |
| 2005/0247813 | A1* | 11/2005 | Kovacevich ............ F16G 11/12 242/388.6 |
| 2009/0172928 | A1 | 7/2009 | Messmer et al. |
| 2010/0283269 | A1 | 11/2010 | Fiedler |
| 2010/0287741 | A1 | 11/2010 | Fiedler |
| 2010/0308605 | A1 | 12/2010 | Fiedler |
| 2011/0030174 | A1 | 2/2011 | Fiedler |
| 2011/0131770 | A1 | 6/2011 | Fiedler |
| 2011/0138583 | A1 | 6/2011 | Fiedler |
| 2011/0167543 | A1* | 7/2011 | Kovacevich ............ F41H 1/02 2/417 |
| 2015/0007422 | A1* | 1/2015 | Cavanagh ............ A43C 11/165 24/68 SK |
| 2015/0014463 | A1* | 1/2015 | Converse ............. A43C 11/165 242/396.1 |
| 2015/0076272 | A1* | 3/2015 | Trudel .................... F16G 11/12 242/381.4 |
| 2015/0135486 | A1 | 5/2015 | Fiedler et al. |
| 2016/0354223 | A1 | 12/2016 | Burns et al. |
| 2017/0303643 | A1* | 10/2017 | Converse ........... A43C 11/1406 |

FOREIGN PATENT DOCUMENTS

| | | |
|---|---|---|
| CN | 103476288 A | 12/2013 |
| CN | 103899611 A | 7/2014 |
| CN | 203676303 U | 7/2014 |
| CN | 104394730 A | 3/2015 |
| EP | 0693260 A2 | 1/1996 |
| FR | 2500878 A1 | 9/1982 |
| GB | 2480622 A | 11/2011 |
| JP | 2015293 A | 1/2015 |
| WO | 2007016983 A1 | 2/2007 |
| WO | 2008006354 A2 | 1/2008 |
| WO | 2008006356 A2 | 1/2008 |
| WO | 2008006357 A2 | 1/2008 |
| WO | 2009010049 A2 | 1/2009 |
| WO | 2009092368 A2 | 7/2009 |
| WO | 2009127196 A2 | 10/2009 |
| WO | 2010006594 A2 | 1/2010 |
| WO | 2014090926 A1 | 6/2014 |
| WO | 2014180512 A1 | 11/2014 |
| WO | 2015006616 A1 | 1/2015 |

* cited by examiner

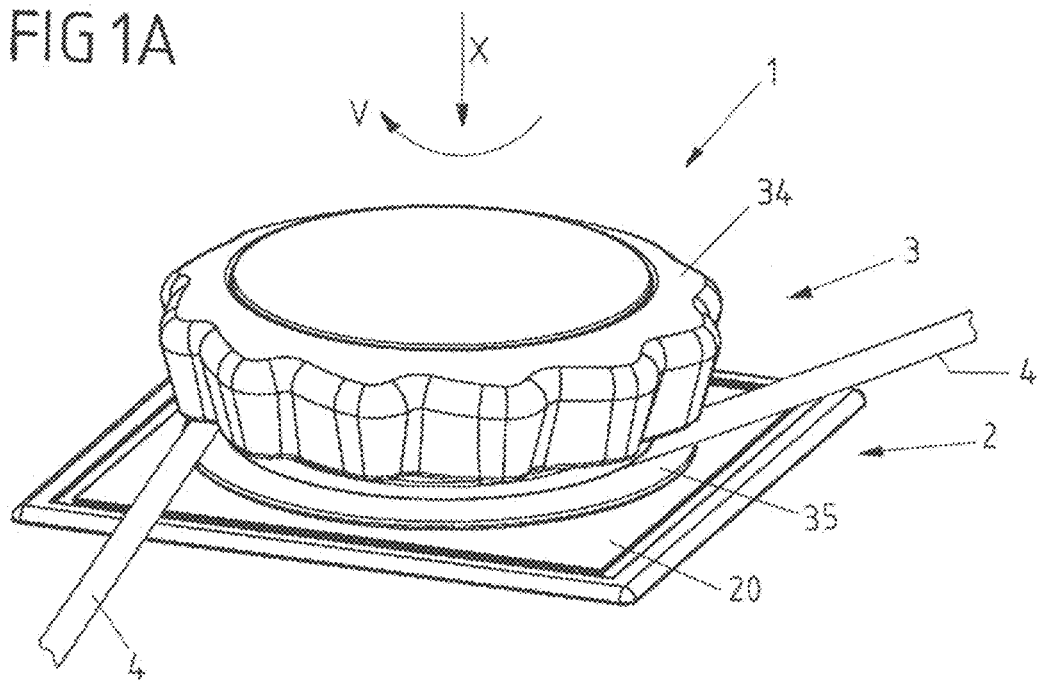
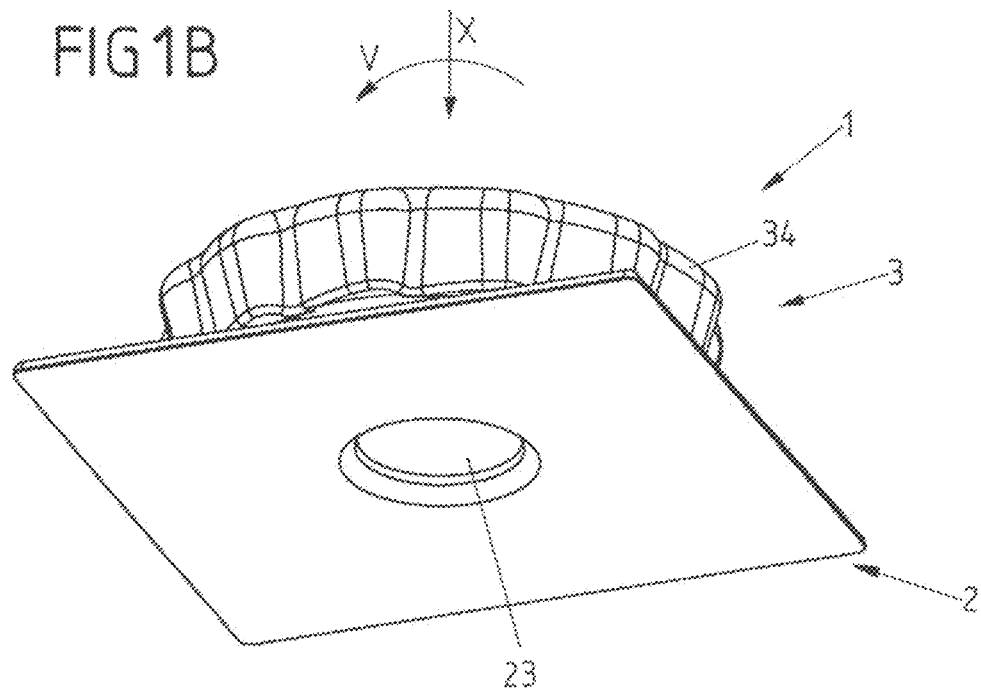

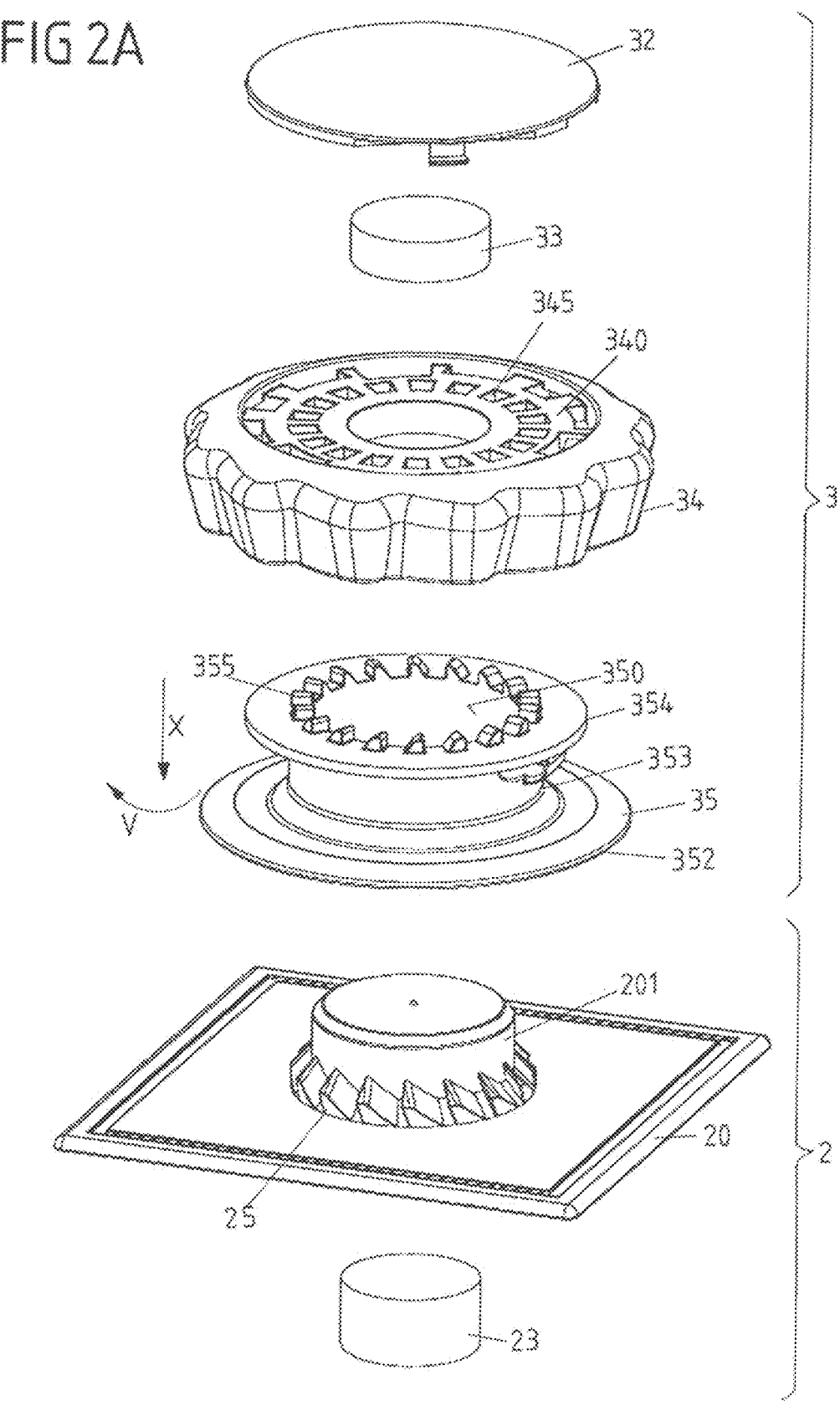

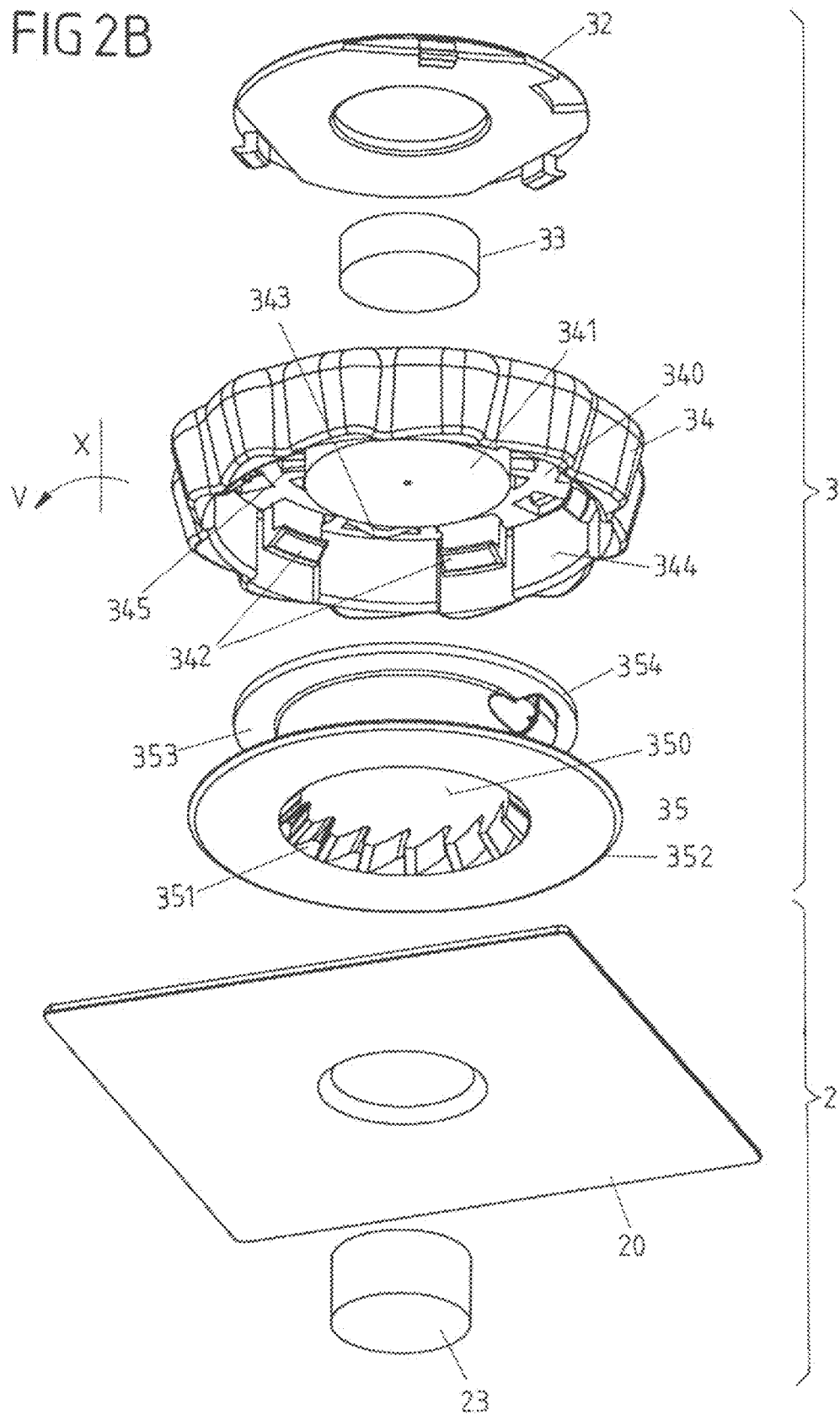

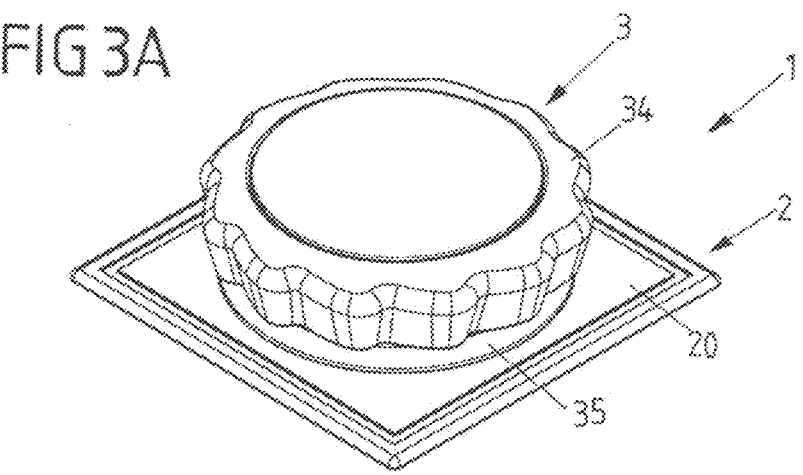
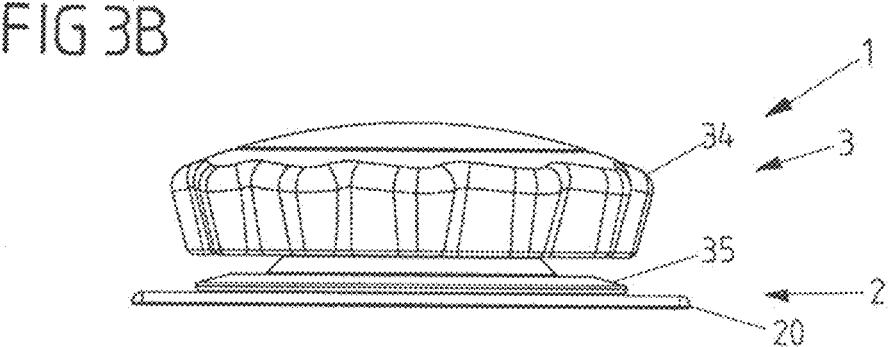
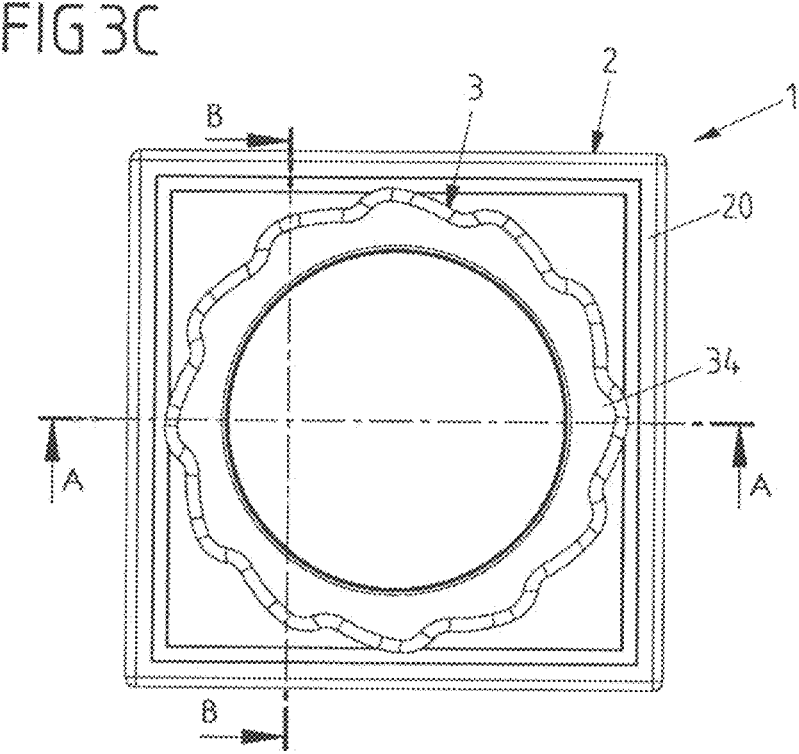

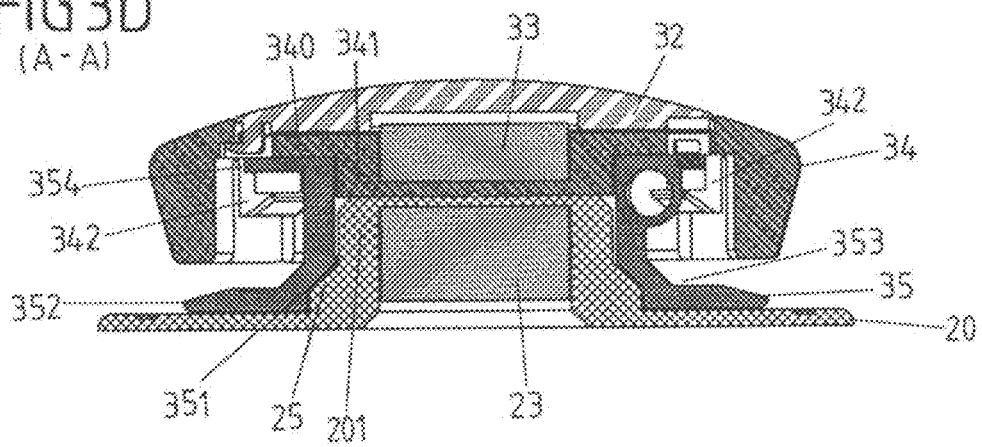
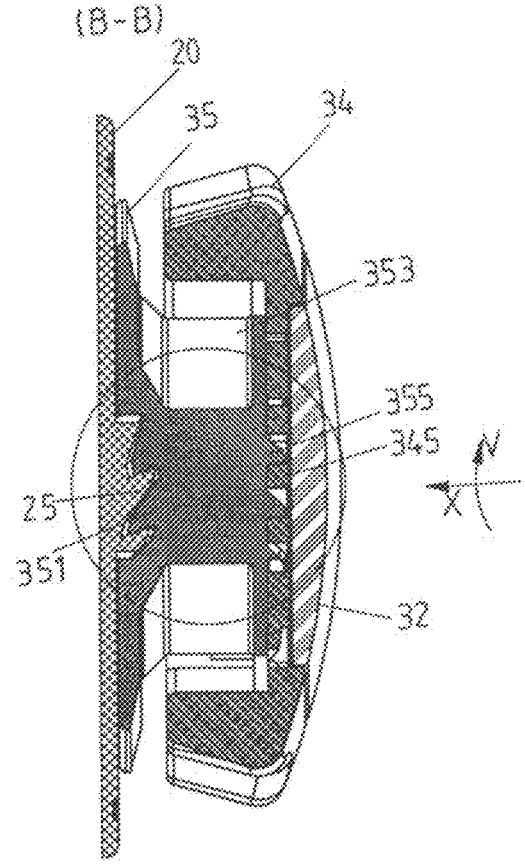
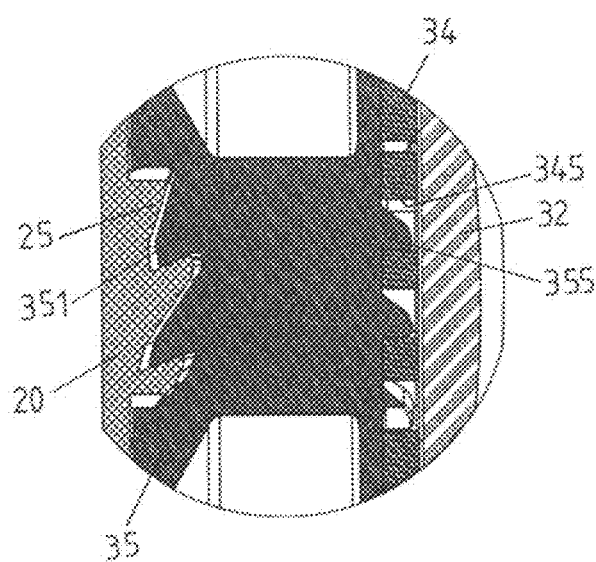

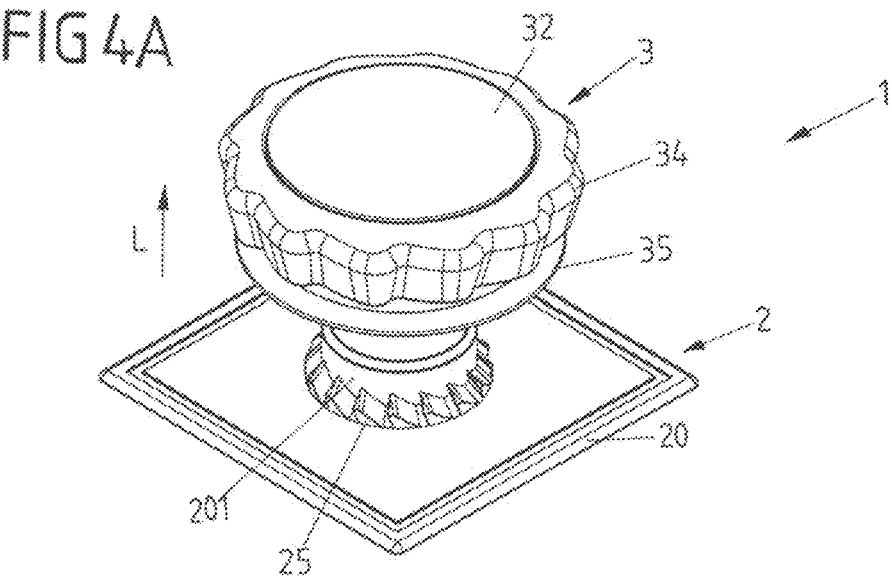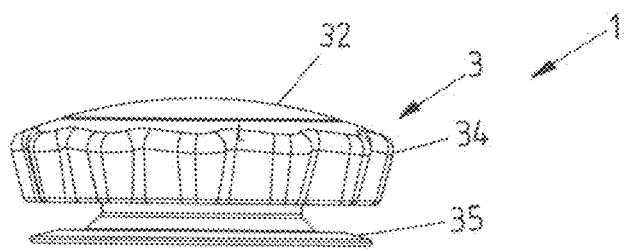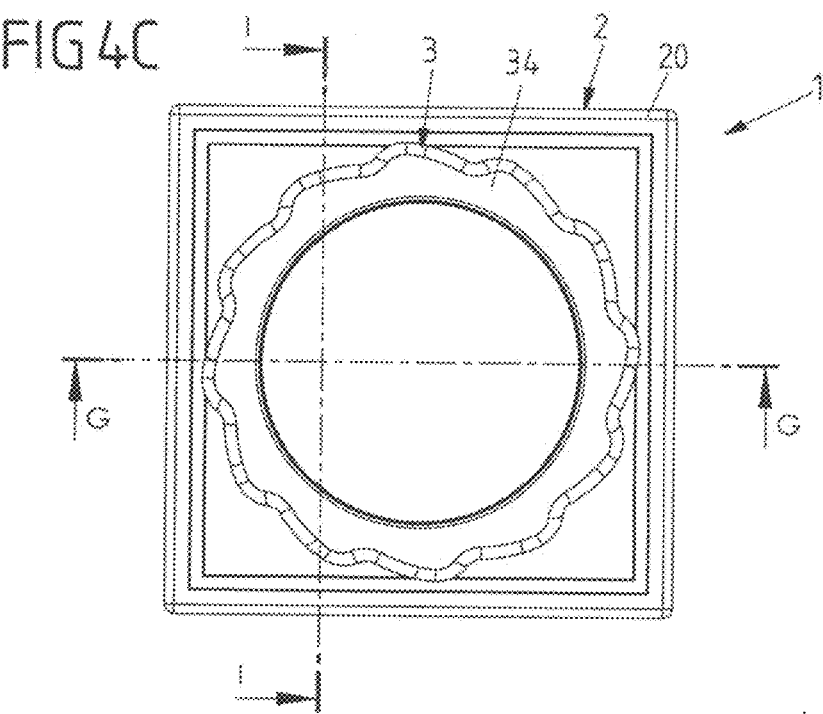

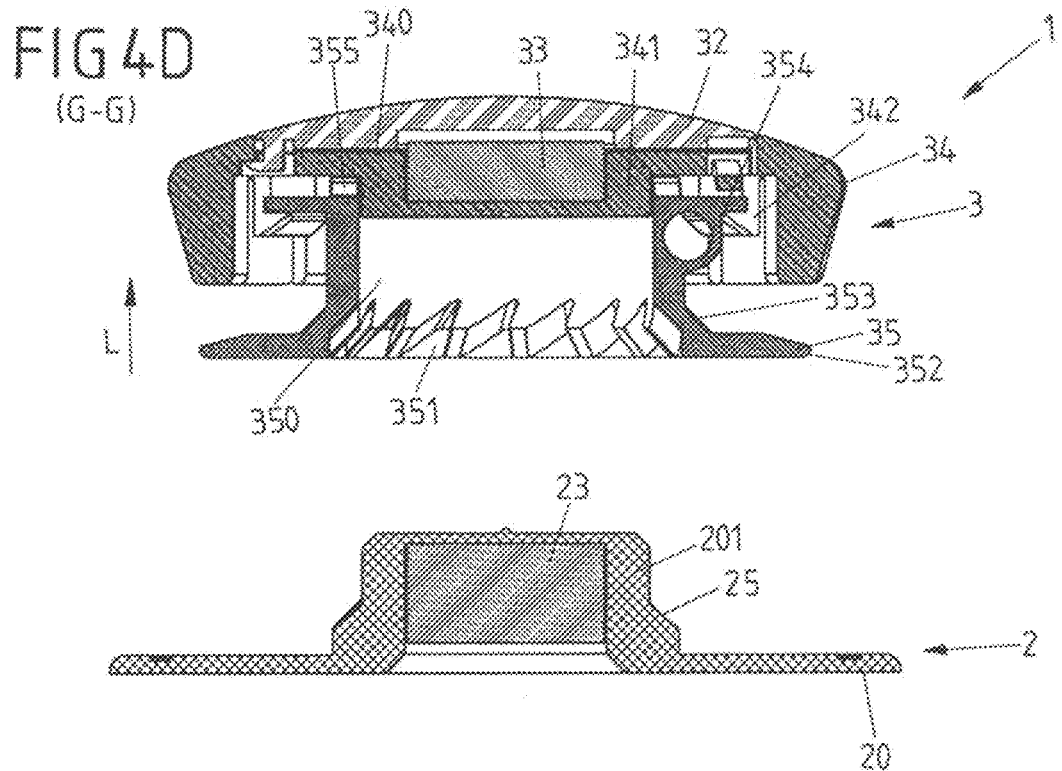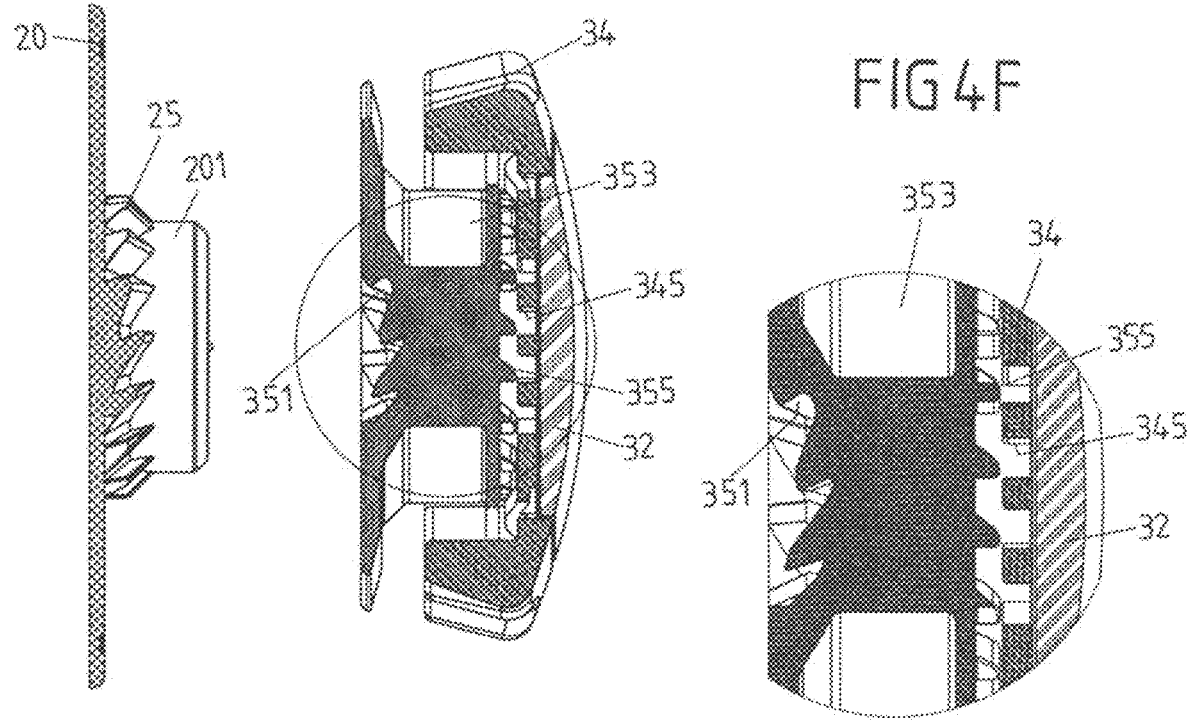

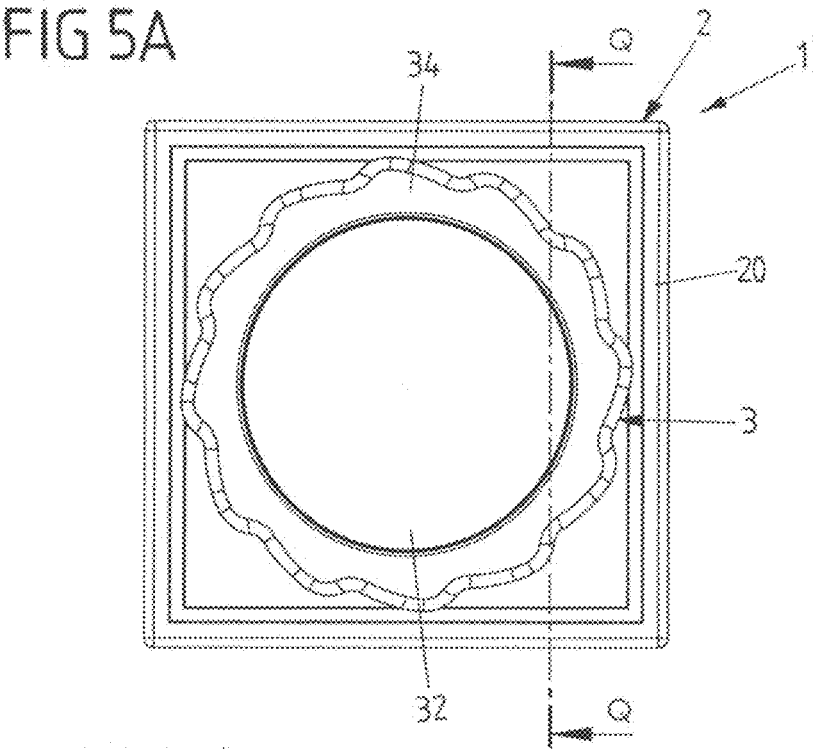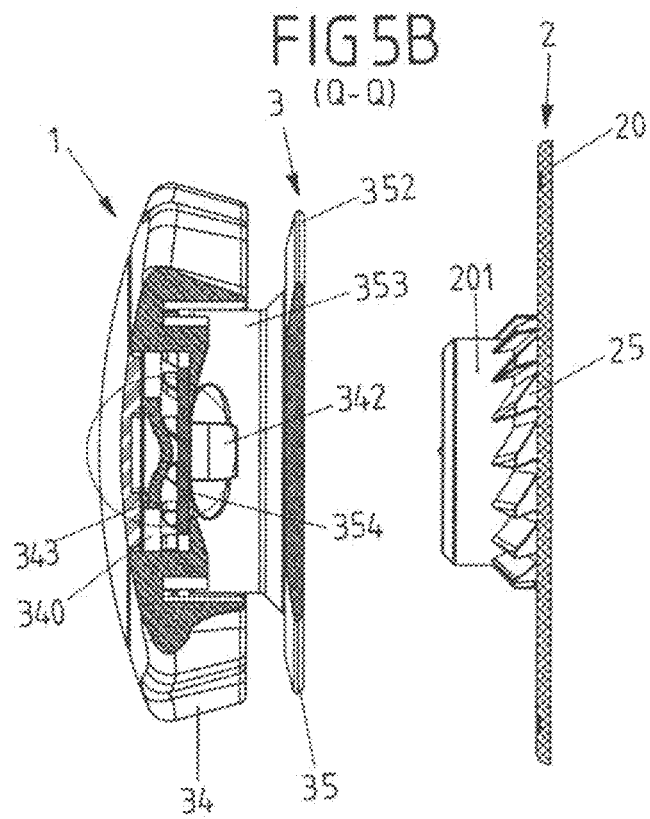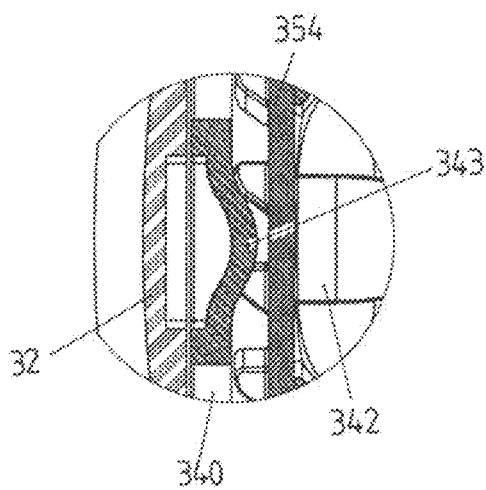

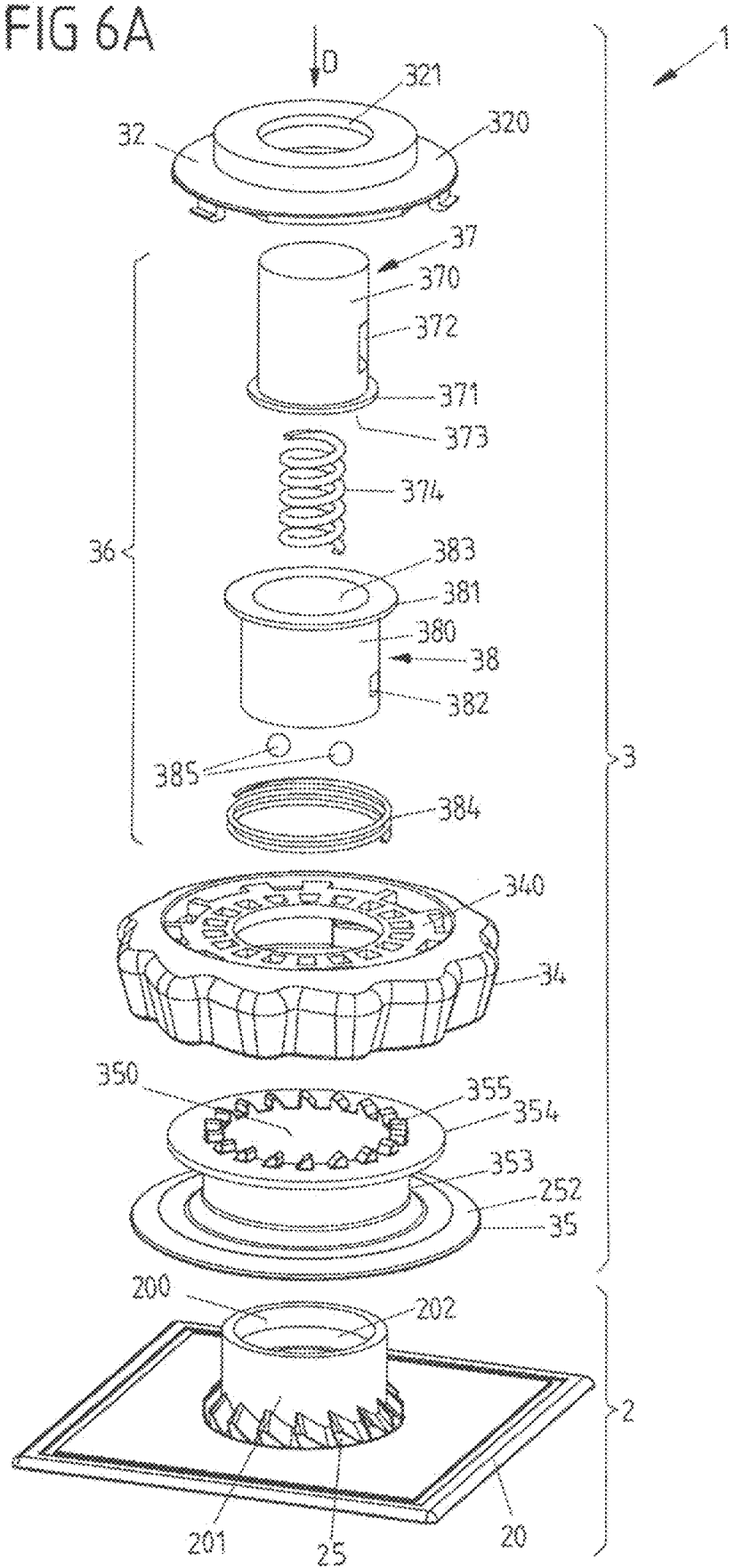

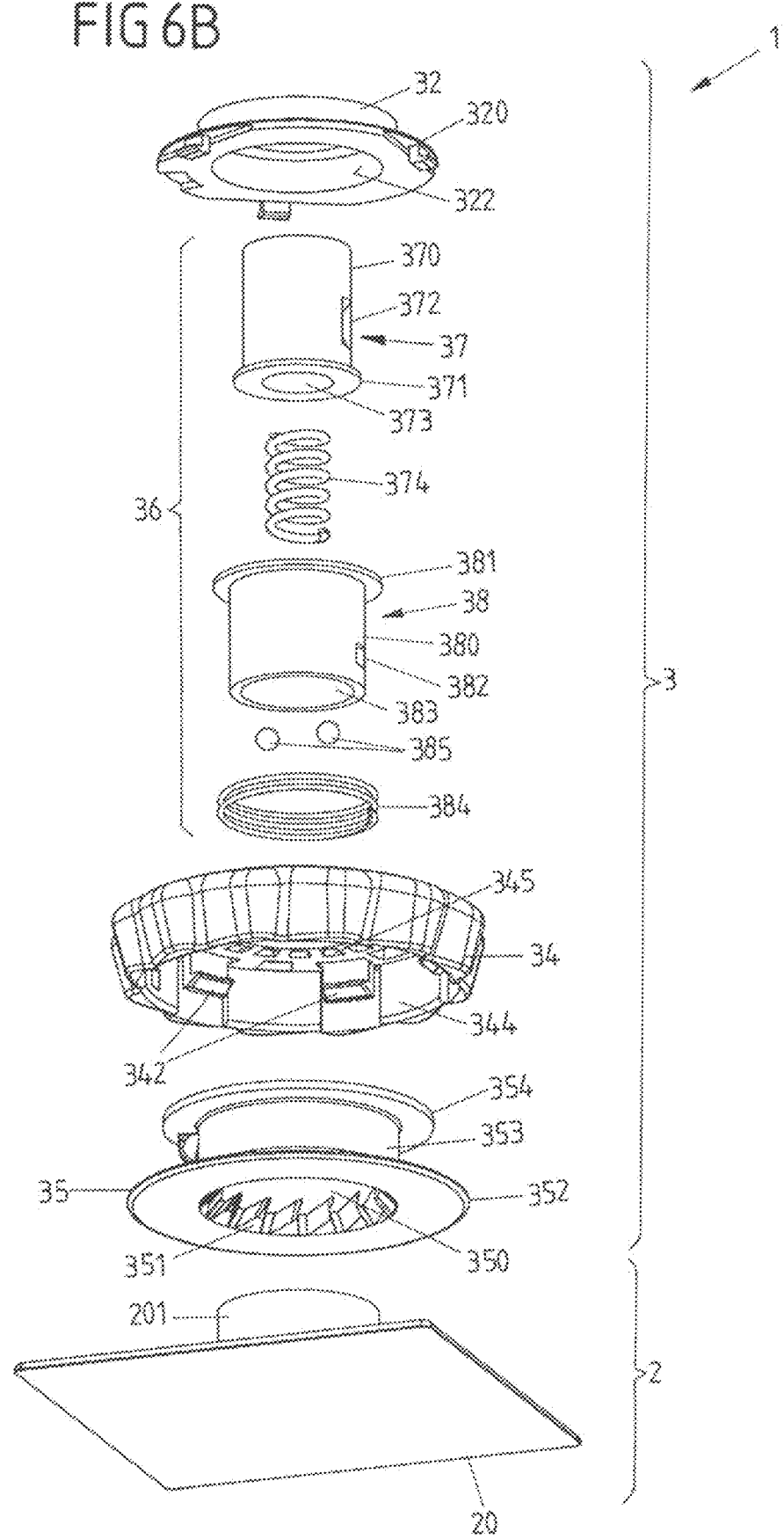

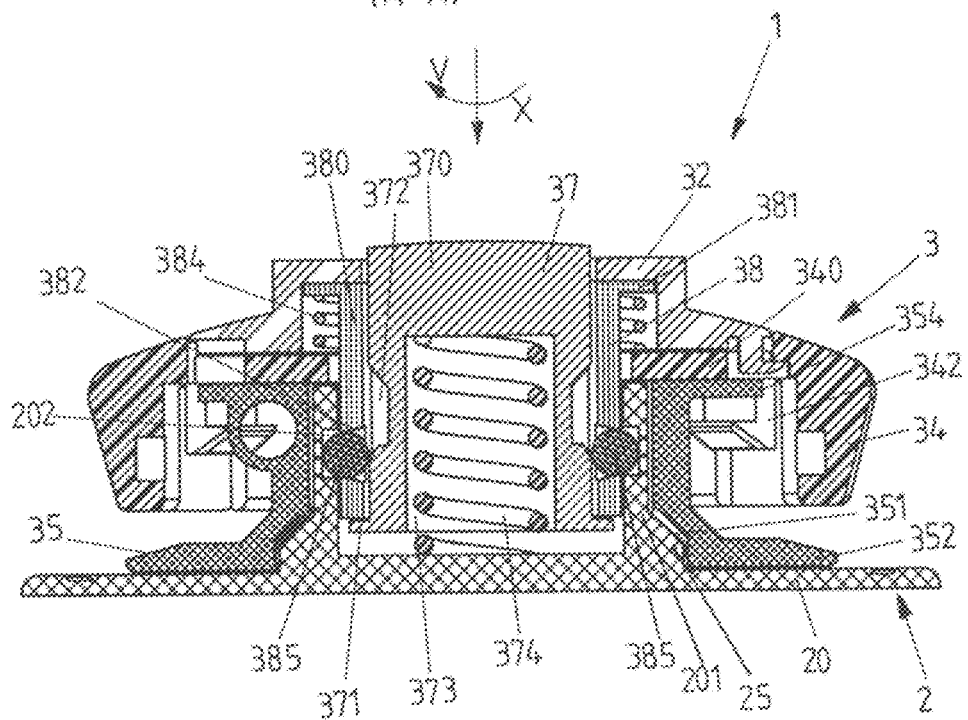

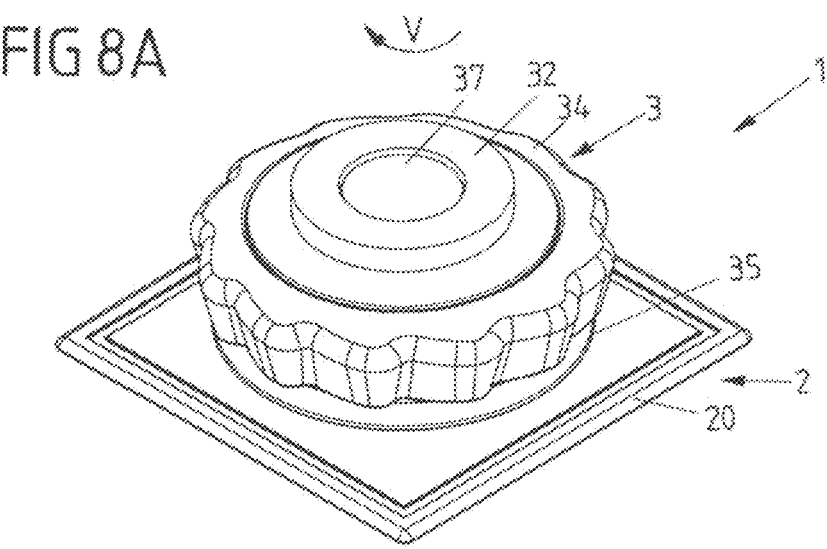
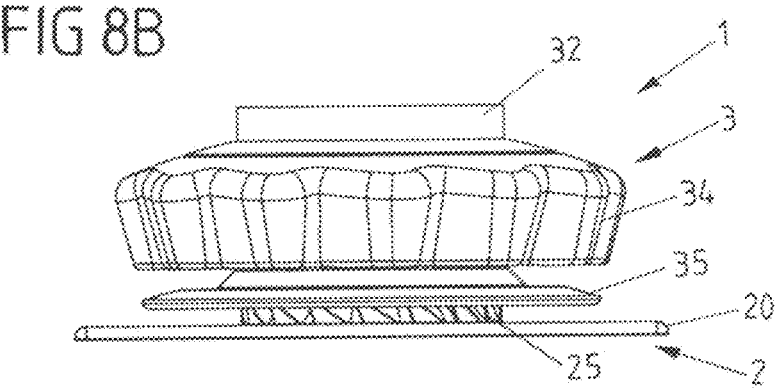
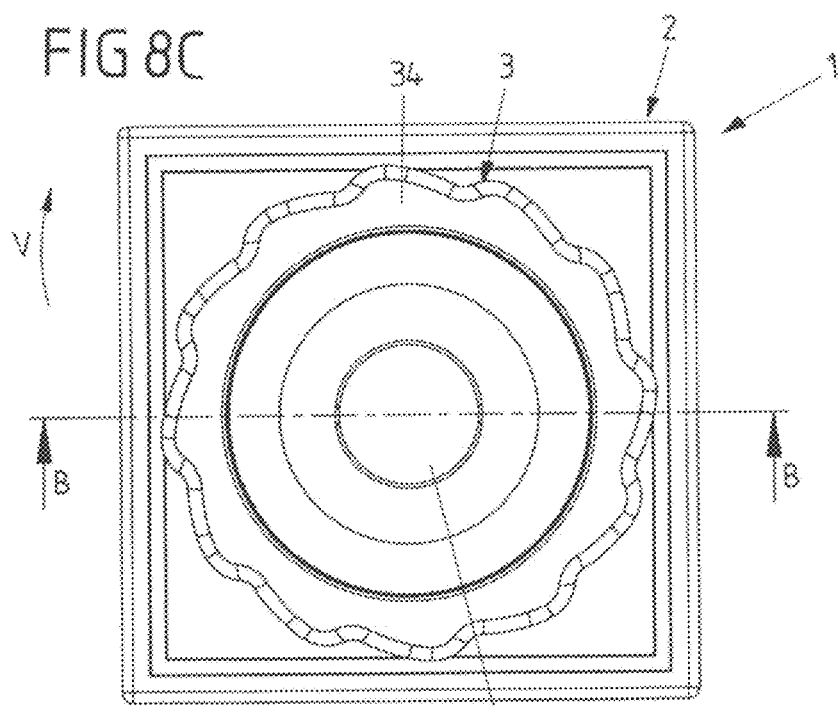

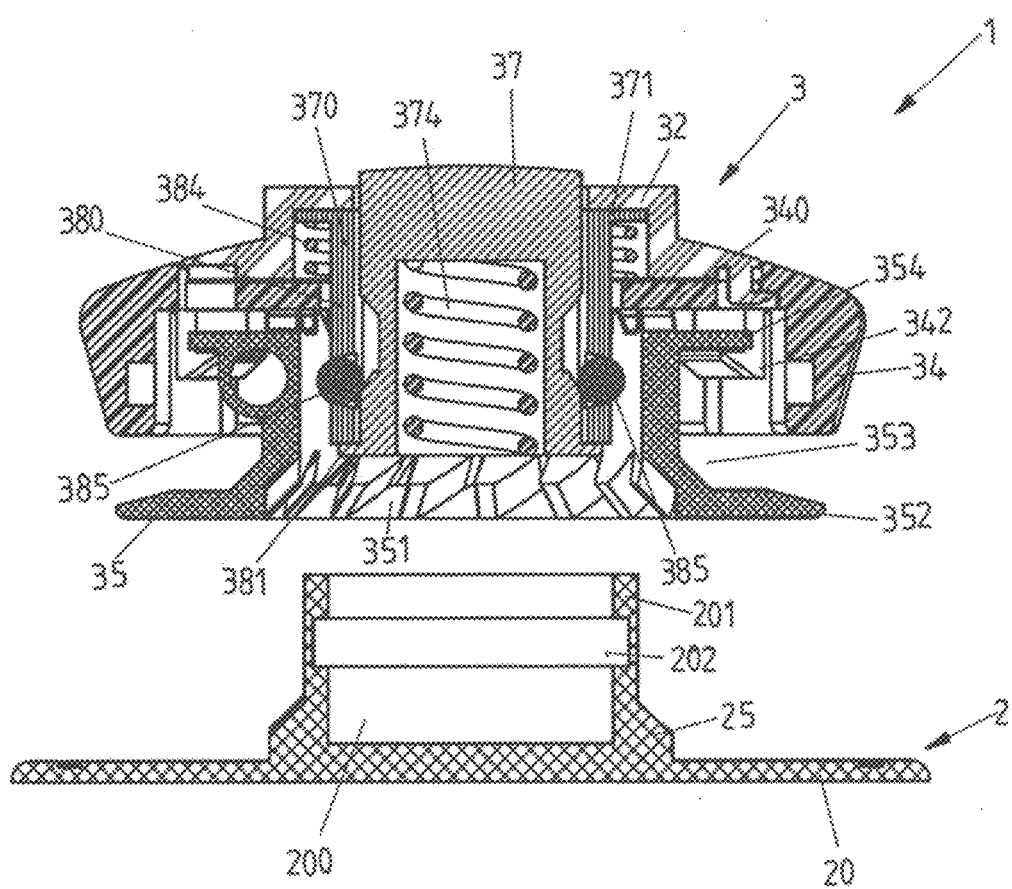

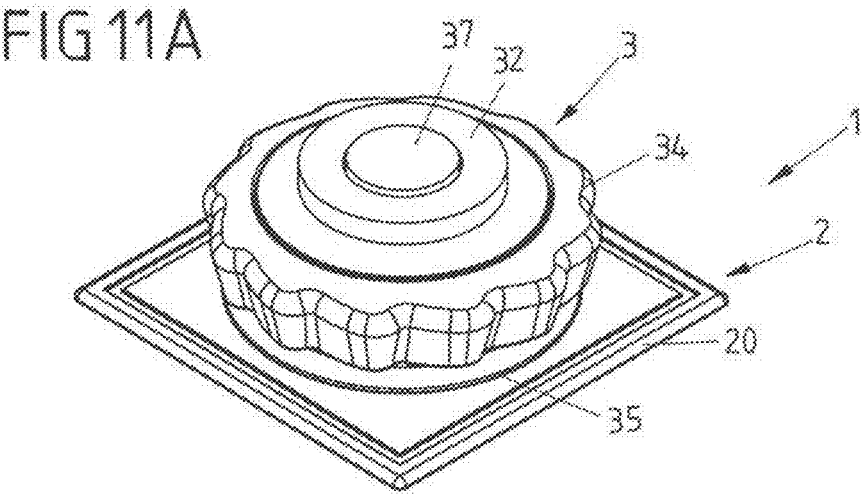
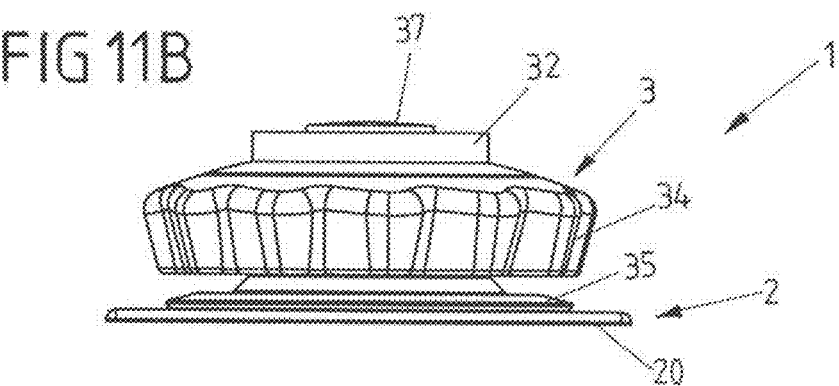
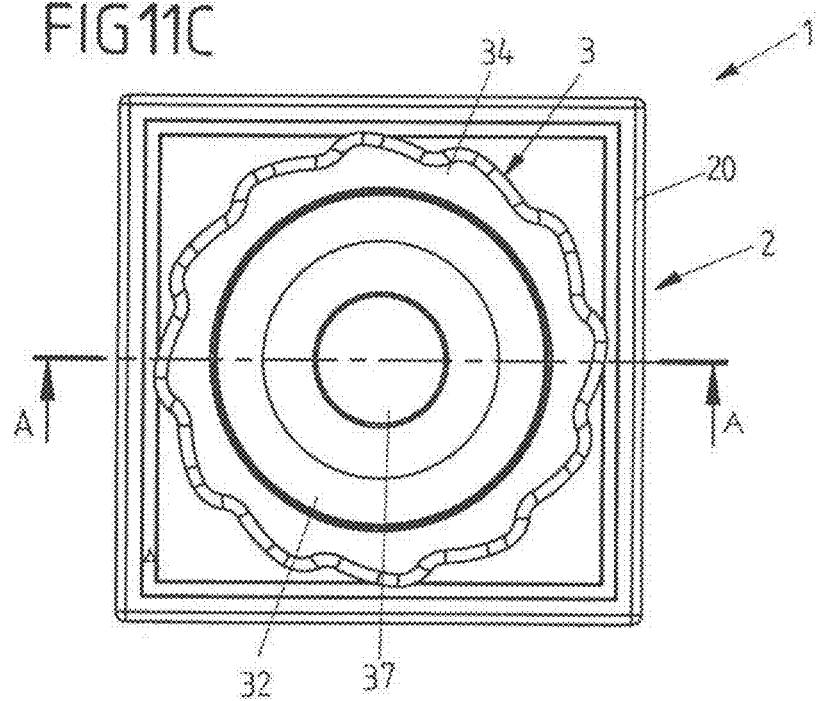

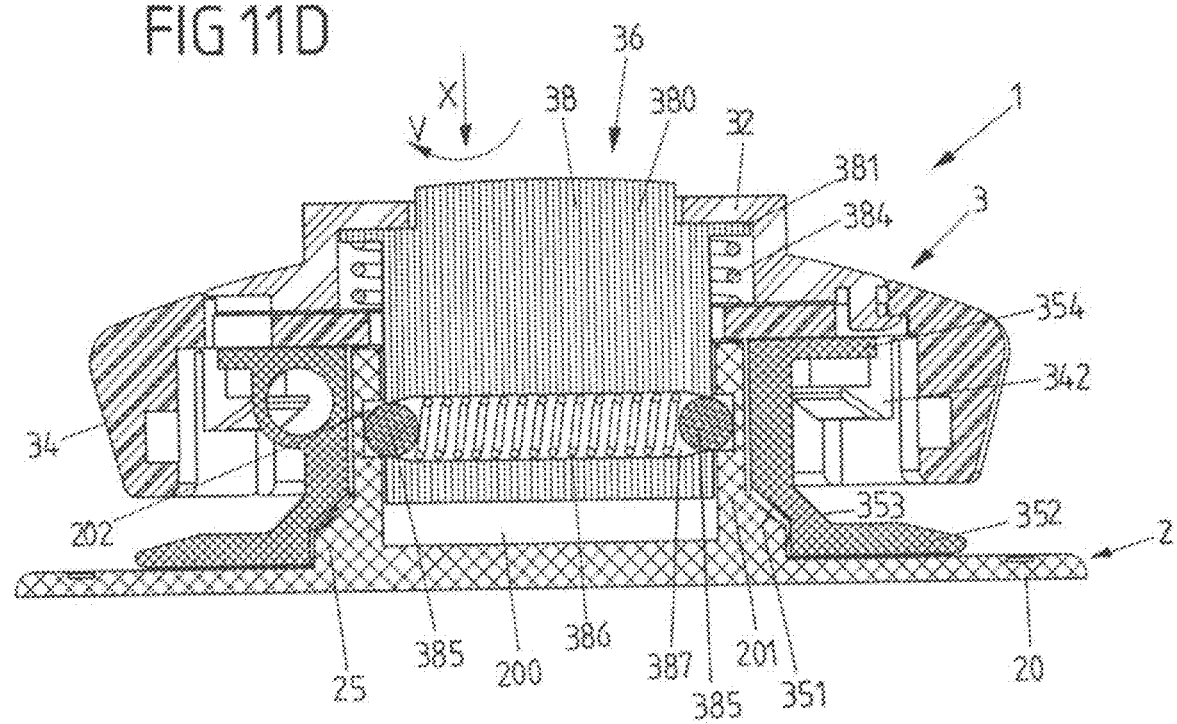
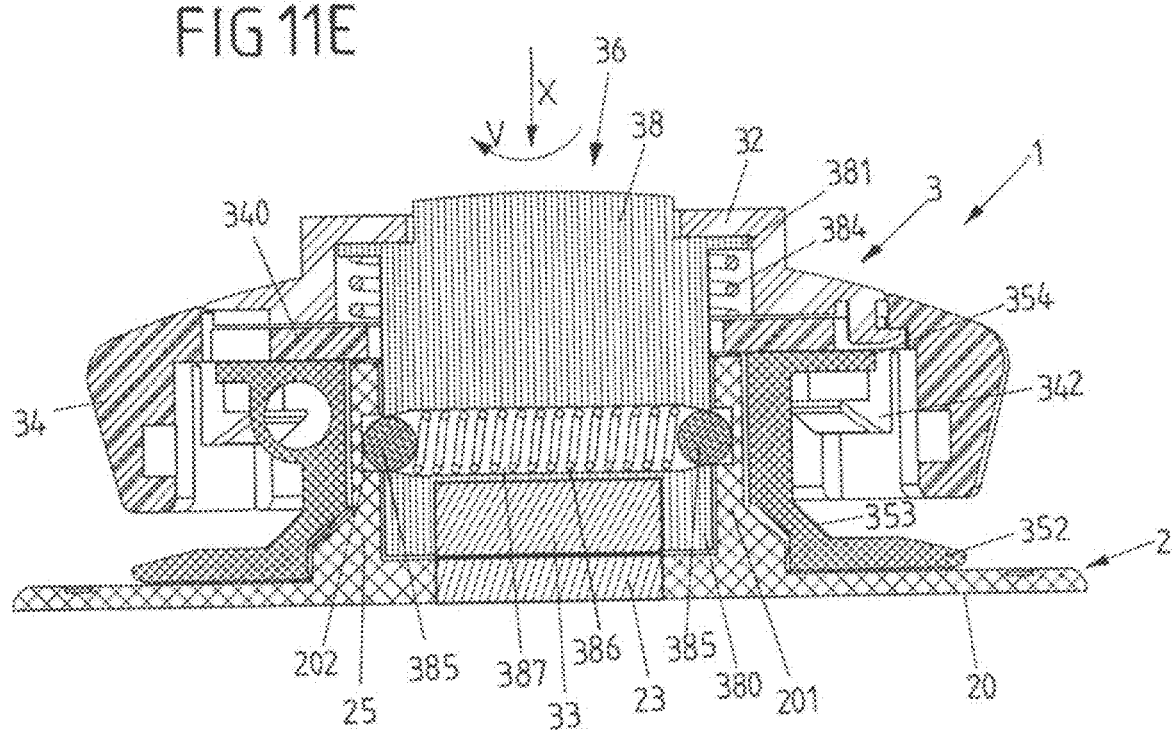

FIG 17A
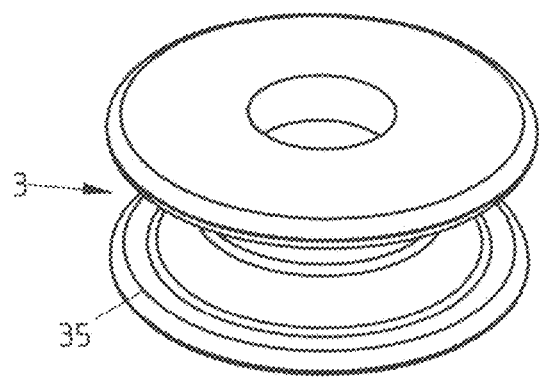
FIG 17B
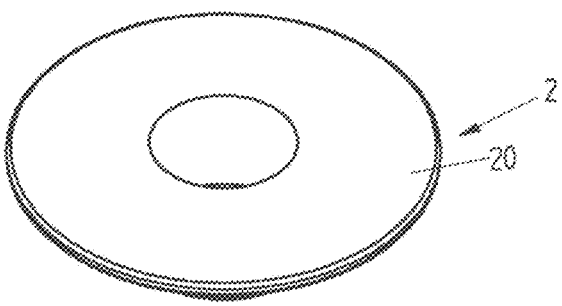
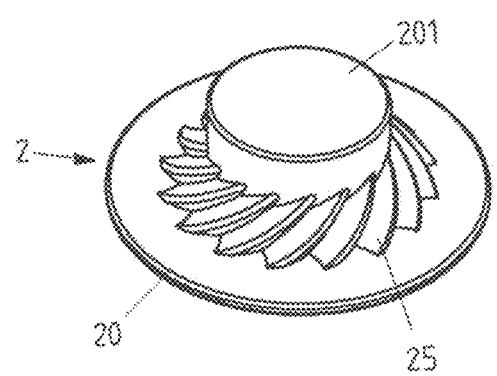
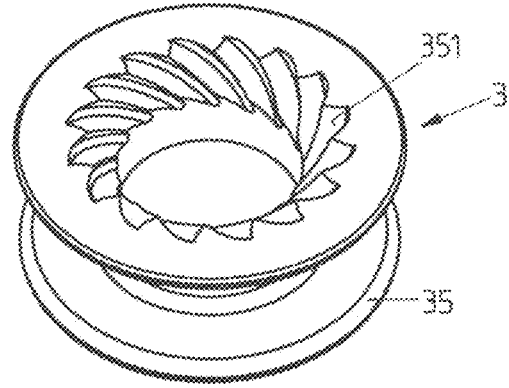
FIG 17C
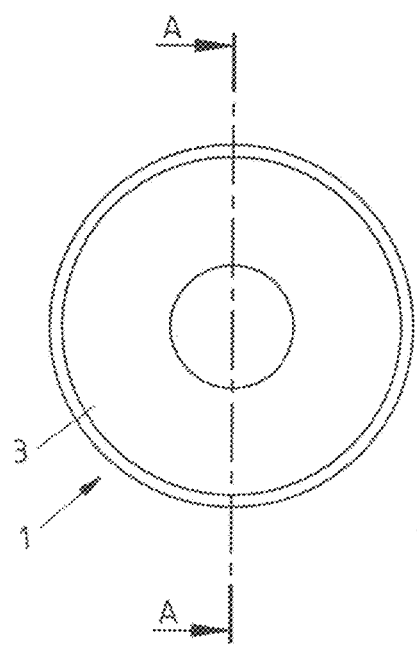
FIG 17D
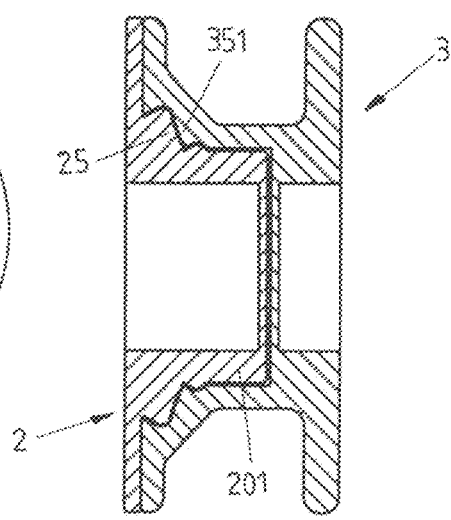

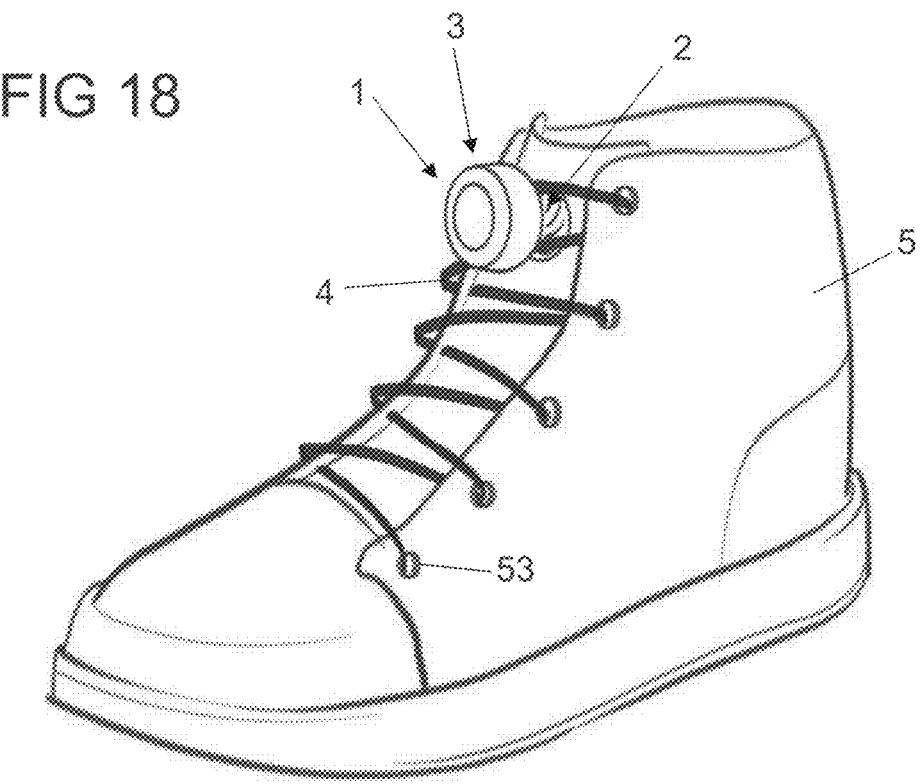
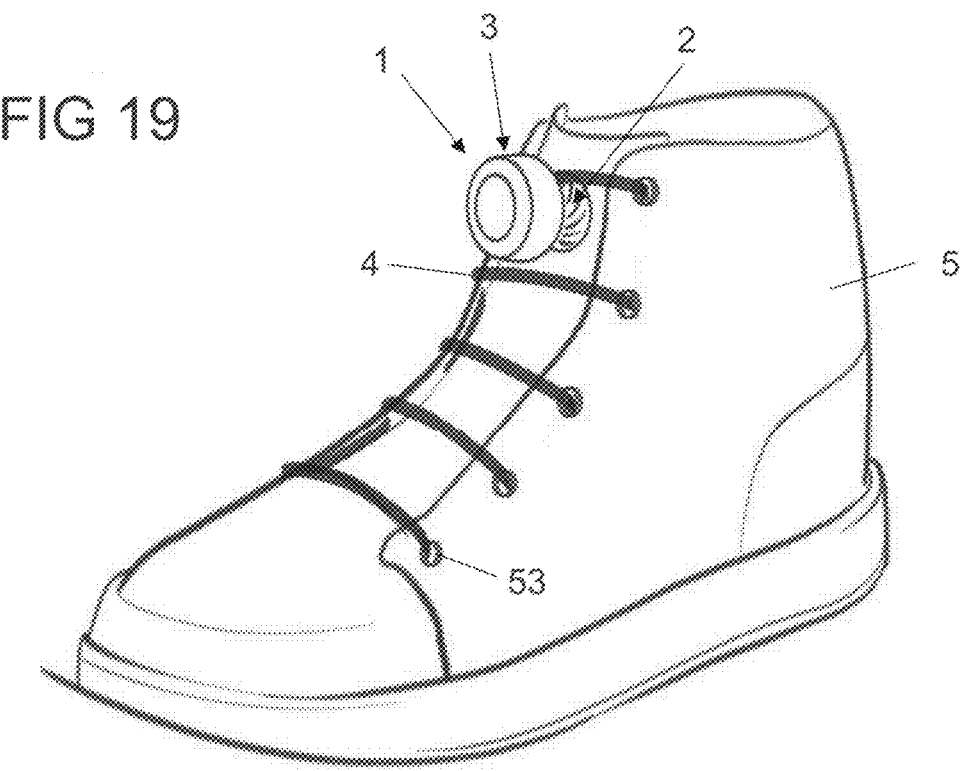

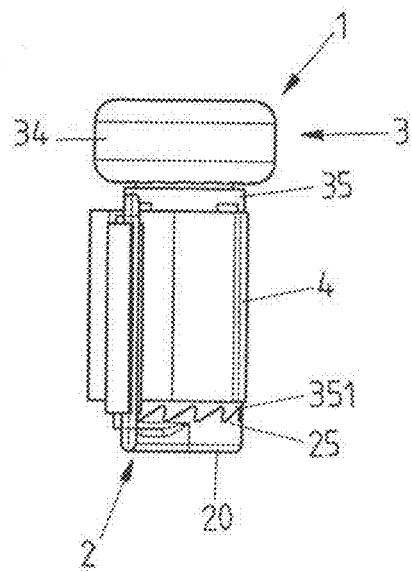
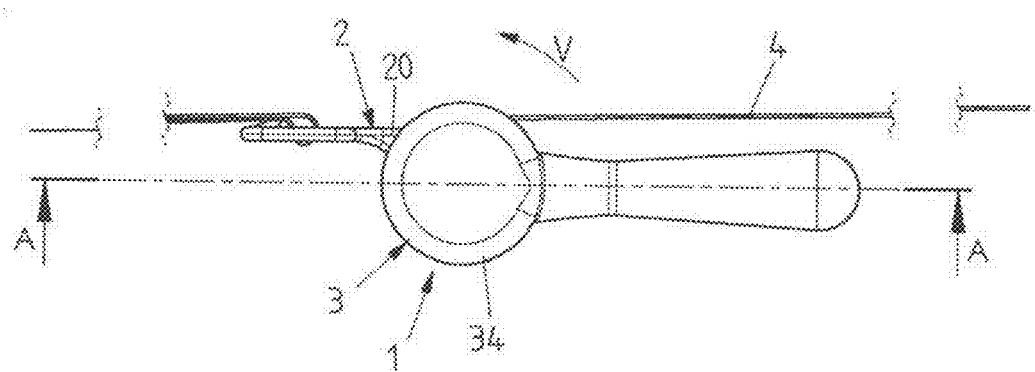
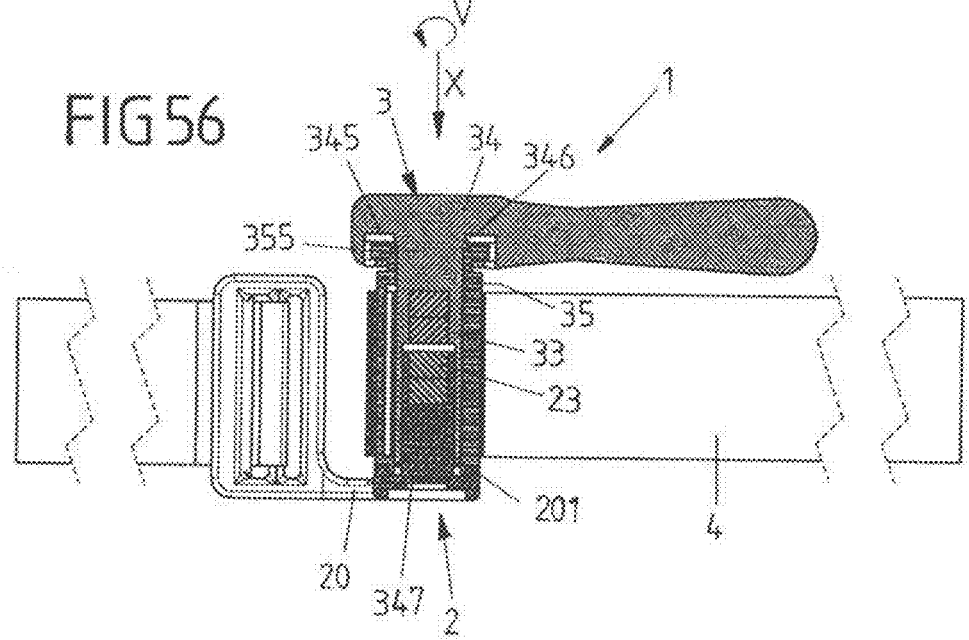

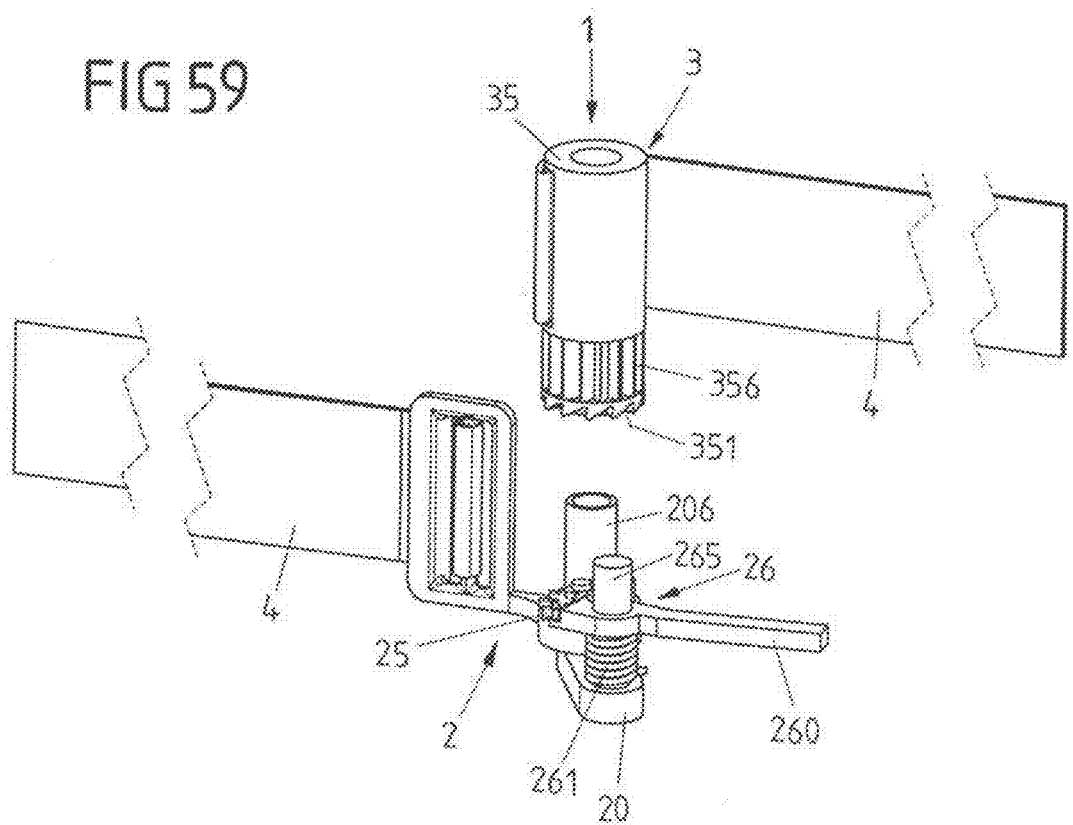
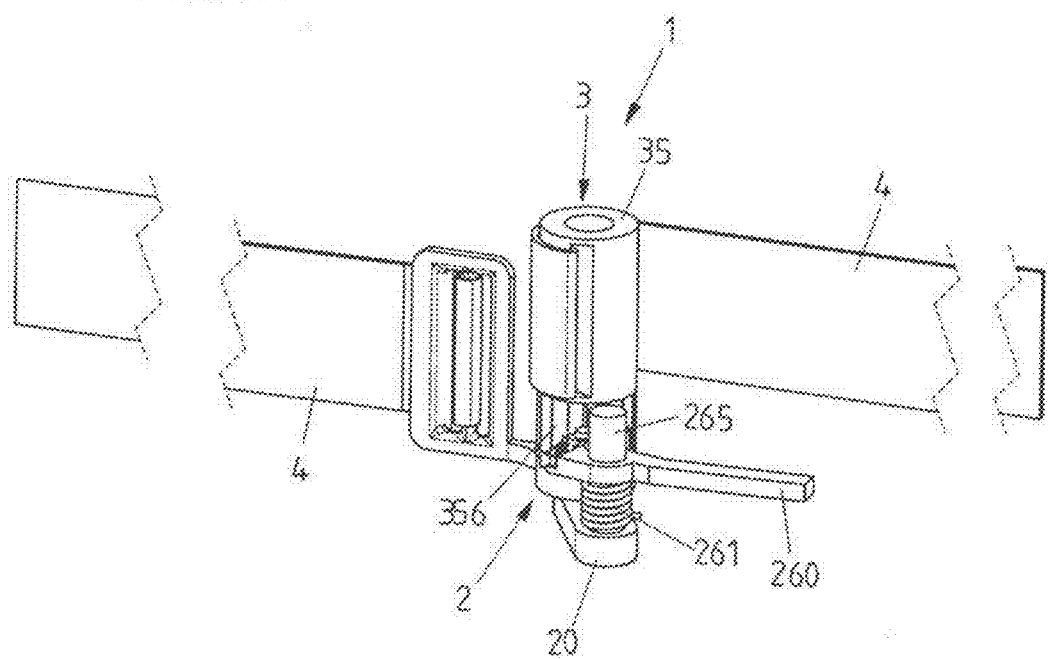

(A)

(A)

FASTENER DEVICE HAVING A WINDING ELEMENT

CROSS-REFERENCE TO RELATED APPLICATIONS

This application is the United States national phase of International Application No. PCT/EP2018/054971 filed Feb. 28, 2018, and claims priority to German Patent Application Nos. 10 2017 220 305.6 filed Nov. 14, 2017, and 10 2018 201 021.8 filed Jan. 23, 2018, the disclosures of which are hereby incorporated by reference in their entirety.

BACKGROUND OF THE INVENTION

Field of the Invention

The disclosure relates to a fastener device.

Technical Considerations

A fastener device of said type comprises a first fastener part and a second fastener part which can be mounted on one another along a closing direction, are held against one another in a closed position, and are releasable from one another in order to open the fastener device.

A fastener device of said type serves generally for connecting two parts together. For example, a fastener device of said type may provide a fastener for a container, for example a bag or a rucksack. A fastener device of said type may however also serve for example as a fastener for a shoe, for example a sports shoe. Very generally, the fastener device may serve for connecting any two assemblies with load-bearing action.

It may be desirable here that a fastener device of said type cannot only be used for detachably connecting two parts together but also permits tightening. For example, in the case of a fastener for a rucksack or in the case of a fastener for a shoe, it may be desirable for parts to be able to be firstly mounted on one another but secondly also tightened relative to one another.

A tightening device with a tension element that can be wound up on a winding element is described for example in WO 2015/006616 A1.

SUMMARY OF THE INVENTION

It is an object underlying the proposed solution to provide a fastener device which permits firstly detachable connection of assemblies to one another but secondly also tightening of the assemblies relative to one another.

Said object is achieved by a fastener device with features as described herein.

Accordingly, the second fastener part has an actuating element with a first engagement means and has a winding element which is arranged on the actuating element and which is rotatable in a winding direction in order to wind up a tension element and which has a second engagement means. The first engagement means and the second engagement means, in a release position, are not in engagement with one another, such that the winding element is rotatable relative to the actuating element. The first engagement means and the second engagement means can be placed in engagement with one another, such that, in an engagement position, the winding element is rotatable by means of the actuating element. The first fastener part has a first toothing means and the second fastener part has a second toothing means. The first toothing means and the second toothing means, in the closed position of the fastener device, are in engagement with one another such that the first fastener part and the second fastener part are held in positive locking fashion relative to one another along the winding direction.

With the proposed fastener device, a fastener for detachably connecting two parts together and a tightening device are combined with one another. Firstly, the fastener device has two fastener parts which can be mounted on one another along a closing direction and are held against one another in a closed position, such that assemblies assigned to the fastener parts are connected together by means of the fastener parts and by virtue of said fastener parts being held against one another, and the assemblies can also be released from one another again by virtue of the fastener parts being separated from one another. Secondly, the second fastener part has a winding element on which a tension element can be arranged. The winding element may for example have the form of a cylindrical roller and may bear a winding channel in which the tension element can be received. By rotating the winding element, the tension element can thus be wound up and thus tightened.

Whereas the first fastener part may be arranged on a first assembly, the second fastener part may be connected to a second assembly via the tension element, wherein, by virtue of the tension element being wound up on the winding element, the first assembly and the second assembly can be tightened relative to one another.

The tension element may for example be a flexible element which is suitable (exclusively) for transmitting tensile forces. The tension element may for example be a cable, a strap, a band, a belt, a chain or a (an electrically conductive) cable.

The tension element may for example be secured with two ends on the winding element, such that, by rotation of the winding element, the tension element can be wound with its two ends onto the winding element. It is however also conceivable and possible for only one end of the tension element to be secured on the winding element, in order for only said one end to be wound up by rotation of the winding element. It is furthermore also conceivable and possible for an inner portion of the tension element to be arranged on the winding element in order for the tension element to be wound up by rotation of the winding element. It is also conceivable for multiple different tension elements to be arranged on the winding element and to be able to be wound up by means of the winding element.

In the fastener device, the actuating element and the winding element are (releasably) operatively connected to one another by means of engagement devices. This makes it possible, in particular when the fastener device is in the closed position, for the winding element to be rotated by actuation of the actuating element, such that a tension element arranged on the winding element can be wound up onto the winding element. In the closed position, the first engagement means of the actuating element and the second engagement means of the winding element are, for this purpose, in engagement with one another, such that an actuating force is transmitted from the actuating element to the winding element and the winding element is thus rotated together with the actuating element.

The engagement means may however be released from their engagement in order to permit a relative movement between the actuating element and the winding element. This permits, for example when the fastener device is open, an independent rotation of the winding element relative to the actuating element, such that, when the fastener device is open, the tension element can for example be easily unwound from the winding element without the actuating element having to be jointly rotated in the process. This can considerably simplify the actuation of the fastener device.

In the closed position of the fastener device, the first engagement means and the second engagement means are preferably in the engagement position, and are held in this engagement position. In the closed position of the fastener device, the actuating element and the winding element are thus operatively connected to one another, such that a rotation of the actuating element leads to a rotation of the winding element and thus an actuating force is introduced from the actuating element into the winding element.

The engagement means may, in one embodiment, be designed such that, in the engagement position, a rigid, load-bearing and bidirectional connection is produced between the actuating element and the winding element. The actuating element and the winding element are thus rotatable only jointly in the winding direction and counter to the winding direction.

In another embodiment, the engagement between the first engagement means and the second engagement means may however also be such that actuating forces during an adjustment of the actuating element in the winding direction are transmitted to the winding element, but a rotation of the actuating element counter to the winding direction does not lead to a rotation of the winding element, but rather the actuating element is rotatable independently of the winding element counter to the winding direction. For this purpose, one of the engagement means or else both engagement means may for example have a sawtooth-like form such that, in the event of engagement during a rotation of the actuating element in the winding direction, the engagement means lock relative to one another and thus the winding element is rotated together with the actuating element, but in the event of a rotation of the actuating element counter to the winding direction, the engagement means can slide over one another, and in particular, no (significant) transmission of force takes place via the engagement means.

The engagement means are for example attached, in encircling fashion around the closing direction, at one side to the actuating element and at the other side to the winding element. The engagement means are in this case formed on surfaces, facing toward one another, of the actuating element and of the winding element.

In one specific abutment, the winding element may for example have a sawtooth-like toothing which realizes the second engagement means, whereas the first engagement means of the actuating element is formed by a series of engagement openings lined up in a row, with which the sawtooth-like toothing of the winding element engages in the engagement position.

For the movement of the engagement means between the release position and the engagement position, the actuating element and the winding element may for example be adjusted axially along the closing direction relative to one another. In the release position, surfaces of the actuating element and of the winding element on which the engagement means are formed are moved axially apart from one another along the closing direction, such that the engagement means are no longer in engagement with one another. By contrast, in the engagement position, the surfaces have been moved toward one another, such that there is engagement between the engagement means.

In one embodiment, the actuating element and the winding element are spring-preloaded relative to one another, for example in the direction of the release position. For this purpose, it is for example possible for a spring element, for example in the form of a spiral spring or else in the form of a spring injection-molded on the actuating element or on the winding element, to act between the actuating element and the winding element, which spring imparts a spring-mechanical preload between the actuating element and the winding element in the direction of the release position. If no other forces act between the actuating element and the winding element, in particular if the fastener device is situated in its opened position, then the actuating element and the carrier element are not engagement with one another, such that the winding element can be rotated independently of the actuating element for example for an unwinding of the tension element.

In addition to the engagement means which serve for producing a (releasable) operative connection between the actuating element and the winding element, the first fastener part and the second fastener part each have a toothing means, which toothing means, in the closed position of the fastener device, produce a positively locking hold, along the winding direction, of the fastener parts relative to one another.

Positively locking hold is to be understood here to mean that at least certain forces acting along the winding direction between the fastener parts can be supported and dissipated in positively locking fashion, without the fastener parts being adjusted relative to one another along the winding direction as a result. Such a positively locking hold may exist in the winding direction and also counter to the winding direction. It is however also conceivable and possible for forces to be supported only in one direction, that is to say in the winding direction or counter to the winding direction.

Here, the positively locking hold may be such that a movement of the second fastener part in the closed position relative to the first fastener part counter to the winding direction and/or in the winding direction is locked, that is to say the positive locking hold cannot be readily overcome, at least not without removing the second fastener part from the first fastener part. The positive locking hold may however alternatively also be such that, if a certain threshold torque is exceeded, which is dependent on the geometry of the toothing means, the positive locking hold can be overcome, such that the second fastener part can, in the event of a force being introduced with which the threshold torque is exceeded, be rotated relative to the first fastener part in the winding direction and/or counter to the winding direction.

The second toothing means (of the second fastener part) may in this case be arranged on the actuating element or on the winding element. A positively locking hold in the closed position can thus be produced between the actuating element and the first fastener part or between the winding element and the first fastener part.

By means of the toothing means, it is possible in particular to provide a type of freewheel which permits a rotation of the second fastener part relative to the first fastener part in the winding direction when the fastener parts have been mounted on one another and are thus situated in the closed position, but locks a movement counter to the winding direction. In the event of rotation of the winding element relative to the first fastener part, the second toothing means of the second fastener part slides over the first toothing means of the first fastener part, such that a ratchet movement of the second fastener part relative to the first fastener part in the winding direction is possible. In the event of load being exerted counter to the winding direction, toothing elements of the toothing means however engage with one another such that a movement is locked and the second fastener part and thus also the winding element are held in their presently assumed position.

The toothing means may for example be in engagement with one another in an axial direction. In the event of a rotation of the second fastener part in the winding direction relative to the first fastener part, the toothing means slide over one another, for example by virtue of sawtooth-like toothing elements sliding on one another. If the first fastener part and the second fastener part are mounted so as to be rotatable relative to one another and are guided axially on one another, this may be associated with a (small) axial movement of the second fastener part relative to the first fastener part.

Provision may alternatively be made for at least one of the toothing means to have at least one toothing element which, in the event of rotation of the second fastener part in the winding direction, can be forced aside, for example transversely with respect to the winding direction. In this case, it is thus the case that no axial movement occurs between the fastener parts, but rather the toothing elements of one of the toothing means are forced aside if the second fastener part is rotated in the winding direction relative to the first fastener part. This may be expedient in particular if the first fastener part and the second fastener part are, in the closed position, mechanically detained together and thus cannot be moved axially relative to one another.

It is basically possible for all types of technically known free wheels to be used.

In one embodiment, the first fastener part has a cylinder portion which, in the closed position, engages into an opening of the winding element for the rotatable mounting of the winding element on the first fastener part. The first toothing means of the first fastener part may extend circumferentially around the surface portion. In this case, by means of the cylinder portion, a rotatable mounting of the second fastener part, in particular of the winding element of the second fastener part, on the first fastener part is realized, such that the second fastener part can, by actuation of the actuating element, be easily rotated for example in order to wind up the tension element onto the winding element, with the toothing means of the first fastener part and of the second fastener part sliding over one another.

A fastener device of the type described here may be designed as a purely mechanical fastener device, in the case of which the fastener parts are mounted on one another and are mechanically held against one another in the closed position. By means of such mechanical hold, it is possible here for shear forces in a plane transverse with respect to the closing direction to be accommodated, and additionally possibly also forces counter to the closing direction in the case of a mechanical detent connection between the fastener parts.

In one advantageous embodiment, the fastener device is of magnetic design. For this purpose, the first fastener part and the second fastener part each have at least one magnet element which, during the mounting of the fastener parts on one another, are situated opposite one another with magnetically attractive action in order to close the fastener device and thus magnetically assist the closing of the fastener device.

Here, a magnet element may be formed by a permanent magnet or else by a magnetic armature, composed for example of a ferromagnetic material. For example, one of the fastener parts may have a permanent magnet which interacts, with magnetically attractive action, with a magnetic armature of the other fastener part. It is however also conceivable for both fastener parts to each have a permanent magnet, or else an arrangement of multiple permanent magnets, which, during the mounting of the fastener parts on one another, are situated with opposite poles opposite one another and thus assist the mounting process by magnetic attraction.

By means of magnet elements which act with a magnetically attractive action between the first fastener part and the second fastener part and which thus magnetically assist the mounting of the fastener parts on one another, it is possible in particular for the toothing means of the fastener parts to be pulled into engagement with one another such that, in the closed position, there is engagement between the toothing means. By means of the magnet elements, it can furthermore also be realized that the engagement means of the actuating element and of the winding element are in engagement with one another in the closed position.

For example, on the actuating element, there may be arranged a magnet element which interacts with an associated magnet element on the first fastener part during the closing of the fastener device. Owing to the magnetic attraction force, it is also possible, in the closed position, for the engagement between the engagement means of the actuating element and of the winding element to be produced by virtue of the actuating element being pulled toward the winding element owing to the magnetic action on the actuating element.

If there is a spring preload between the actuating element and the winding element in the direction of the release position of the engagement means, then the magnetic attraction force in the closed position preferably exceeds the preloading spring force, such that the engagement between the engagement means of the actuating element and of the winding element can be produced owing to the magnetic attraction force.

The first fastener part and the second fastener part may, in one embodiment, in the closed position, be mechanically detained together in order to hold the fastener parts against one another counter to the closing direction, in a magnetic or non-magnetic embodiment of the fastener device. For this purpose, one of the fastener parts may for example have a detent means with at least one movable detent element which, in a detained position, engages into a detent recess of the other fastener part and thus holds the fastener parts against one another counter to the closing direction. By the detent means, a mechanical detent connection is thus produced between the fastener parts when the fastener parts have been mounted on one another. By the detent means, the fastener parts are held on one another counter to a load directed oppositely to the closing direction, such that a removal of the fastener parts from one another is not possible without releasing the detent connection.

The detent means preferably moves automatically into the detained position during the mounting of the fastener parts on one another. During the mounting of the fastener parts on one another, the fastener parts are thus automatically detained together, such that the hold of the fastener parts against one another in the closed position is safeguarded. Here, the second fastener part may possibly be rotatable relative to the first fastener part in the winding direction despite the detent connection, such that the tension element can be wound up onto the winding element when the fastener parts have been mounted on one another.

The detent means may have one or more detent elements. These are for example spring-preloaded in the direction of their detained position, such that the detent elements preferably automatically engage with the associated detent recess of the other fastener part when the fastener parts are mounted on one another.

In one embodiment, the detent means has an engagement element which, in the closed position, engages into the other fastener part and on which the at least one detent element is arranged. If the detent means is arranged for example on the second fastener part, then the engagement element, in the closed position, engages into an associated opening for example in a cylinder portion, which serves for the mounting of the winding element, of the first fastener part. One or more detent elements are arranged on the engagement element, such that the detent engagement between the fastener parts in the closed position is produced by means of the engagement element.

In one embodiment, if the detent means is formed on the second fastener part, the engagement element is adjustable axially along the closing direction relative to the actuating element. The actuating element can thus be axially adjusted relative to the engagement element over a certain travel, which makes it possible in particular for the second fastener part, in the event of rotation relative to the first fastener part and in the event of the toothing means sliding over one another, to perform a compensating axial relative movement relative to the first fastener part, with detent engagement between the second fastener part and the first fastener part.

Here, the engagement element is preferably spring-preloaded relative to the actuating element, for example by means of a compression spring, which forces the actuating element and thus also the winding element in the direction of the first fastener part when the fastener device is in the closed position.

In order to be able to release the detent connection between the fastener parts and separate the fastener parts from one another in order to open the fastener device, the detent means preferably has an operating element which can be actuated in order to disengage the at least one detent element from the detent recess. For example, a user can push on the operating element, which is for example arranged at just on the engagement element, in order to thereby move, or at least release, the detent elements arranged on the engagement element, such that the detent engagement of the detent means can be released.

The operating element is for example guided axially along the closing direction on the engagement element. The engagement element may for example be designed as a sleeve within which the operating element is received so as to be displaceable axially along the closing direction.

In one embodiment, it is also possible for a gearing, for example a planetary gearing, to be provided between the actuating element and the winding element, such that an introduction a force from the actuating element into the winding element takes place via a gearing and thus with a speed reduction or with a speed increase.

The actuation of the actuating element may be performed manually by rotating the actuating element. Embodiments are however also conceivable and possible in which an electric motor is provided for driving the actuating element. Such an electric motor may for example be arranged positionally fixedly on an assembly connected to the first fastener part, and may for example engage by means of a suitable gearing element, for example a drive worm, with a toothing of the actuating element when the fastener device is situated in its closed position. The actuating element can thus be rotated by means of the electric motor.

It is alternatively conceivable and possible for the toothing means of the first fastener part to be driven by electric motor means in order to rotate the winding element by rotation of the toothing means of the first fastener part.

In one embodiment, in each case one or more electrical contact elements may be arranged on the first fastener part and on the second fastener part such that electrical contact is produced between the fastener parts during the closing of the fastener device.

In a further embodiment, the fastener device may have a winder exit element, for example in the form of an eyelet, which may be arranged on the second fastener part and designed as a component which is additional to the winding element and to the actuating element. The winder exit element may for example be freely rotatable relative to the winding element and/or the actuating element and guides the tension element in relation to the winding element, such that the tension element runs into the winding element in a defined manner. This prevents uncontrolled unwinding of the tension element from the winding element and in particular knotting of the tension element during the unwinding process.

The fastener device described here permits a releasable connection of fastener parts in combination with a tightening facility for a tension element. This makes it possible, for example, for the tension element to be preloaded under tension with the fastener parts separated in order for the fastener device to then be closed and, in the closed position of the fastener device, for the tension element to be wound up and retightened by rotation of the winding element. For example, in the case of a shoe, it is possible in this way for the tension element (in the form of a shoelace) to be manually pre-tightened by pulling on the tension element with the fastener device separated and then retightened with the fastener device closed.

Furthermore, the separation of the fastener parts makes it possible for the tension element connected to the winding element to be laid around an article in order for one assembly to be fixed to another by means of the fastener device. For example, with the fastener device open, the tension element can be laid around for example a mast or a frame, for example a bicycle frame, in order for the fastener device to then be closed and the tension element tightened, such that an assembly can be fixed to the mast or to the frame in this way.

A fastener device of the type described here may be used in a wide variety of ways. For example, a fastener device of the type described here may be used on bags or other containers such as rucksacks, boxes or containers, on shoes (in particular sports shoes such as walking shoes, ski boots or the like), on helmets, in particular sports helmets, or on medical aids such as for example medical support splints or the like.

For example, by means of a fastener device of the type described here, it is possible for straps on sacks or bags to be tightened (so-called compression straps). A strap or a hip strap of a rucksack or school satchel can be closed and tightened by means of such a fastener device. Also, such a fastener device may be used on a cable drum for winding up an electrical cable, for example a headphone or charging cable.

In the case of a helmet, it is possible by means of a fastener device of the type described here for a strap to be tightened or for an article to be secured on the helmet, for example protective goggles (such as ski goggles) or the like.

A fastener device of said type may also serve for the stowage and securing of accessories or bags in or on vehicles (bicycles, passenger motor vehicles, heavy goods vehicles, ships, aircraft etc.), for example as a tightening device on a bicycle luggage carrier.

Specifically, a fastener device of said type may for example be used on a holder, which can be tightened around a bicycle frame, for the purposes of fixing an assembly, for example a drinking bottle or a container, to the bicycle frame.

Furthermore, a fastener device of said type may be used for tensioning tarpaulins and sheets of any type, for example for tensioning tent tarpaulins or for tensioning a sunblind.

Military applications are also conceivable and possible. Accordingly, a fastener device may be used for the tensioning and stowage of weapons and munitions.

A fastener device of the described type may also be used in a tourniquet ligature system for ligating heavily bleeding wounds on a patient.

BRIEF DESCRIPTION OF THE DRAWINGS

The concept on which the solution is based will be discussed in more detail below on the basis of the embodiments illustrated in the figures, in which:

FIGS. 1A, 1B show views of a first exemplary embodiment of a fastener device;

FIGS. 2A, 2B show exploded views of the fastener device;

FIG. 3A shows a perspective view of the fastener device in a closed position;

FIG. 3B shows a side view of the arrangement as per FIG. 3A;

FIG. 3C shows a plan view of the fastener device;

FIG. 3D shows a sectional view along the line A-A as per FIG. 3C;

FIG. 3E shows a sectional view along the line B-B as per FIG. 3C;

FIG. 3F shows an enlarged view of a section of the view as per FIG. 3E;

FIG. 4A shows a view of the fastener device in an opened position;

FIG. 4B shows a side view of the arrangement as per FIG. 4A;

FIG. 4C shows a plan view of the fastener device;

FIG. 4D shows a sectional view along the line G-G as per FIG. 4C;

FIG. 4E shows a sectional view along the line I-I as per FIG. 4C;

FIG. 4F shows an enlarged view of a detail of the view as per FIG. 4E;

FIG. 5A shows a plan view of the fastener device in the opened position;

FIG. 5B shows a sectional view along the line Q-Q as per FIG. 5A;

FIG. 5C shows an enlarged view of the detail of the view as per FIG. 5B;

FIGS. 6A, 6B show exploded views of a further exemplary embodiment of a fastener device;

FIG. 7D shows a sectional view along the line A-A in FIG. 7C;

FIG. 8A shows a perspective view of the fastener device during the rotation of one fastener part relative to the other;

FIG. 8B shows a side view of the arrangement as per FIG. 8A;

FIG. 8C shows a plan view of the fastener device;

FIG. 10D shows a sectional view along the line D-D as per FIG. 10C;

FIG. 11A shows a perspective view of a further exemplary embodiment of a fastener device, in a closed position of the fastener device;

FIG. 11B shows a side view of the arrangement as per FIG. 11A;

FIG. 11C shows a plan view of the fastener device;

FIG. 11D shows a sectional view along the line A-A as per FIG. 11C;

FIG. 11E shows a sectional view of a modified exemplary embodiment along the line A-A as per FIG. 11C;

FIG. 17A shows a view of an exemplary embodiment of a fastener device, illustrating in particular a toothing means on the first fastener part;

FIG. 17B shows a view of the exemplary embodiment as per FIG. 17A, illustrating a toothing means on the second fastener part;

FIG. 17C shows a plan view of the fastener device;

FIG. 17D shows a sectional view along the line A-A as per FIG. 17C;

FIG. 18 shows a view of an exemplary embodiment of an application of the fastener device for tightening a shoe;

FIG. 19 shows a view of another exemplary embodiment of an application of the fastener device for tightening a shoe;

FIG. 54 shows a side view of the fastener device;

FIG. 55 shows a plan view of the fastener device;

FIG. 56 shows a sectional view along the line A-A as per FIG. 55;

FIG. 59 shows a view of a further exemplary embodiment of a fastener device for connecting two strap ends together;

FIG. 60 shows a view of the fastener device in a closed position;

DESCRIPTION OF THE INVENTION

Figure 7A:
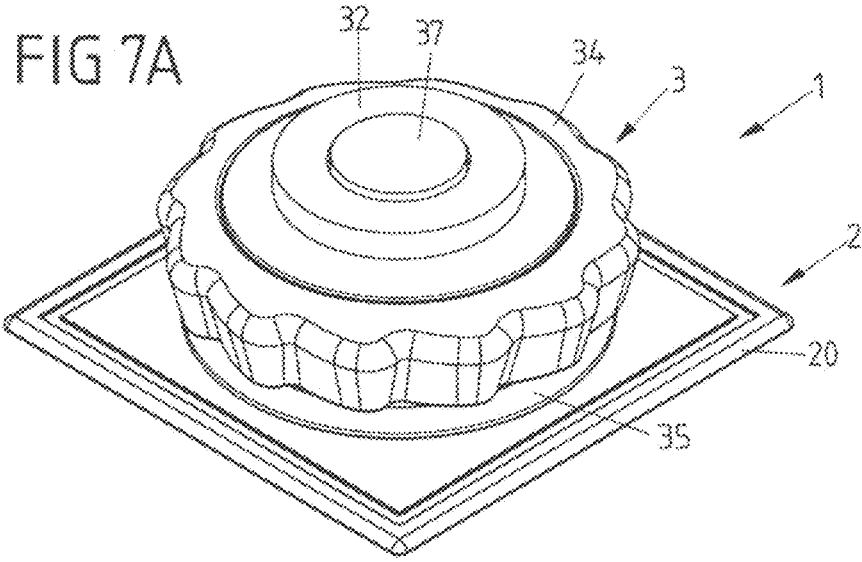
FIG. 7A shows a perspective view of the fastener device in a closed position.
Figure 7B:
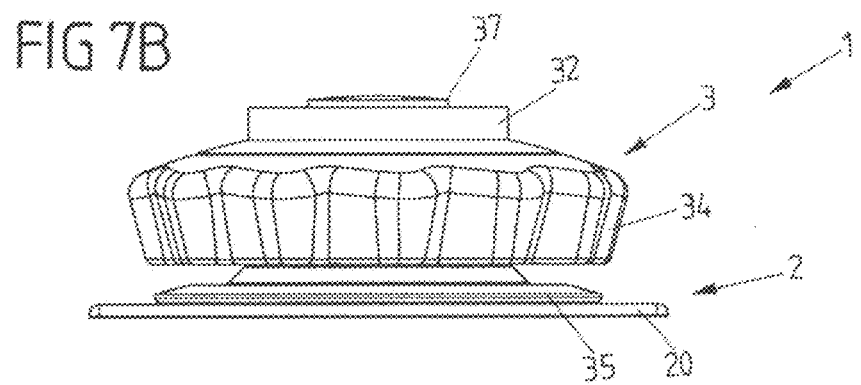
FIG. 7B shows a side view of the arrangement as per FIG. 7A.
Figure 7C:
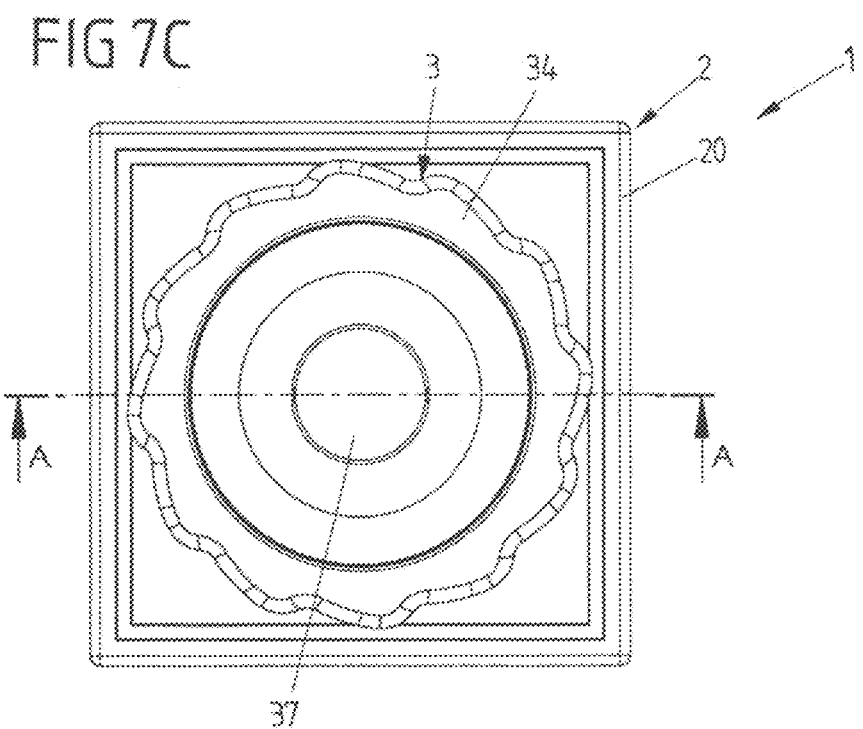
FIG. 7C shows a plan view of the fastener device.

FIGS. 1A, 1B to 5A-5C show an exemplary embodiment of a fastener device 1 in which fastener parts 2, 3 can be mounted on one another along a closing direction X and are held against one another in a closed position.

As can be seen from the exploded views as per FIGS. 2A and 2B, the first fastener part 2 has a main body 20 on which a cylinder portion 201 is formed. Running in encircling fashion around the cylinder portion 201 is a toothing 25, the teeth of which have a sawtooth-like form. A magnet element 23 is also arranged on the main body 20.

The second fastener part 3 has an actuating element 34 in the form of a handgrip and a winding element 35 which forms a channel 353 which is axially delimited by annular collars 352, 354 and in which a tension element 4 can be received in order to be wound up on the winding element 35. On the actuating element 34, there is secured a magnet element 33 which interacts with magnetically attractive action with the magnet elements 23 on the first fastener part 2.

On a side facing toward the first fastener part 2, a toothing 351 is formed on the winding element 35. During the mounting of the fastener parts 2, 3 on one another, said toothing 351 of the winding element 35 engages with the toothing 25 on the main body 20 of the first fastener part 2, as illustrated in FIGS. 3A-3F.

When the fastener parts 2, 3 have been mounted on one another, it is the case that the cylinder portion 201 engages into a central opening 350 of the winding element 35 such that, by means thereof, the winding element 35 is mounted rotatably and in axially movable fashion on the first fastener part 2.

Both the toothing 351 of the winding element 35 and the toothing 25 of the first fastener part 2 have a sawtooth-like form. This makes it possible, in the closed position of the fastener device 1, for the second fastener part 3 with the winding element 35 and the actuating element 34 to be rotated in a winding direction V relative to the first fastener part 2, wherein, the teeth of the toothings 25, 351 slide on one another and can be moved over one another, with the fastener parts 2, 3 being axially deflected relative to one another. The toothings 25, 351 thus provide a type of freewheel which, when the fastener parts 2, 3 have been mounted on one another, permits a rotation of the winding element 35 in the winding direction V, in order for a tension element 4 arranged on the winding element 35 to be tightened, but locks a movement counter to the winding direction V, such that the tension element 4 cannot be unwound counter to the winding direction V with the fastener parts 2, 3 mounted on one another.

As can be seen for example from FIGS. 3E and 3F, the teeth of the toothings 25, 351 each form an undercut which has the effect that, when the fastener parts 2, 3 are under load, the toothings 25, 351 are in engagement with one another with locking action counter to the winding direction V, and thus a rotational movement of the winding element 35 counter to the winding direction V relative to the first fastener part 2 is prevented. The engagement is rotationally conjoint, load-bearing and self-intensifying, owing to the undercut tooth flanks, which interact when load acts counter to the winding direction V, of the toothings 25, 351.

The winding element 35 is mounted rotatably on the actuating element 34 and, for this purpose, is held on the actuating element 34 rotatably, and so as to be axially displaceable along the closing direction X by a displacement travel, by means of holding elements 342 which engage over the annular collar 354 and which project inward from a base surface 340 of the actuating element 34. The holding elements 342 engage around the annular collar 354 and thereby produce a connection between the winding element 35 and the actuating element 34.

The actuating element 34 and the winding element 35 are furthermore couplable by engagement means 345, 355 such that the winding element 35 is, irrespective of position, movable together with the actuating element 34 or independently of the actuating element 34. A first engagement means 345 is in this case formed in the base surface 340 in the form of openings lined up in a row circumferentially around the closing direction X, which openings can be placed in operative connection with a second engagement means 355, which is formed on the annular collar 354 and which projects axially from the annular collar 354, in order to thereby couple the actuating element 34 to the winding element 35 for transmission of force in the winding direction V.

On the actuating element 34, there is arranged a cover element 32 which closes off the actuating element 34 at a side averted from the winding element 35 and, for this purpose, engages with detent action with the actuating element 34.

The actuating element 34 encloses, by means of a circumferential sidewall 344, a receiving space within which the winding element 35 is received, and held in an axially displaceable fashion, by means of its annular collar 354. Here, a cylinder projection 341 projects centrally from the base surface 340, which cylinder projection engages into the central opening 350 of the winding element 35 and thereby serves for the mounting of the actuating element 34 and the winding element 35 on one another rotatably about the closing direction X.

During the mounting of the fastener parts 2, 3 on one another, owing to magnetically attractive interaction of the Magna elements 23, 33, the toothing 351 on the inner side of the opening 350 of the winding element 35 engages with the toothing 25 around the cylinder portion 201, which furthermore engages with the opening 350 of the winding element 35, as illustrated in FIGS. 3A to 3F. Because, owing to the magnetic attraction force between the Magna elements 23, 33, the actuating element 34 is furthermore pulled toward the cylinder portion 201 of the body 20 of the first fastener part 2 and is thus moved with its base surface 340 closer to the annular collar 354 of the winding element 35, the engagement means 345, 355 of the actuating element 34 and of the winding element 35 engage with one another, such that the actuating element 34 and the winding element 35 enter into a functional operative connection with one another as illustrated in the sectional views in FIGS. 3D to 3F.

Owing to the operative connection between the actuating element 34 and the winding element 35 in the closed position, in the event of a rotation of the actuating element 34 in the winding direction V, the winding element 35 is moved together with the actuating element 34 and is thus rotated about the closing direction X, because actuating force is transmitted to the winding element 35 by means of the engagement of the engagement means 345, 355. Here, the toothings 25, 351 slide over one another, such that the winding element 35 is rotated relative to the first fastener part 2 and a tension element 4 is thus wound up onto the winding element 35.

Owing to the sawtooth-like, undercut form of the toothings 25, 351, a load introduced by the tension element 4 counter to the winding direction V cannot lead to the winding element 35 turning back. This is prevented by means of the engagement of the toothings 25, 351 into one another.

As can be seen in particular from the sectional views as per FIGS. 3E to 3F, the engagement means 355 of the winding element 35 is of sawtooth-like form, with sawtooth-like teeth with an oblique tooth flank and with an approximately vertical tooth flank. This sawtooth-like toothing 355 engages, in the engagement position, into the openings, which form the engagement means 345, in the base surface 340 of the actuating element 34, wherein this engagement is such that actuating forces in the winding direction V are introduced from the actuating element 34 into the winding element 35, and the winding element 35 is thus moved together with the actuating element 34 in the winding direction V, but, in the event of rotation of the actuating element 34 counter to the winding direction V, the engagement means 345, 355 can slide over one another and thus permit a relative movement of the actuating element 34 counter to the winding direction V relative to the winding element 35.

If the fastener parts 2, 3 are to be released from one another, then the second fastener part 3 can be simply pulled off from the first fastener part 2 counter to the closing direction X in a release direction L, as illustrated in FIGS. 4A to 4F, whereby the toothings 25, 351 disengage from one another and the fastener parts 2, 3 are separated from one another.

Because the magnetic attraction between the magnet elements 23, 33 is in this case eliminated, the engagement means 345, 355 disengage from one another, such that the winding element 35 can be rotated independently of the actuating element 34. This makes it possible, for example, for a tension element 4 arranged on the winding element 35 to be freely unwound with the fastener device 1 open.

Provision may be made whereby the engagement means 345, 355 of the actuating element 34 and of the winding element 35 disengage during the opening of the fastening device 1 for example owing to the action of gravitational force. However, in one advantageous embodiment, the actuating element 34, as illustrated in FIGS. 5A to 5C, by means of spring elements 343 which are arranged at the inner side of the base surface 340 and which in the example embodiment illustrated are formed by integrally formed spring projections, is spring-preloaded relative to the winding element 35 in the direction of the release position, in which the engagement means 345, 355 are not in engagement with one another, such that the actuating element 34 and the winding element 35 automatically and reliably disengage from one another during the opening of the fastener device 1, and thus the winding element 35 can be rotated independently of the actuating element 34 with the fastener device 1 open.

FIGS. 6A, 6B to 10A-10D show another exemplary embodiment which, with regard to the toothings 25, 351 that act between the first fastener part 2 and the winding element 35 and with regard to the engagement means 345, 355 that act between the winding element 35 and the actuating element 34 of the second fastener part 3, is of identical design to the exemplary embodiment described above on the basis of FIGS. 1A, 1B to 5A-5F, such that, in this regard, reference is made to the explanations above.

In addition, the exemplary embodiment as per FIGS. 6A, 6B to 10A-10D has a detent means 36 which is arranged on the second fastener part 3 and which serves for detaining the fastener parts 2, 3 together in the closed position such that the second fastener part 3 is held with detent action and thus positively locking action on the first fastener part 2 counter to the closing direction X.

The use of a detent means 36 of said type permits a non-magnetic form of the fastener device 1. It is thus basically possible for magnet elements to be omitted in the fastener device 1. It is however also conceivable and possible for magnet elements, as are present in the exemplary embodiment as per FIGS. 1A, 1B to 5A-5F to also be used in addition to the detent means 36.

The detent means 36 has an engagement element 38 which—as can be seen from FIG. 6B viewed together with FIG. 7D—is received with an annular collar 381 in axially movable fashion in a receiving space 322 within the cover element 32 mounted on the actuating element 34 and which is spring-preloaded relative to the base surface 340 of the actuating element 34 by means of a spring element 384 in the form of a spiral spring. On a cylindrical body 380 which extends from the annular collar 381, receiving openings 382 are formed diametrically opposite one another, in which receiving openings there are received detent elements 385 in the form of balls which serve for engaging, in the closed position of the fastener device 1 (FIGS. 7A to 7D), with detent action into a detent recess 202 in the form of an annular groove running in encircling fashion on the inner side of an opening 200 of the cylinder portion 201 of the first fastener part 2, such that, by means thereof, as can be seen from FIG. 7D, there is detent engagement between the engagement element 38, which in the closed position engages into the opening 200 of the cylinder portion 201, and the cylinder portion 201, and, by means thereof, the fastener parts 2, 3 are detained together.

Within a central opening 383 of the engagement element 38, an operating element 37 is guided axially along the closing direction X. The operating element 37 has a cylindrical design, is supported elastically on the first fastener part 2 in the closed position by means of a spring element 374 situated in an opening 373 in the form of a blind bore, and is furthermore in contact, by means of an annular collar 371 at an end side, in a travel-limiting manner with the engagement element 38 when said operating element not actuated relative to the engagement element 38.

As can be seen from FIGS. 6A, 6B viewed together with FIG. 7D, the operating element 37 has, on its outer circumferential surface, two diametrically oppositely situated unlocking openings 372, which, in the closed position, are arranged at an axially different height in relation to the detent elements 385, as can be seen from FIG. 7D, such that the detent elements 385 are in contact with the outer circumferential surface of the cylindrical body 370 of the operating element 37 and, by means thereof, are held in detent engagement with the detent recess 202 on the inner side of the cylinder portion 201.

In the closed position (FIG. 7A to 7D), the actuating element 34 is, owing to the spring preload of the spring element 384, pushed in the direction of the first fastener part 2 and, owing to contact of the base surface 240 against the annular collar 354 of the winding element 35, the winding element 35 is pushed into engagement with the toothing 25 of the first fastener part 2, as can be seen from FIG. 7D. In the closed position, the second fastener part 3 is thus held with detent action on the first fastener part 2, with existing engagement between the engagement means 345, 355 of the actuating element 34 and of the winding element 35 and additionally with toothing engagement between the winding element 35 and the first fastener part 2.

Figure 8D:
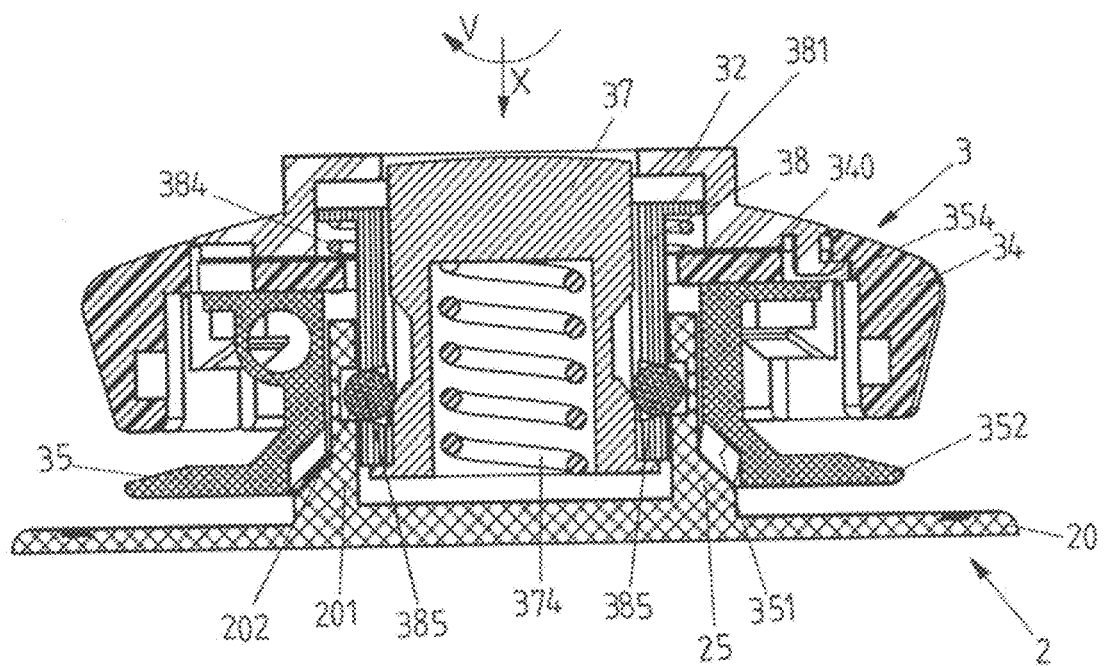
FIG. 8D shows a sectional view along the line B-B as per FIG. 8C.

If, in the closed position of the fastener device 1, the actuating element 34 and thus, owing to the engagement of the engagement means 345, 355, the winding element 35 together with the actuating element 34 are rotated in the winding direction V, the toothings 25, 351 slide over one another, which causes a (small) axial movement of the winding element 35 and, by means thereof, of the actuating element 34, as is illustrated in FIGS. 8A-8D. Here, because the engagement element 38 of the detent means 36 is held axially fixed relative to the cylinder portion 201 of the first fastener part 2 by means of the detent elements 385, the axial deflection of the winding element 35 and of the actuating element 34 takes place counter to the spring preload of the spring element 384, as is illustrated in FIG. 8D.

After rotation of the actuating element 34 and of the winding element 35, the toothings 25, 351 then engage with one another again owing to the spring preload of the spring element 384, with abutment of the annular collar 352 against the body 20 of the first fastener part 2 (correspondingly to the position as per FIGS. 7A to 7D).

Figure 9A:
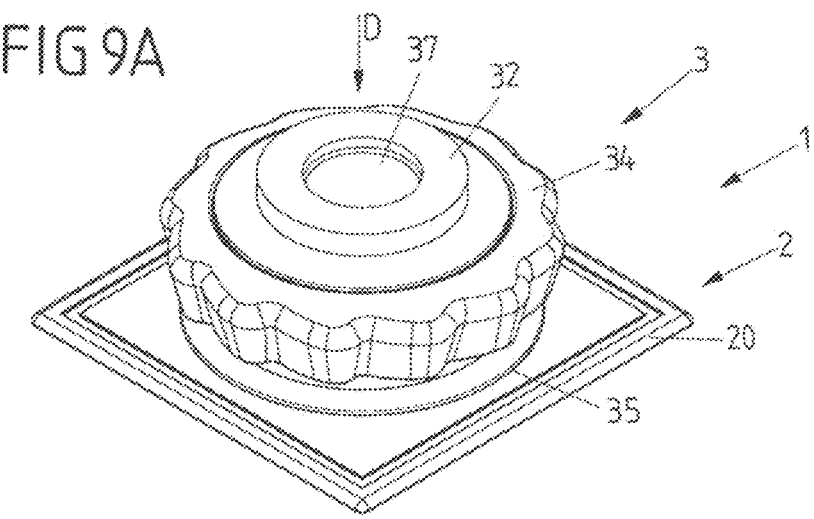
FIG. 9A shows a perspective view of the fastener device during the opening process.
Figure 9B:
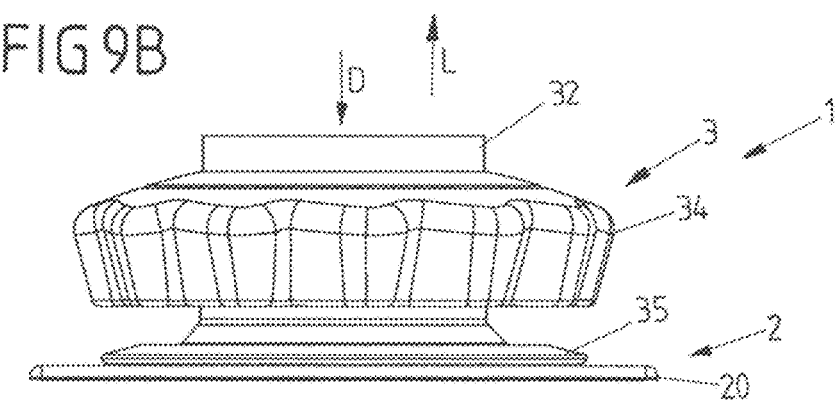
FIG. 9B shows a side view of the arrangement as per FIG. 9A.
Figure 9C:
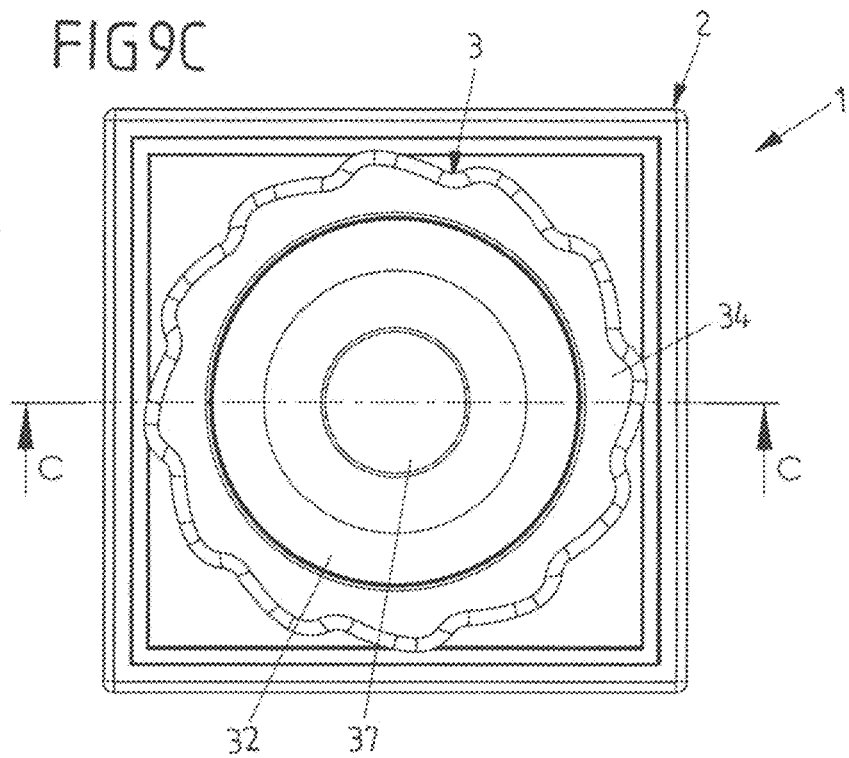
FIG. 9C shows a plan view of the fastener device.
Figure 9D:
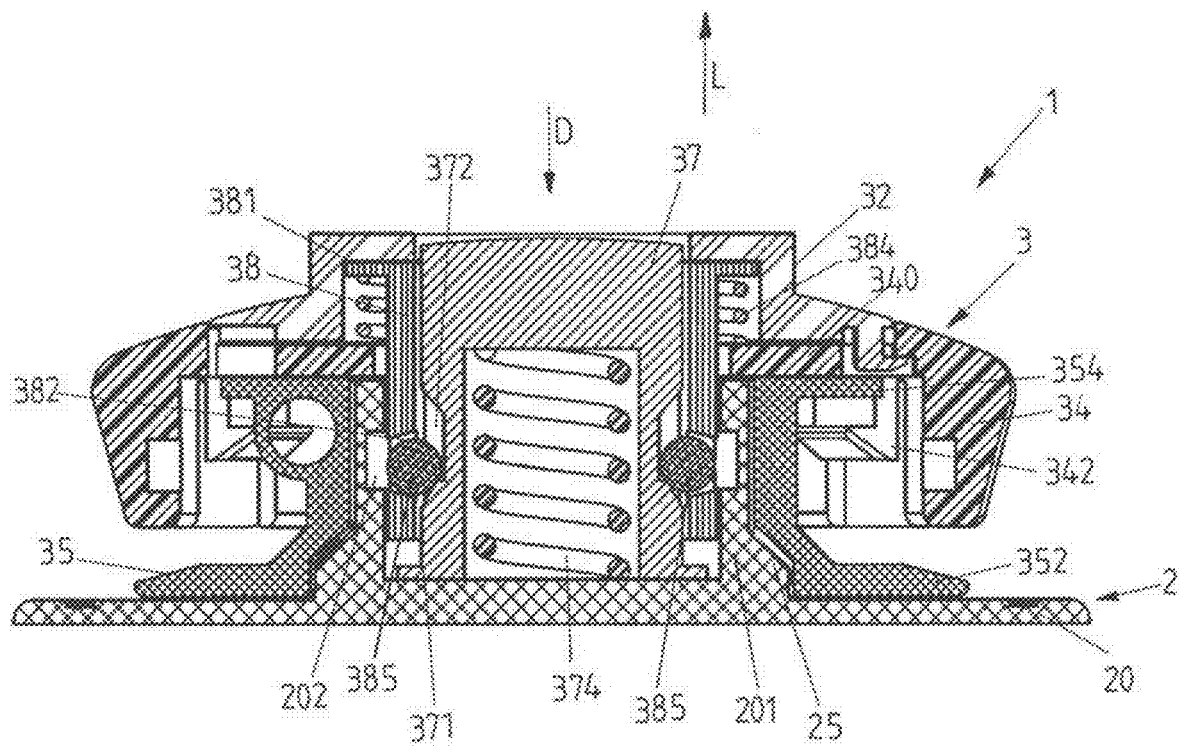
FIG. 9D shows a sectional view along the line C-C in FIG. 9C.
Figure 10A:
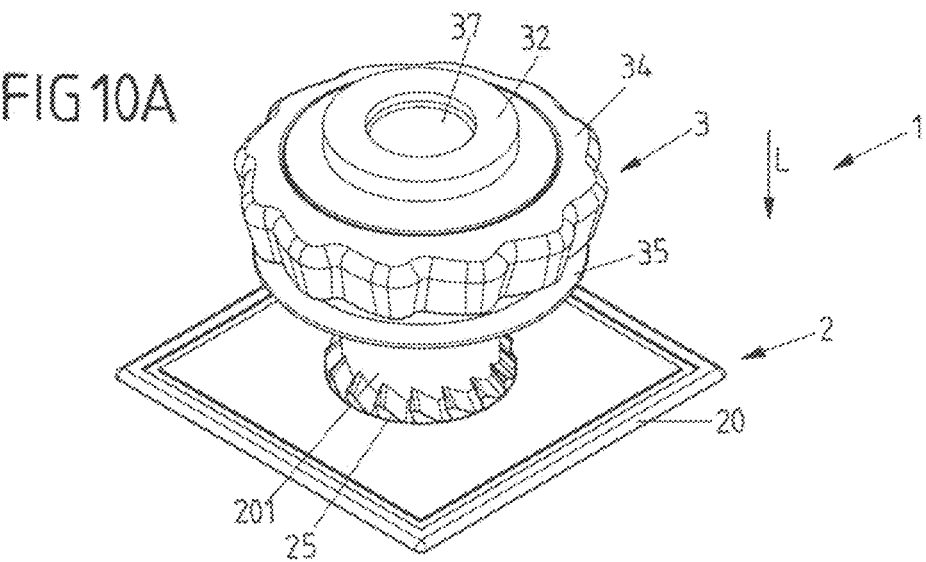
FIG. 10A shows a perspective view of the fastener device in an opened position.
Figure 10B:
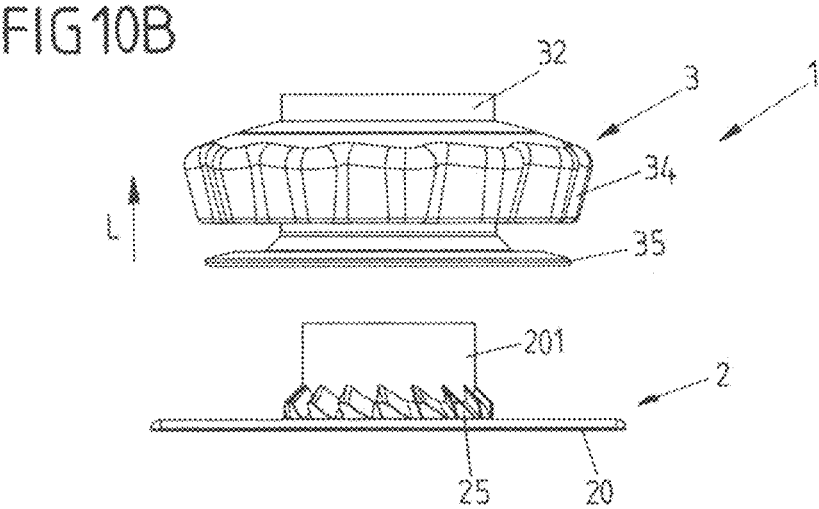
FIG. 10B shows a side view of the view as per FIG. 10A.
Figure 10C:
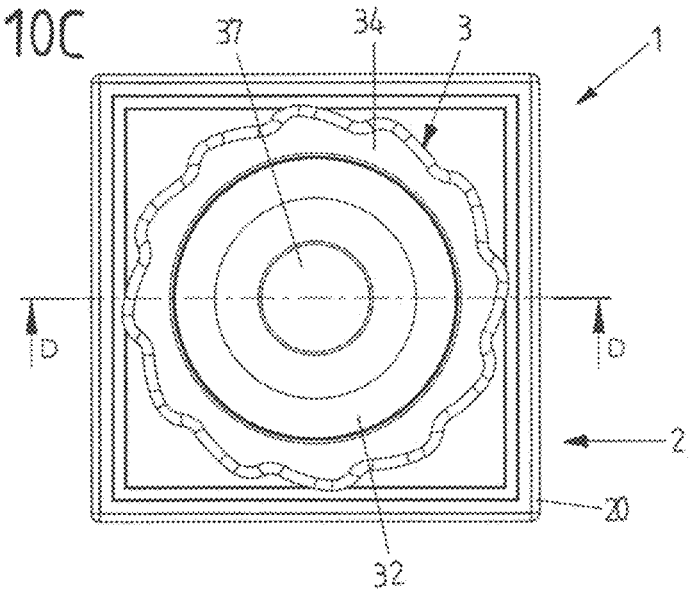
FIG. 10C shows a plan view of the fastener device.

For the release of the fastener parts 2, 3 from one another, a user can push the operating element 37 into the engagement element 38 in an actuating direction D, as illustrated in FIGS. 9A to 9D. In this way, the body 370 of the operating element 37 is adjusted axially along the closing direction X within the engagement element 38, such that the unlocking openings 372 move to the same axial height as the detent elements 385, and the detent elements 385 can thus deflect radially inward, as is illustrated in FIG. 9D. In this way, the locking detent engagement between the engagement element 38 and the cylinder portion 201 is eliminated, such that the fastener parts 2, 3 can be removed from one another counter to the closing direction X, i.e. in the release direction L.

FIGS. 10A to 10D show the fastener device 1 in its open position. In the opened position, the fastener parts 2, 3 are separated from one another, wherein, owing to the action of gravitational force or else owing to a spring preload, the actuating element 34 and the winding element 35 with their engagement means 345, 355 are disengaged, such that the winding element 35 can be rotated independently of the actuating element 34, and therefore a tension element arranged on the winding element 35 can possibly be unwound.

For the closing of the fastener device 1 again, the second fastener part 3 can be mounted onto the first fastener part 2 again in the closing direction X, whereby the engagement element 38 engages with the opening 200 of the cylinder portion 201 and the detent elements 385 engage with detent action into the detent recess 202 in the form of the encircling groove within the cylinder portion 201. In this way, the toothings 25, 351 also enter into toothing engagement with one another, and the fastener device 1 assumes the closed position illustrated in FIG. 7A to 7D.

FIGS. 11A to 11E show to exemplary embodiments which are modified in relation to the exemplary embodiment as per FIGS. 6A, 6B to 10A-10D, which are on the one hand of magnetic design and are on the other hand of non-magnetic design.

Viewed externally, the two exemplary embodiments are similar (see FIGS. 11A to 11C), but differ (slightly) in terms of their internal design, as can be seen from the views as per FIGS. 11D and 11E.

In both exemplary embodiments, the detent means 36 has an engagement element 38 on which there is formed a continuous bore 387 which extends transversely with respect to the closing direction X and in which two spherical detent elements 385 are arranged and preloaded relative to one another by means of a spring element 386. When the fastener parts 2, 3 are mounted on one another, the engagement element 38 engages with the cylinder portion 201, and the detent elements 385 engage with detent action with the detent recess 202 on the inner side of the opening 200 of the cylinder portion 201, as can be seen from FIGS. 11D and 11E.

Here, the detent engagement is maintained in the closed position owing to the spring preload by means of the spring element 386. If it is intended to release the detent engagement, then the second fastener part 3 can, with sufficient exertion of force, be pulled off the first fastener part 2 counter to the closing direction X, whereby the detent elements 385 are automatically, by running onto the upper edge of the groove-like detent recess 202, offset radially inward and thus disengaged from the detent recess 202. The detent engagement between the fastener parts 2, 3 can thus be released without separate actuation of the engagement element 38.

While the exemplary embodiment as per FIG. 11D is of purely mechanical form, the modified exemplary embodiment as per FIG. 11E is of magnetic form by virtue of the fact that a magnet element 23 is arranged on the body 20 of the first fastener part 2 and, furthermore, a magnet element 33 is arranged on the body 380 of the engagement element 38, as can be seen from the sectional view as per FIG. 11E. The fastener parts 2, 3 thus (also) magnetically interact, which facilitates the mounting of the fastener parts 2, 3.

Moreover, the exemplary embodiments as per FIGS. 11D and 11E are functionally identical to the previously described exemplary embodiments, so that reference may be made to that which has been stated above in this regard.

In the exemplary embodiments described above, the toothing means 25, 351 on the first fastener part 2 and on the second fastener part 3 may basically be designed very differently in order, in the closed position, to produce positive locking hold (which can withstand load at least up to a certain threshold torque) between the fastener parts 2, 3.

In the exemplary embodiment as per FIGS. 1A, 1B to 5A-5C, the toothing means 25, 351 are formed with undercuts such that a movement of the winding element 35 counter to the winding direction V in the closed position is locked. This is however to be understood merely as an example, and may basically also be configured differently, as will be discussed below on the basis of FIGS. 12A, 12B to 16A, 16B.

FIGS. 12A, 12B to 16A, 16B show different embodiments of toothing means 25, 351 which differ in terms of the geometry of their teeth and which can be used in a fastener device 1 of the type described here.

Figure 12A:
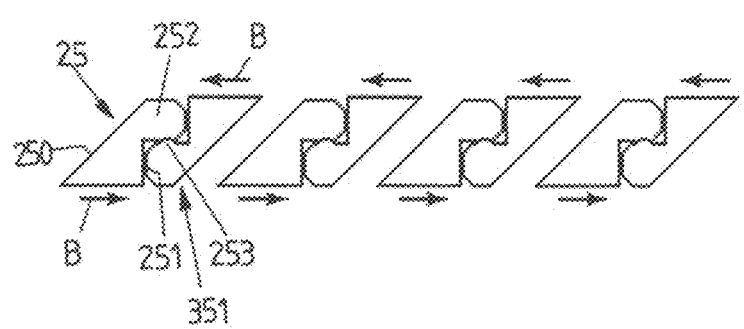
FIG. 12A shows a schematic view of an exemplary embodiment of toothing means.
Figure 12B:
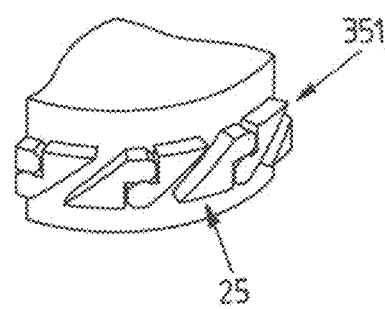
FIG. 12B shows a perspective view of the toothing means as per FIG. 12A.

Accordingly, in the exemplary embodiment as per FIGS. 12A, 12B, the teeth of each toothing means 25, 351 have a tooth flank which extends obliquely relative to the closing direction X and which is in the form of a run-on bevel 250, and an approximately vertically extending tooth flank 251 with a projection element 252 which is formed on said tooth flank and which projects along the winding direction V. In the event of a load acting in a loading direction B opposite to the winding direction V, the projection elements 252 of the teeth of the toothing means 25, 351 engage with one another, such that a movement of the toothing means 25, 351 in the loading direction B (counter to the winding direction V) is blocked. The winding element 35 thus cannot be rotated in the loading direction B counter to the winding direction V relative to the first fastener part 2 when the fastener device 1 is situated in its closed position.

In the exemplary embodiment as per FIGS. 12A, 12B, a detent lug 253 is additionally formed on the projection element 252 of each tooth (or at least some of the teeth) of the toothing means 351, which detent lug can for example engage with detent action with an associated detent hollow on the projection element 252 of an associated tooth of the toothing means 25 in order to additionally lock the locking engagement of the teeth of the toothing means 25, 351 in the event of load acting in the loading direction B.

Figure 13A:
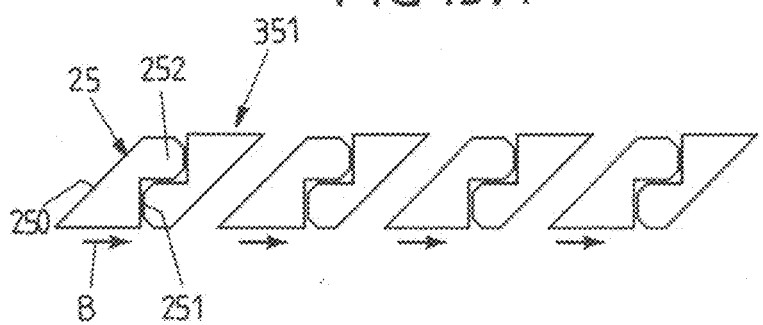
FIG. 13A shows a schematic view of another exemplary embodiment of toothing means.
Figure 13B:
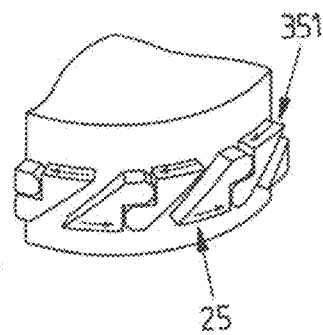
FIG. 13B shows a perspective view of the toothing means as per FIG. 13A.

The exemplary embodiment as per FIGS. 13A, 13B is identical to the exemplary embodiment as per FIGS. 12A, 12B aside from the fact that, in the exemplary embodiment as per FIGS. 13A, 13B, no detent lugs 253 as in the exemplary embodiment as per FIGS. 12A, 12B are provided on the projection elements 252 of the teeth of the toothing means 351.

Figure 14A:
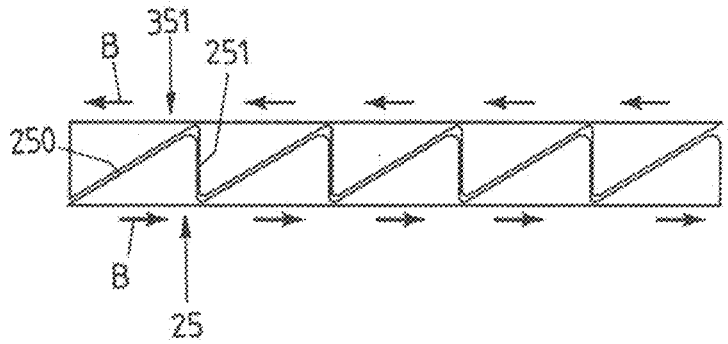
FIG. 14A shows a schematic view of yet another exemplary embodiment of toothing means.
Figure 14B:
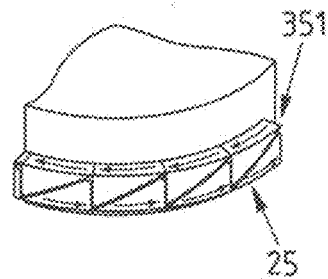
FIG. 14B shows a perspective view of the toothing means as per FIG. 14A.

In the exemplary embodiment as per FIGS. 14A, 14B, the toothing means 25, 351 are in the form of sawtooth-like toothings. The teeth of the toothing means 25, 351 in this case have in each case one tooth flank in the form of a run-on bevel 250 and one vertically extending tooth flank 251. A loading of the toothing means 25, 351 in a loading direction B opposite to the winding direction V is locked.

Figure 15A:
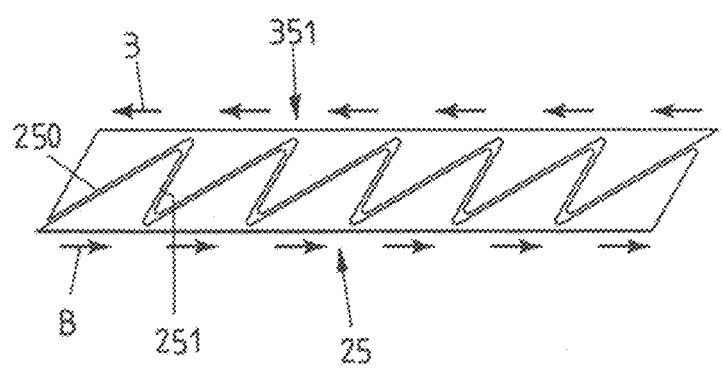
FIG. 15A shows a schematic view of yet another exemplary embodiment of toothing means.
Figure 15B:
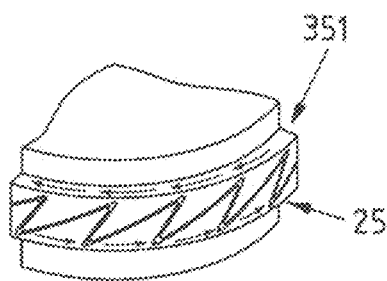
FIG. 15B shows a perspective view of the toothing means as per FIG. 15A.

In an exemplary embodiment illustrated in FIGS. 15A, 15B, the teeth of the toothing means 25, 351 are, in relation to the exemplary embodiment as per FIGS. 14A, 14B, undercut at the tooth flanks 251, that is to say are inclined obliquely relative to the closing direction X. This corresponds to the exemplary embodiment as per FIGS. 1A, 1B to 5A-5C. In the event of the toothing devices 25, 351 being subjected to load in a loading direction B opposite to the winding direction V, the toothing means 25, 351 are locked relative to one another.

In the exemplary embodiments as per FIGS. 12A, 12B, 13A, 13B and 15A, 15B, the engagement of the toothing means 25, 351 is self-boosting in the event of load acting in the loading direction B. The fastener parts 2, 3 are thus pulled toward one another in the closing direction X under the action of load. Owing to the positive locking by means of the projection elements 252 or owing to the undercut, the fastener device 1 is furthermore also locked against opening counter to the closing direction X. It is in particular also possible for loading forces which act not purely tangentially, but rather with a component counter to the closing direction X, to be accommodated and dissipated.

Figure 16A:
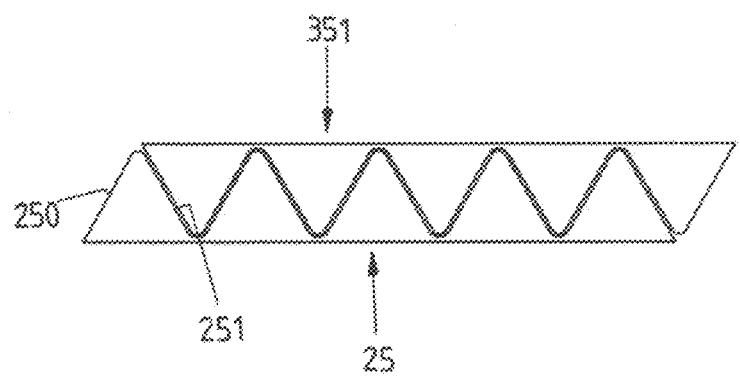
FIG. 16A shows a schematic view of yet another exemplary embodiment of toothing means.
Figure 16B:
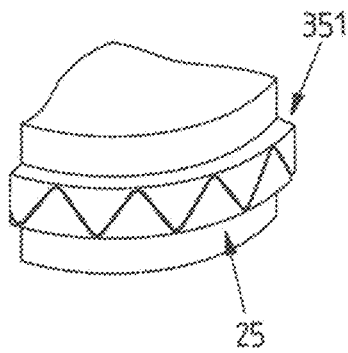
FIG. 16B shows a perspective view of the toothing means as per FIG. 16A.

In the exemplary embodiment as per FIGS. 16A, 16B, the teeth of the toothing means 25, 351 are inclined obliquely at both tooth flanks 250, 251 such that they form a run-on bevel and, when a sufficient force acts between the toothing means 25, 351, the toothing means 25, 351 can slide over one another in the winding direction V and also counter to the winding direction V, with the toothing means 25, 351 axially deflecting relative to one another. In the exemplary embodiment as per FIGS. 16A, 16B, the toothing means 25, 351 are thus not locked relative to one another either in the winding direction V or counter to the winding direction V, but rather can slide over one another in the manner of a ratchet if the torque acting between the toothing means 25, 351 is sufficiently high.

In an exemplary embodiment illustrated in FIGS. 17A-17D, the teeth of the toothing means 25, 351 extend, at their tooth backs, as in the case of a conical gearwheel, obliquely relative to the winding direction V and also relative to the closing direction X, which can increase the size of those surfaces of the teeth of the toothing means 25, 351 which are in engagement with one another and supported on one another in the event of load acting counter to the winding direction V.

FIGS. 18 to 51 show different exemplary embodiments of uses of a fastener device 1 which may be designed according to an exemplary embodiment of the type described above.

In the exemplary embodiment as per FIG. 18, the fastener device 1 serves for closing and tightening a shoe 5. The fastener part 3 may, for this purpose, be mounted onto the fastener part 2 on a tongue of the shoe 5 in order to tighten a tension element 4 in the form of a shoelace.

FIG. 19 shows another exemplary embodiment of a shoe 5, which differs from the exemplary embodiment as per FIG. 18 in terms of the winding of the tension element 4 in the form of the shoelace.

In the exemplary embodiment as per FIGS. 18 and 19, one end of the tension element 4 in the form of the shoelace is fixed to the fastener part 3 of the fastener device 1 and can be tightened by rotation of the actuating element 34 together with the winding element 35 relative to the fastener part 2. The tightening is in this case also possible manually by virtue of the fastener part 3 being pulled, and the tension element 4 in the form of the shoelace thereby being tightened, before the fastener part 3 is fixed to the fastener part 2.

Figure 20:
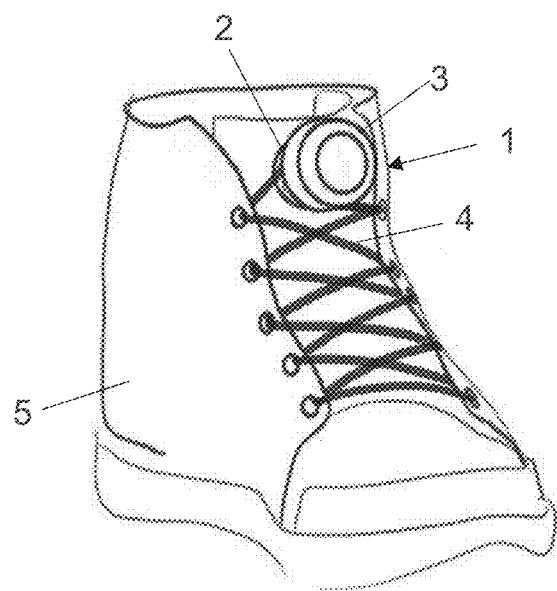
FIG. 20 shows a view of yet another exemplary embodiment of an application of the fastener device for tightening a shoe.
Figure 21:
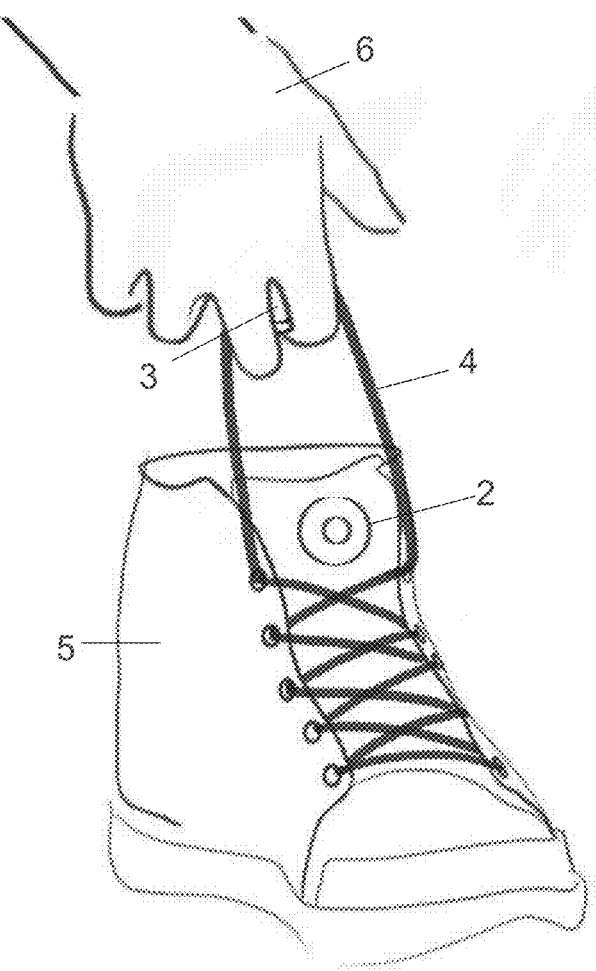
FIG. 21 shows a view of the exemplary embodiment as per FIG. 20 during the tightening of the shoe.
Figure 22:
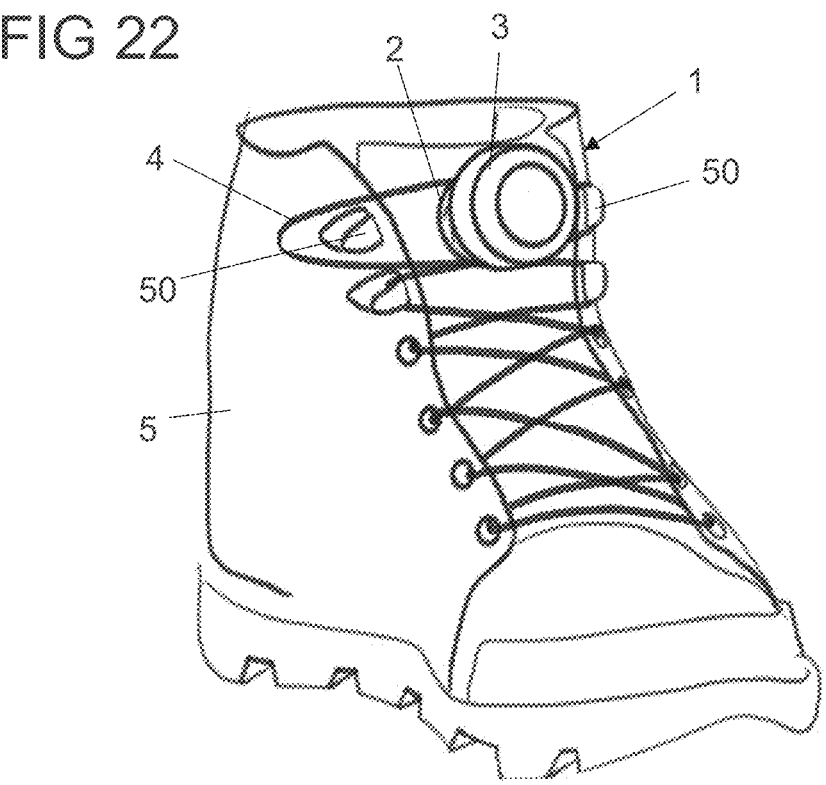
FIG. 22 shows a view of yet another exemplary embodiment of an application of the fastener device for tightening a shoe.

In the exemplary embodiment as per FIGS. 20 and 21, two ends of the tension element 4 in the form of the shoelace, which in this case is wound as a loop, are connected to the fastener part 3 of the fastener device 1, such that, by rotation of the fastener part 3 relative to the fastener part 2, the tension element 4 in the form of the shoelace can be wound up with two ends and thus tightened. As illustrated in FIG. 21, before the fastener part 3 is arranged on the fastener part 2, it is possible to perform manual tightening of the tension element 4 by pulling on the tension element 4 using a hand 6.

In the exemplary embodiment as per FIG. 22, it is again the case that two ends of the tension element 4 in the form of the shoelace are connected to the fastener part 3 of the fastener device 1 and can thus be wound up, in order to close and tighten the shoe 5, by rotating the fastener part 3 relative to the fastener part 2. The tension element 4 in the form of the shoelace is in this case laid around tightening elements 50, such that the shoe 5 can be tightened by winding the tension element 4 onto the winding element 35 of the fastener part 3.

Figure 23:
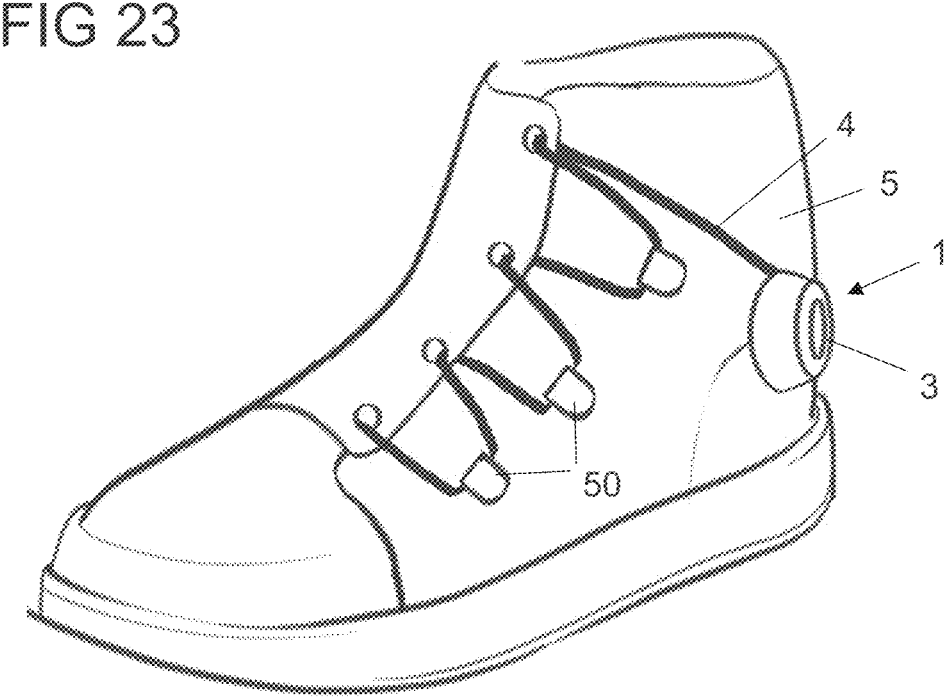
FIG. 23 shows a view of yet another exemplary embodiment of an application of the fastener device for tightening a shoe.

FIG. 23 shows another exemplary embodiment, in which the tension element 4 has been laid around tightening elements 50 and is arranged with one end on the fastener part 3 of the fastener device 1 and can thus be tightened by means of the fastener device 1.

Figure 24:
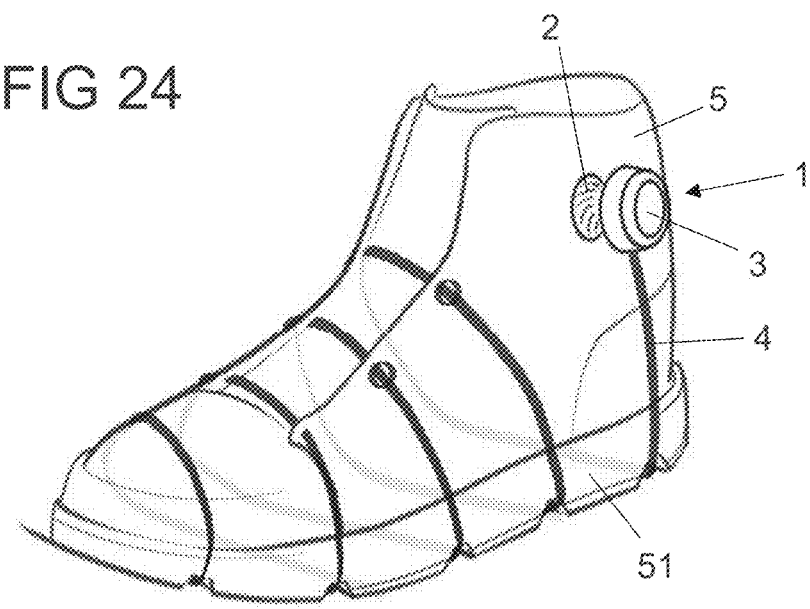
FIG. 24 shows a view of yet another exemplary embodiment of an application of the fastener device for tightening a shoe.

In the exemplary embodiment as per FIG. 24, the tension element 4 in the form of the shoelace has (also) been laid around the sole 51 of the shoe 5 and connected by means of one end to the fastener part 3 of the fastener device 1, such that the shoe 5 can be closed and tightened by means of the fastener device 1.

Figure 25:
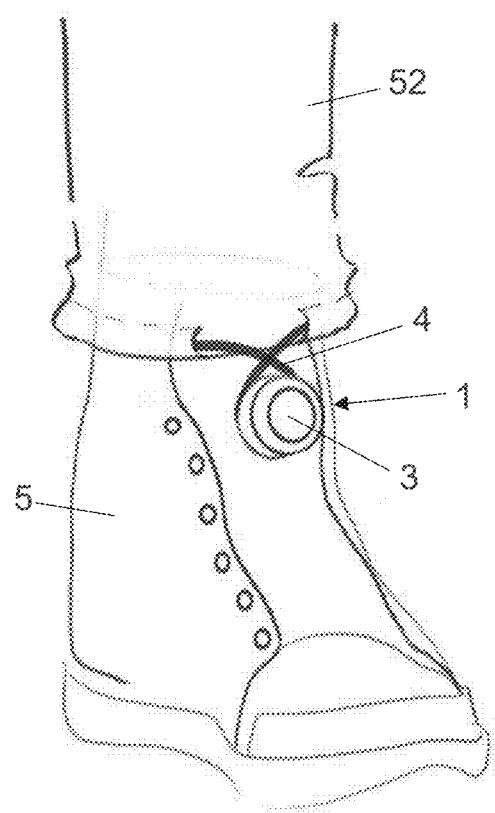
FIG. 25 shows a view of an exemplary embodiment of the fastener device for tightening a trouser leg.

In the exemplary embodiment illustrated in FIG. 25, the fastener device 1 serves for bracing a trouser leg 52 together with a shoe 5 by means of a tension element 4 in the form of a band. For this purpose, the tension element 4 extends around the trouser leg 52 and is fixed by means of the fastener device 1 to the shoe 5, such that the trouser leg 52 can be braced relative to the shoe 5 by rotation of the fastener part 3 relative to the fastener part 2.

Figure 26:
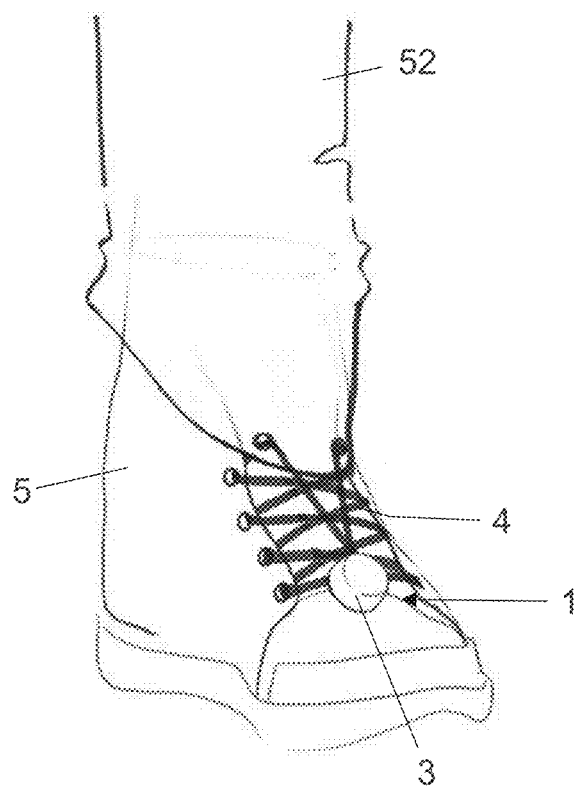
FIG. 26 shows a view of an exemplary embodiment of an application of the fastener device for bracing a trouser leg together with a shoe.

Another exemplary embodiment is shown in FIG. 26. In this exemplary embodiment, a trouser leg 52 can again be braced relative to a shoe by virtue of the fact that a tension element 4 which extends through eyelets in the trouser leg 52 can be braced relative to the shoe 5 by means of the fastener device 1.

Figure 27:
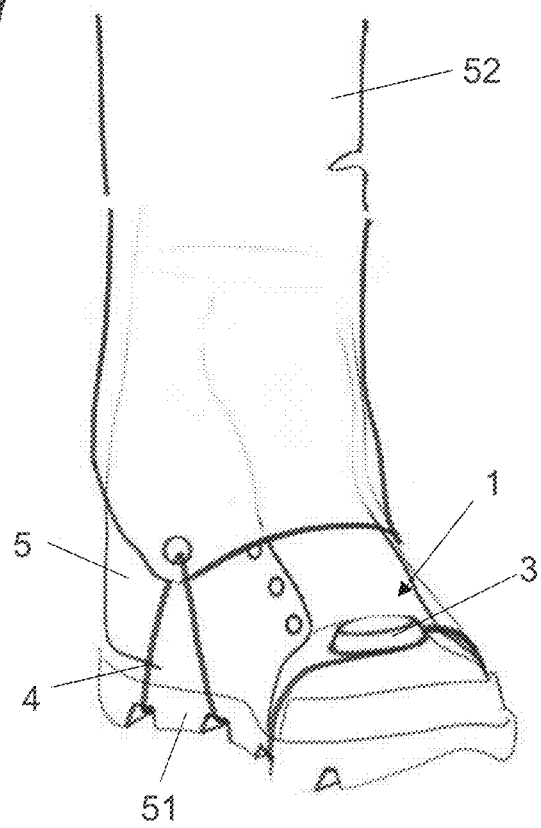
FIG. 27 shows a view of another exemplary embodiment of an application of the fastener device for tightening a trouser leg on a shoe.

It is also the case in the exemplary embodiment as per FIG. 27 that a trouser leg 52 can be braced relative to a shoe, wherein, in this case, the tension element 4 extends in the form of a band around the sole 51 of the shoe 5 and can be braced on the shoe 5 by means of the fastener device 1.

Figure 28:
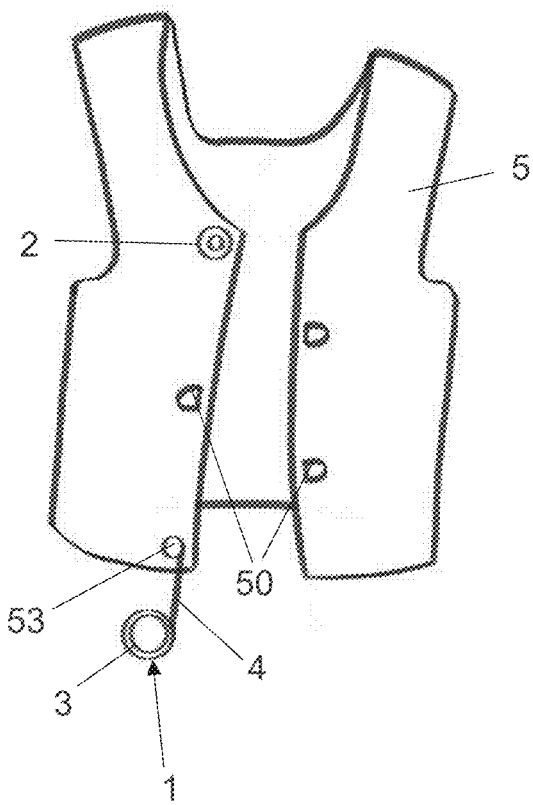
FIG. 28 shows a view of an exemplary embodiment of an application of the fastener device for closing an article of clothing.
Figure 29:
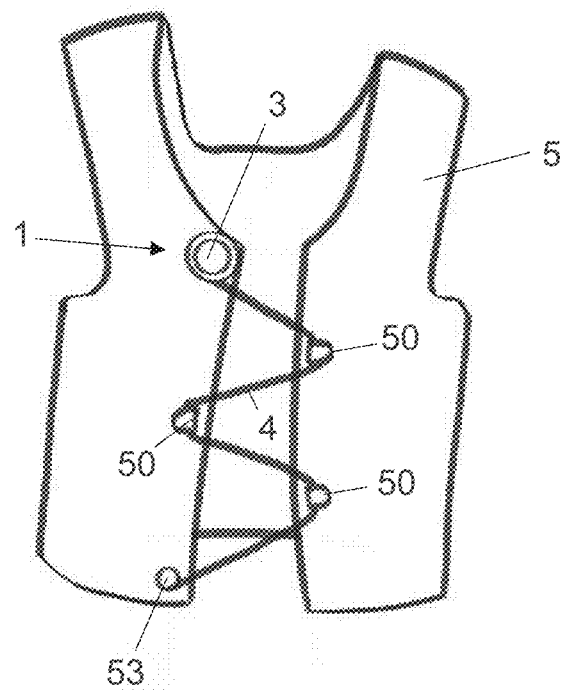
FIG. 29 shows a view of the exemplary embodiment as per FIG. 28, in the case of a closed article of clothing.

In the exemplary embodiment as per FIGS. 28 and 29, the fastener device 1 serves for closing and tightening an article of clothing 5, for example a vest or a jacket. The tension element 4 in the form of a band or a cord is fixed at a fastening point 53 to the article of clothing 5 and can be laid around tightening elements 50 on both sides of an opening slot of the article of clothing 5 in order to thereby close the article of clothing 5 as illustrated in FIG. 29. By virtue of the fastener part 3 being arranged on the fastener part 2 and the fastener part 3 being rotated relative to the fastener part 2, the article of clothing 5 can then be tightened.

Figure 30:
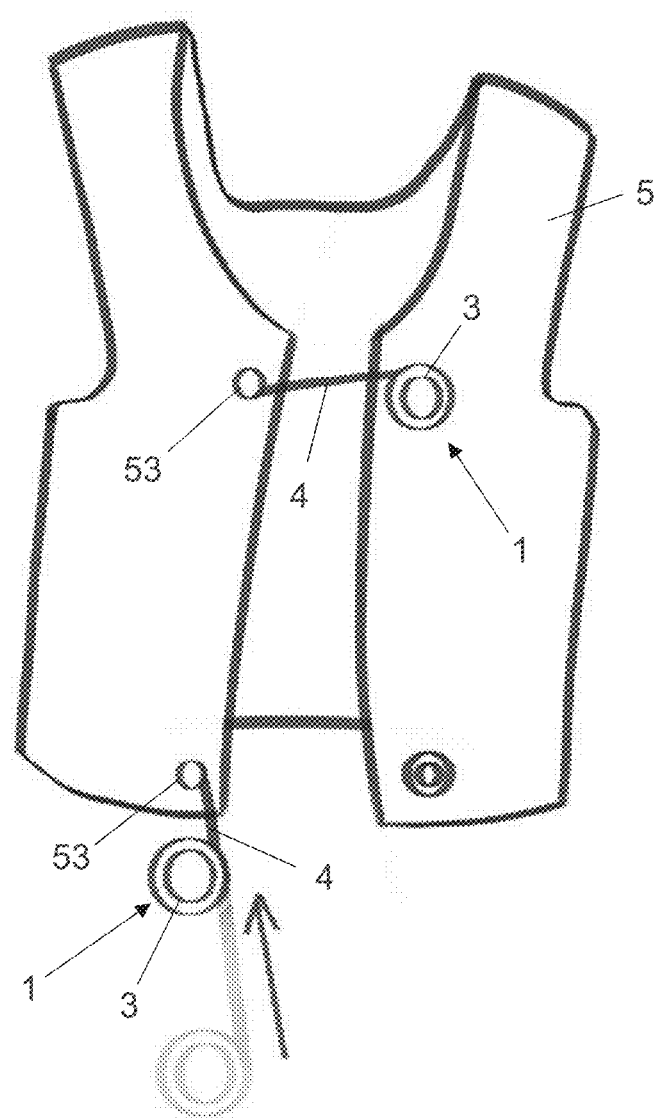
FIG. 30 shows a view of another exemplary embodiment of an application of the fastener device for closing an article of clothing.

It is also the case in the exemplary embodiment as per FIG. 30 that the fastener device 1 serves for closing an article of clothing 5, wherein, in this case, two fastener devices 1 are provided for tightening two tension elements 4. The tension elements 4 are fixed in each case on one side of the opening slot of the article of clothing 5 at a fastening point 53 and can be tightened by virtue of the respective fastener part 3 being arranged on the associated fastener part 2 of the fastener device 1 on the other side of the opening slot of the article of clothing 5.

Figure 31:
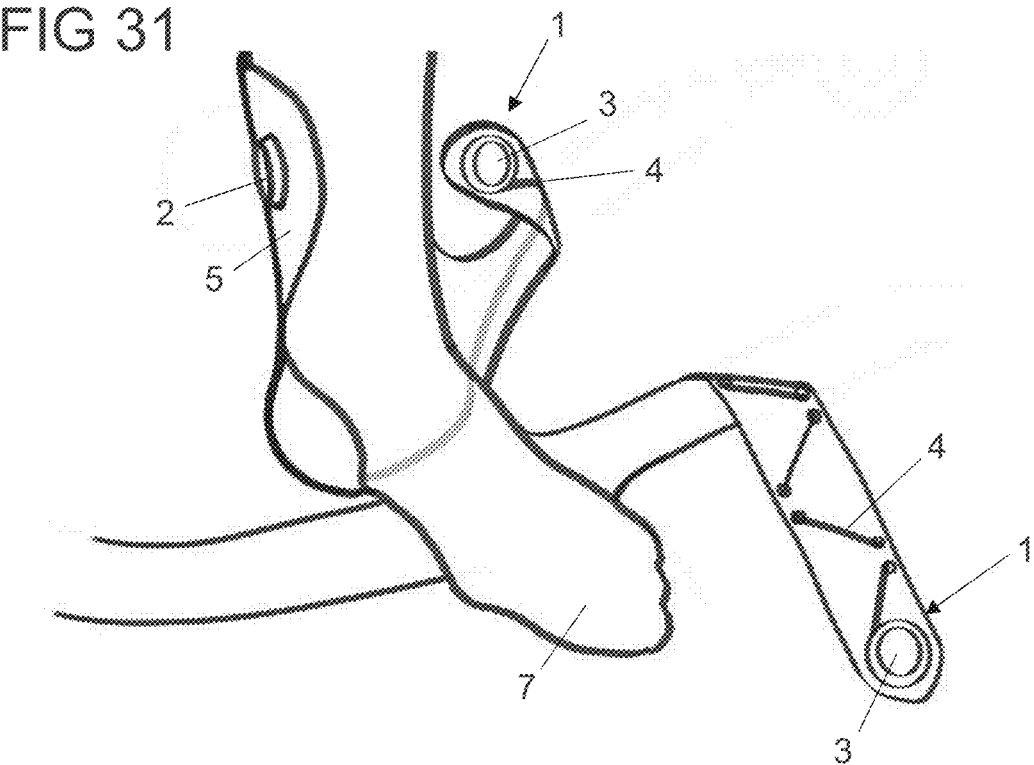
FIG. 31 shows a view of an exemplary embodiment of an application of the fastener device for closing and tightening a medical aid.
Figure 32:
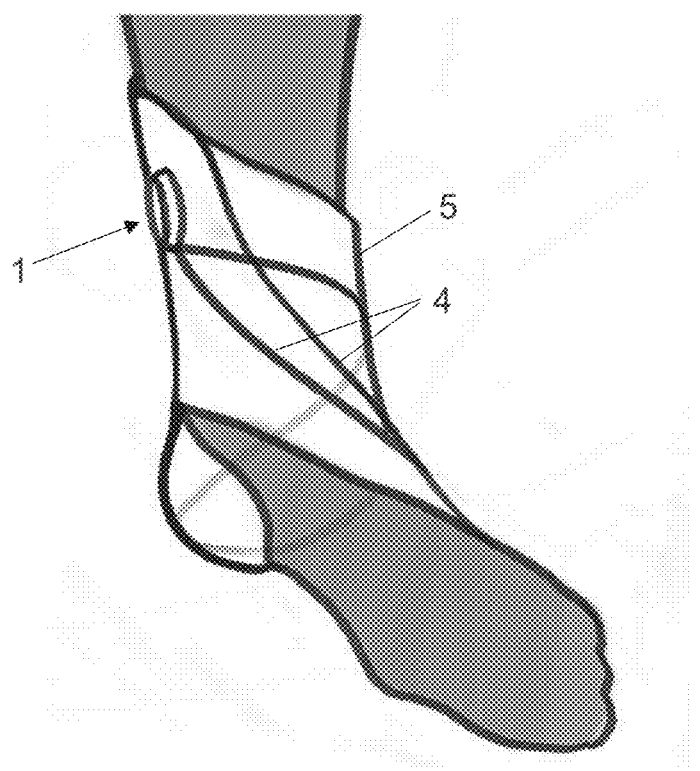
FIG. 32 shows a view of the exemplary embodiment as per FIG. 31, in a closed and tightened state.

In the exemplary embodiment as per FIGS. 31 and 32, the fastener device 1 serves for closing and tightening a medical aid 5 in the form of an ankle bandage on a foot 7. By virtue of the fastener part 3, which is connected to one end of the ankle bandage, being arranged on the fastener part 2, which is connected to another end of the ankle bandage, and the tension element 4 extending on the ankle bandage being tightened, the ankle bandage can be closed and tightened.

Figure 33:
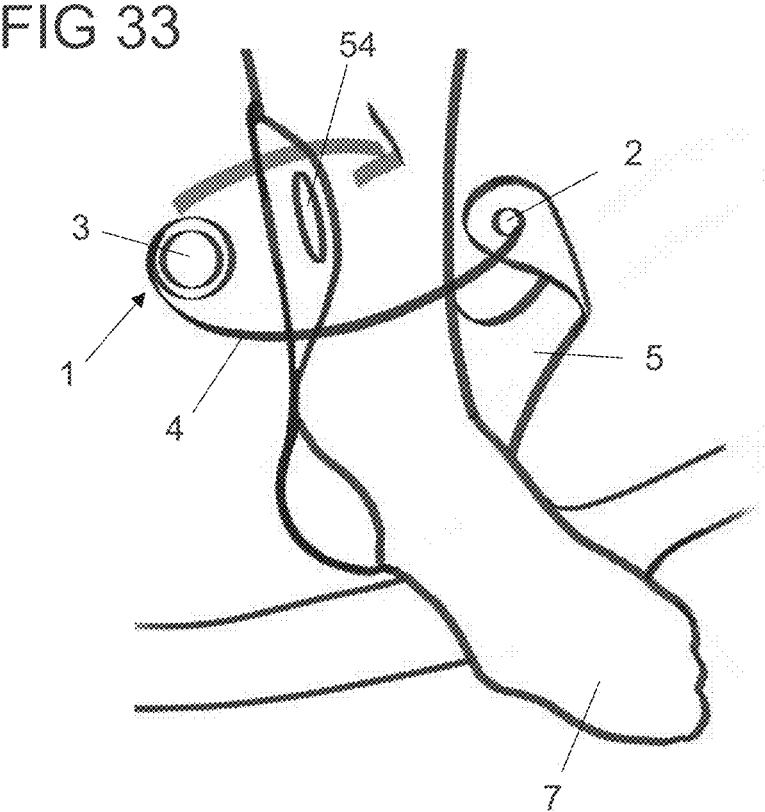
FIG. 33 shows a view of another exemplary embodiment of an application of the fastener device for closing and tightening a medical aid.
Figure 34:
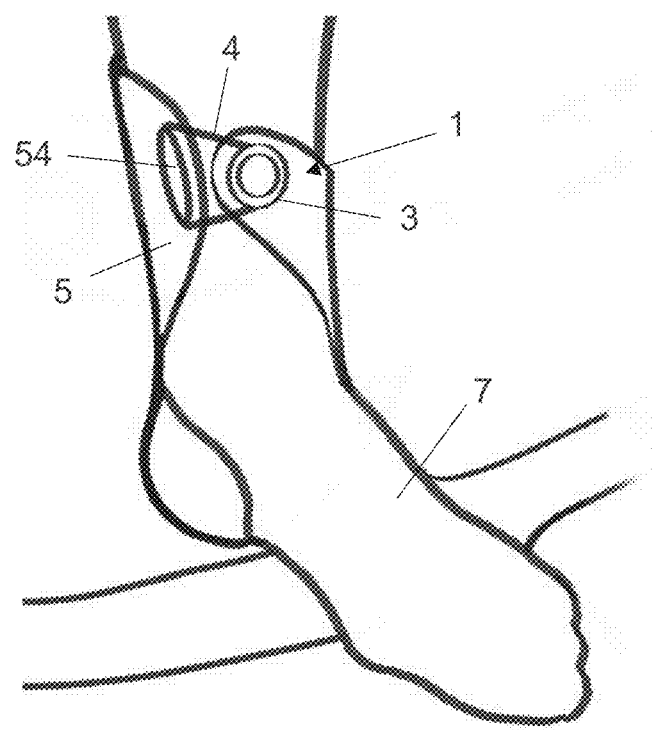
FIG. 34 shows a view of the exemplary embodiment as per FIG. 33 in the closed state.

FIGS. 33 and 34 show another exemplary embodiment of a medical aid 5 in the form of an ankle bandage, in the case of which the tension element 4, which is connected at one end to the fastener part 2 and at another end to the fastener part 3, can be laid around a diverting means 54, and, by mounting the fastener part 3 on the fastener part 2, a loop of the tension element 4 is thus formed, which can be tightened by rotating the fastener part 3 relative to the fastener part 2 in order to close and tighten the ankle bandage.

Figure 35:
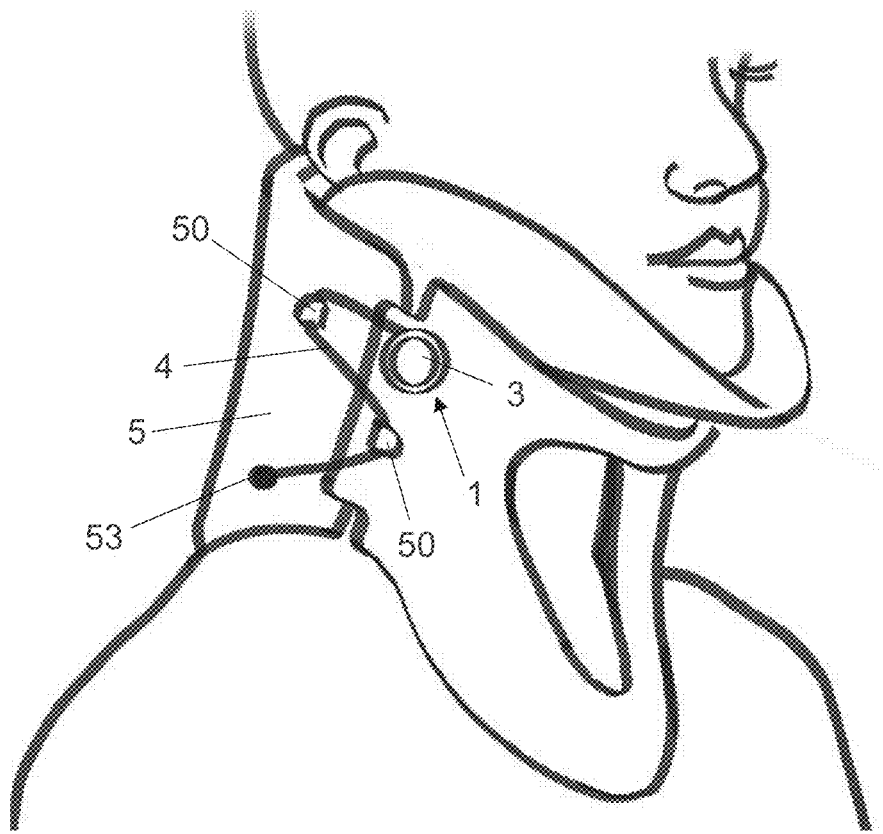
FIG. 35 shows a view of an exemplary embodiment of an application of the fastener device for closing and tightening another medical aid.

FIG. 35 shows an exemplary embodiment of a medical aid 5 in the form of an orthosis in the form of a neck brace, in the case of which the fastener device 1 serves for closing and tightening. A tension element 4 connected to the fastener part 3 can, proceeding from a fastening point 53, be laid around tightening hooks 50 and tightened by rotation of the fastener part 3 relative to the fastener part 2.

Figure 36:
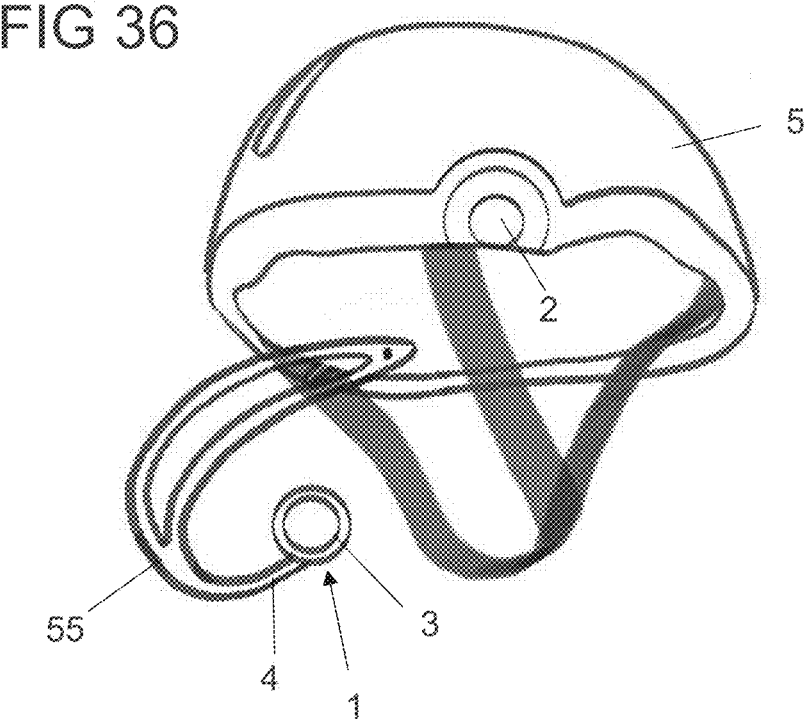
FIG. 36 shows a view of an exemplary embodiment of an application of the fastener device for closing and tightening a belt of a helmet.
Figure 37:
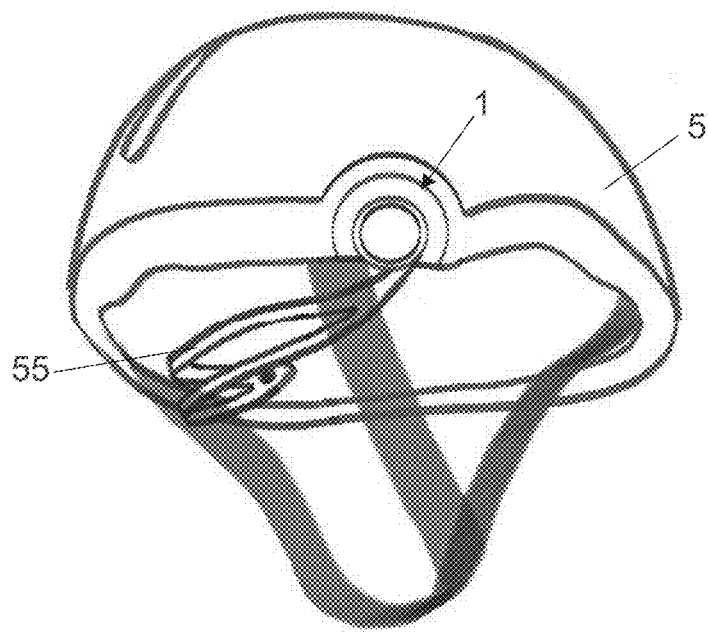
FIG. 37 shows a view of the exemplary embodiment as per FIG. 36 in the case of a closed belt.

FIGS. 36 and 37 show an exemplary embodiment of a helmet 5, for example of a bicycle helmet, in the case of which the fastener device 1 serves for closing and tightening a belt 55. The tension element 4 is a constituent part of the belt 55 and can be wound onto the fastener part 3, specifically the winding element 35 of the fastener part 3, in order to thereby tighten the belt 55.

Figure 38:
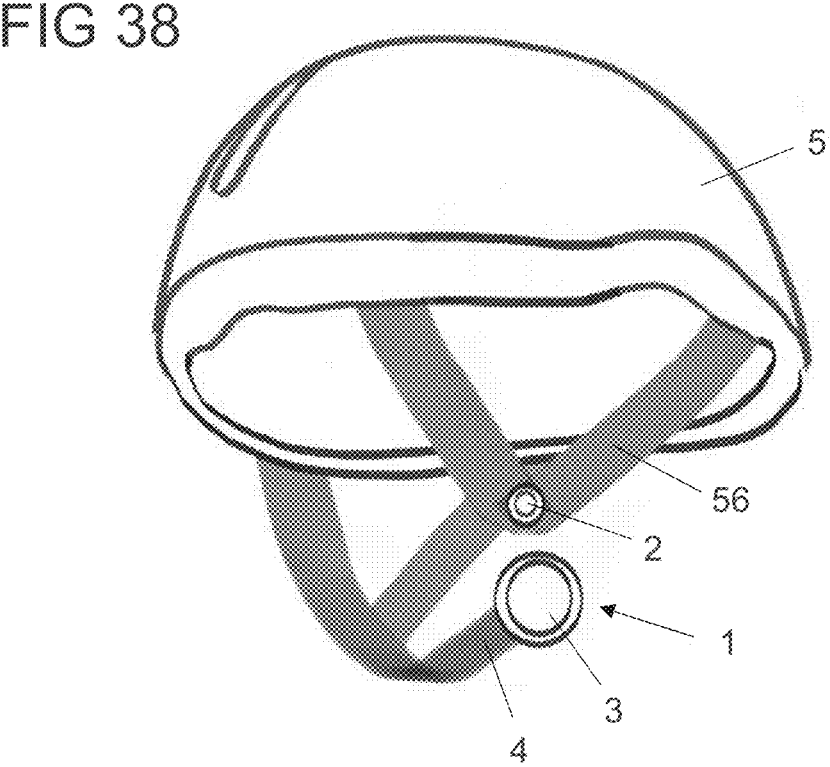
FIG. 38 shows a view of an exemplary embodiment of an application of the fastener device for closing and tightening a strap of a helmet.
Figure 39:
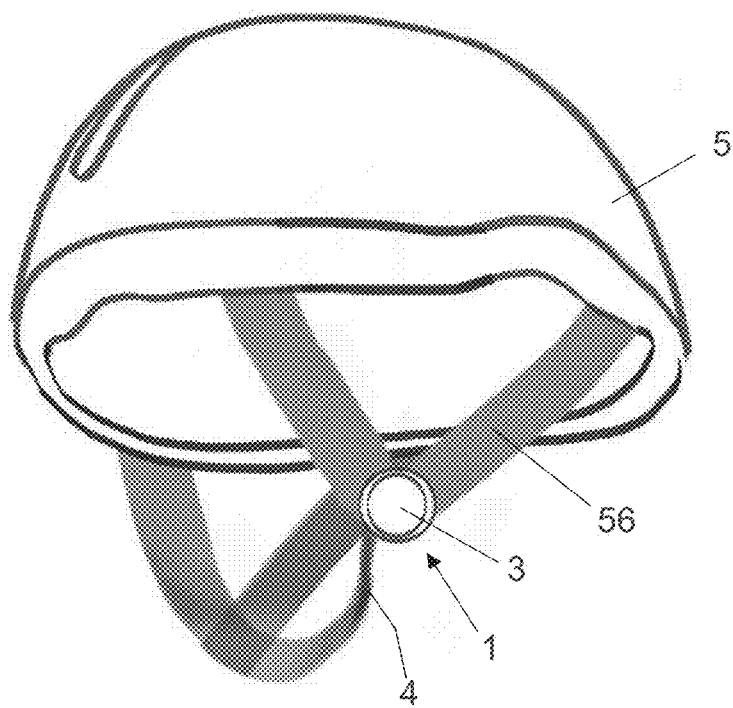
FIG. 39 shows a view of the exemplary embodiment as per FIG. 38, in the case of a closed strap.

In the exemplary embodiment as per FIGS. 38 and 39, the fastener device 1 serves for tightening a chin strap 56 of a helmet 5, for example a bicycle helmet. The fastener part 3 of the fastener device 1 may in this case be arranged on the fastener part 2 and rotated relative to the fastener part 2 in order to thereby tighten the strap 56.

Figure 40:
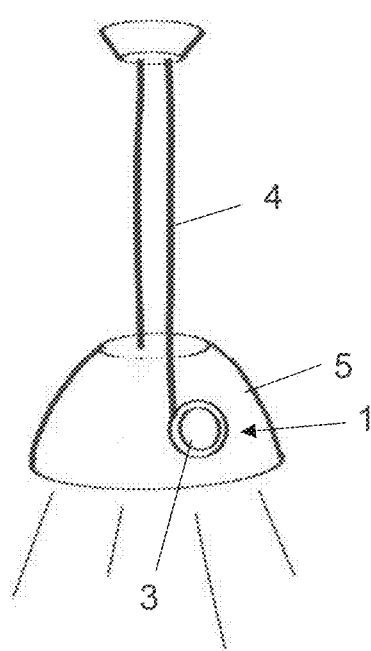
FIG. 40 shows a view of an exemplary embodiment of an application of the fastener device for hanging a lamp.

In the exemplary embodiment as per FIG. 40, the fastener device 1 serves for adjusting the height of an assembly 5 in the form of a lamp. The tension element 4 serves in this case for hanging the lamp. By rotating the fastener part 3 of the fastener device 1, the length of the tension element 4 can be varied, and thus the height of the lamp can be adjusted.

Figure 41:
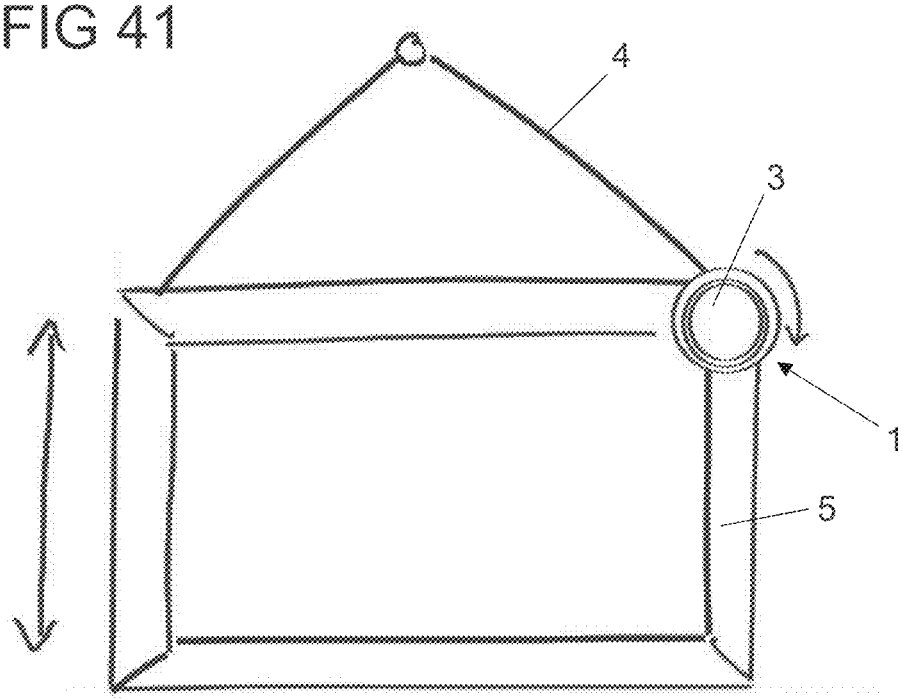
FIG. 41 shows a view of an exemplary embodiment of an application of the fastener device for hanging a picture.

In the exemplary embodiment as per FIG. 41, the fastener device 1 serves for hanging an assembly 5 in the form of a picture. By rotating the fastener part 3, the length of the tension element 4 can be changed, and thus the hanging of the picture can be adapted.

Figure 42:
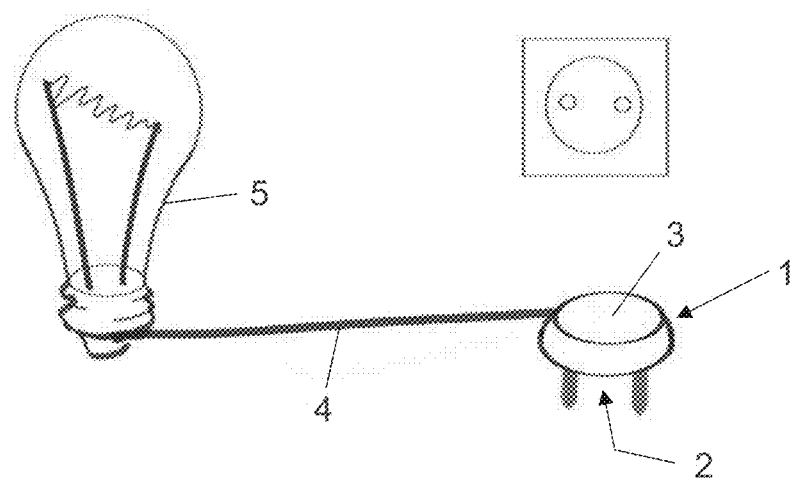
FIG. 42 shows a view of an exemplary embodiment of an application of the fastener device for connecting a lamp to a plug socket.
Figure 43:
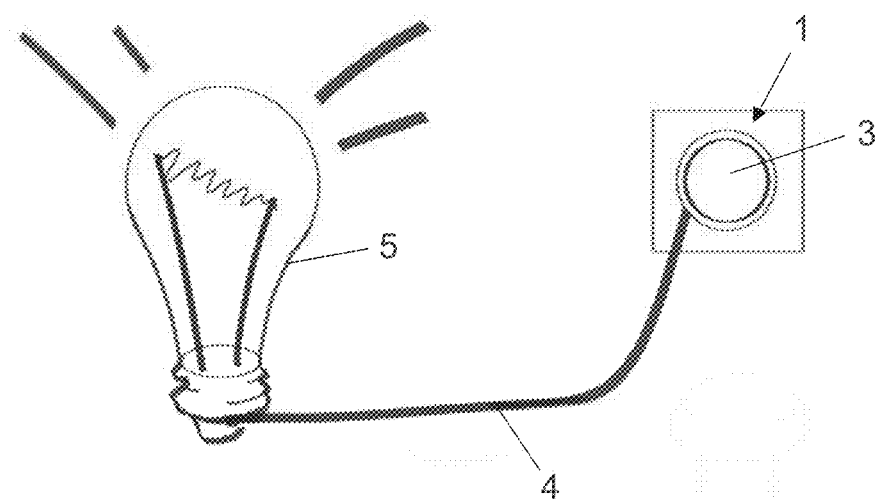
FIG. 43 shows a view of the exemplary embodiment as per FIG. 42, connected to a plug socket.
Figure 44:
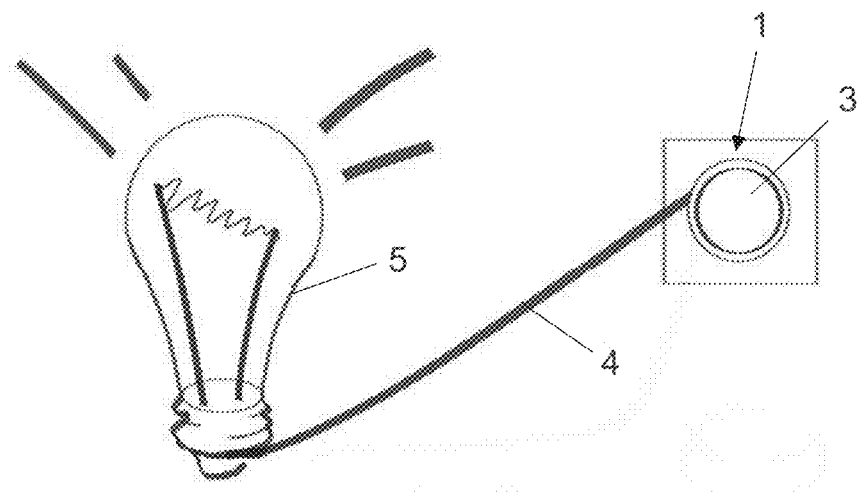
FIG. 44 shows a view of the exemplary embodiment as per FIG. 43, in the case of a tensioned cable.

In the exemplary embodiment illustrated in FIGS. 42 to 44, the fastener device 1 serves for the electrical connection of an assembly in the form of a lamp 5. For this purpose, the fastener part 2 is in the form of a plug. The fastener part 3 can be rotated relative to the fastener part 2 in the form of the plug in order to thereby change the freely extending length of the electrical cable that forms the tension element 4.

Figure 45:
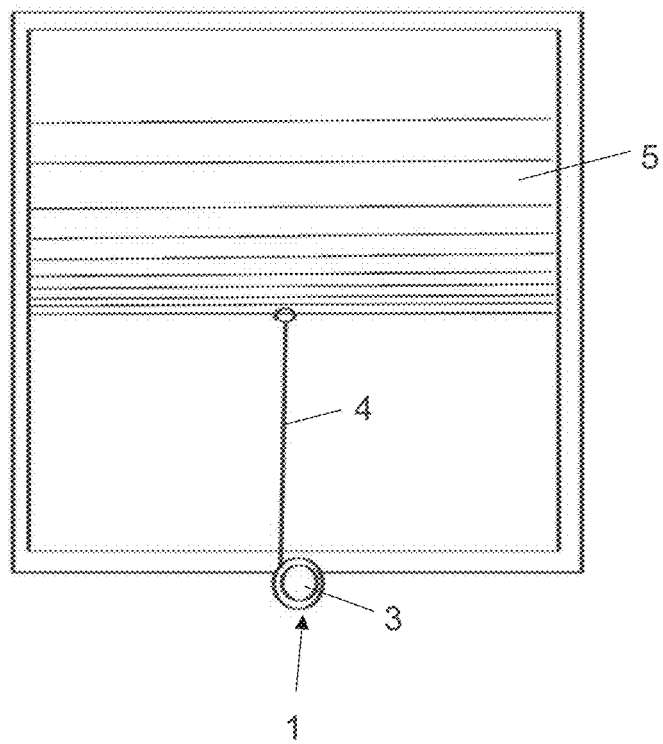
FIG. 45 shows a view of an exemplary embodiment of an application of the fastener device for tensioning a roller blind.

In the exemplary embodiment as per FIG. 45, the fastener device 1 serves for tensioning an assembly 5 in the form of a roller blind. The fastener part 3 is connected by means of the tension element 4 to the roller blind. By virtue of the fastener part 3 being arranged on the fastener part 2, which is arranged for example on a frame, and being rotated, the tension element 4 can be wound up and the roller blind thus adjusted.

Figure 46:
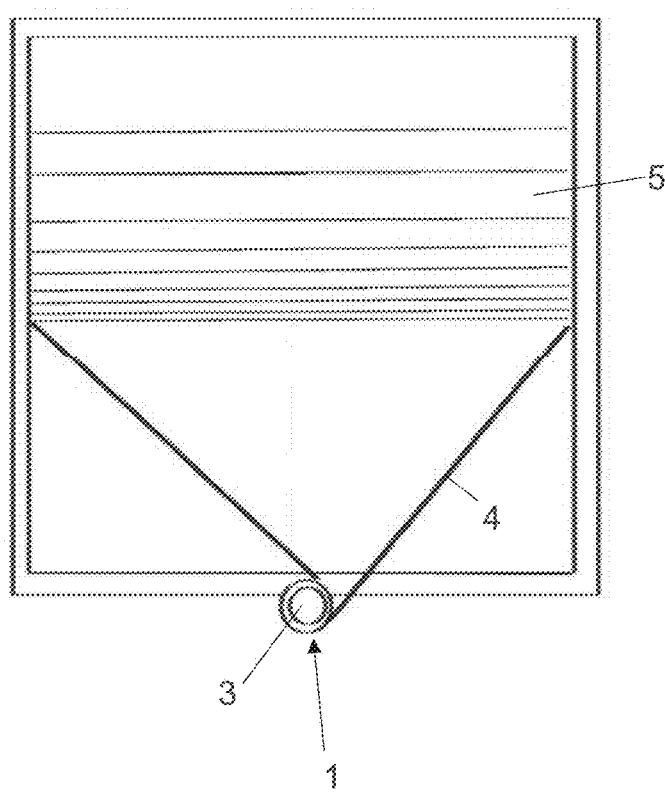
FIG. 46 shows a view of another exemplary embodiment of an application of the fastener device for tensioning a roller blind.

In the exemplary embodiment as per FIG. 46, by contrast to the exemplary embodiment as per FIG. 45, two ends of the tension element 4 are connected to the fastener part 3, such that, by rotation of the fastener part 3, the two ends of the tension element 4 can be simultaneously wound up onto the winding element 35 of the fastener part 3.

Figure 47:
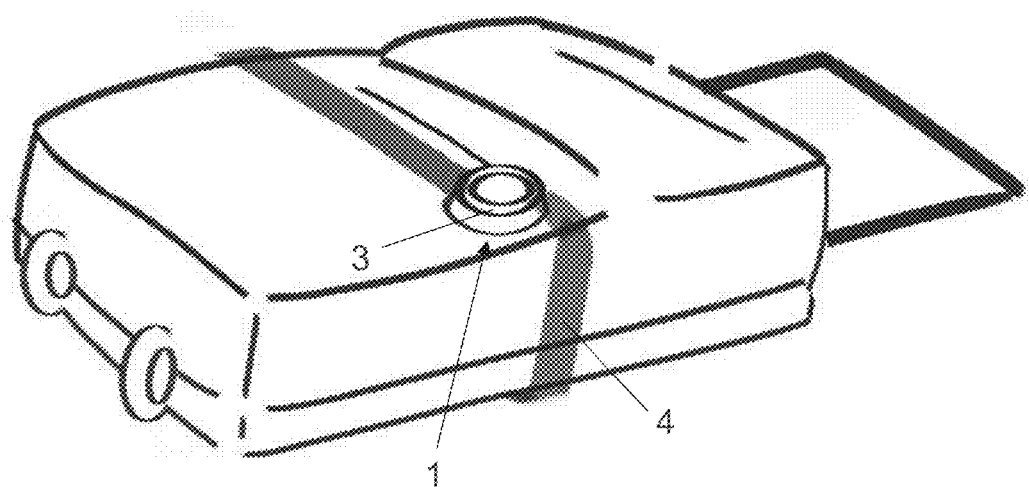
FIG. 47 shows a view of an exemplary embodiment of an application of the fastener device for tightening a strap on an article of luggage.

In an exemplary embodiment illustrated in FIG. 47, the fastener device 1 serves for tightening a tension element 4 in the form of a strap on an article of luggage.

Figure 48:
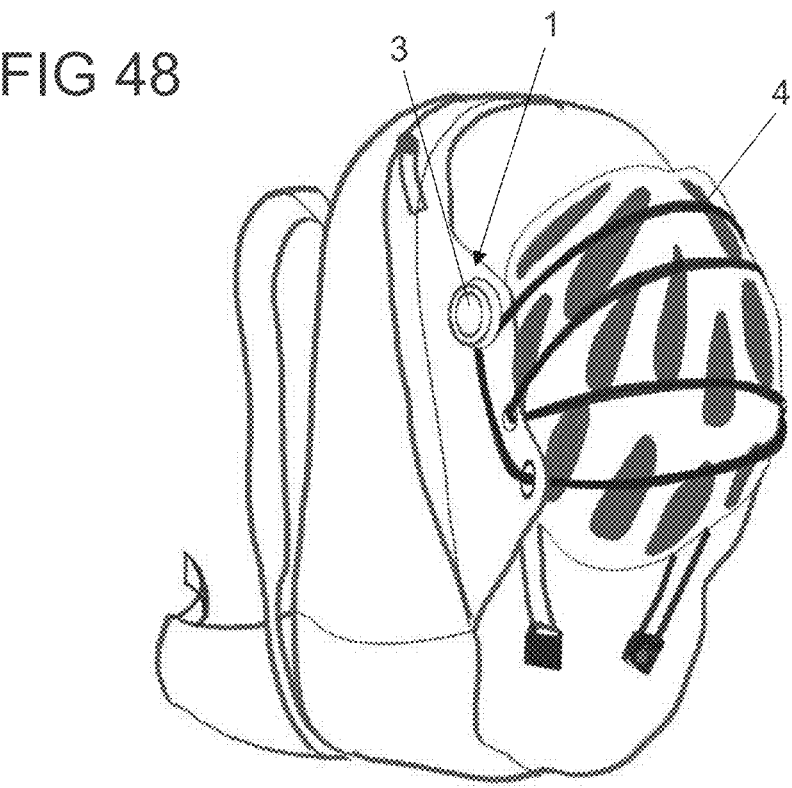
FIG. 48 shows a view of an exemplary embodiment of an application of the fastener device for tightening a tension element on a rucksack.

In an exemplary embodiment illustrated in FIG. 48, the fastener device 1 serves for tightening a tension element 4 in the form of a band or a cord on an article of luggage in the form of a rucksack, in order to thereby secure articles to the article of luggage.

Figure 49:
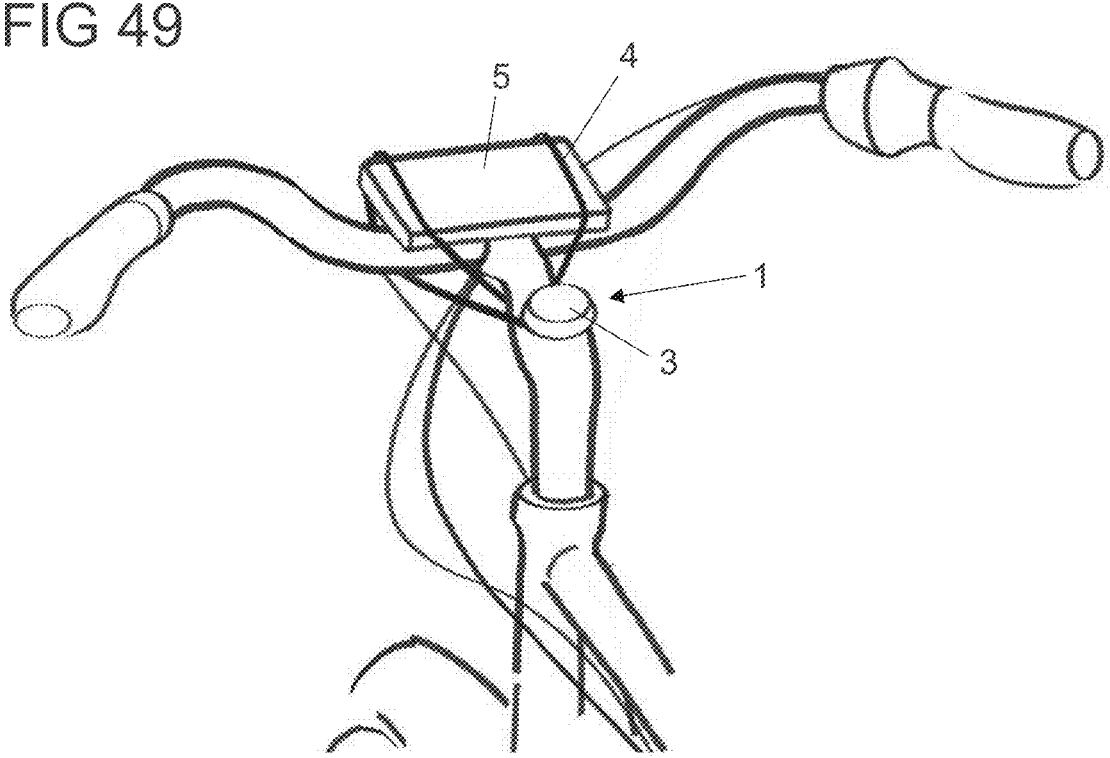
FIG. 49 shows a view of an exemplary embodiment of an application of the fastener device for securing an article on a bicycle.

In an exemplary embodiment illustrated in FIG. 49, the fastener device 1 serves for securing an article 5, for example a mobile telephone or the like, on a bicycle, in particular to a handlebar of a bicycle. The tension element 4 is in this case looped around the article 5 and can be tightened by being wound, in certain portions, onto the winding element 35 of the fastener part 3.

Figure 50:
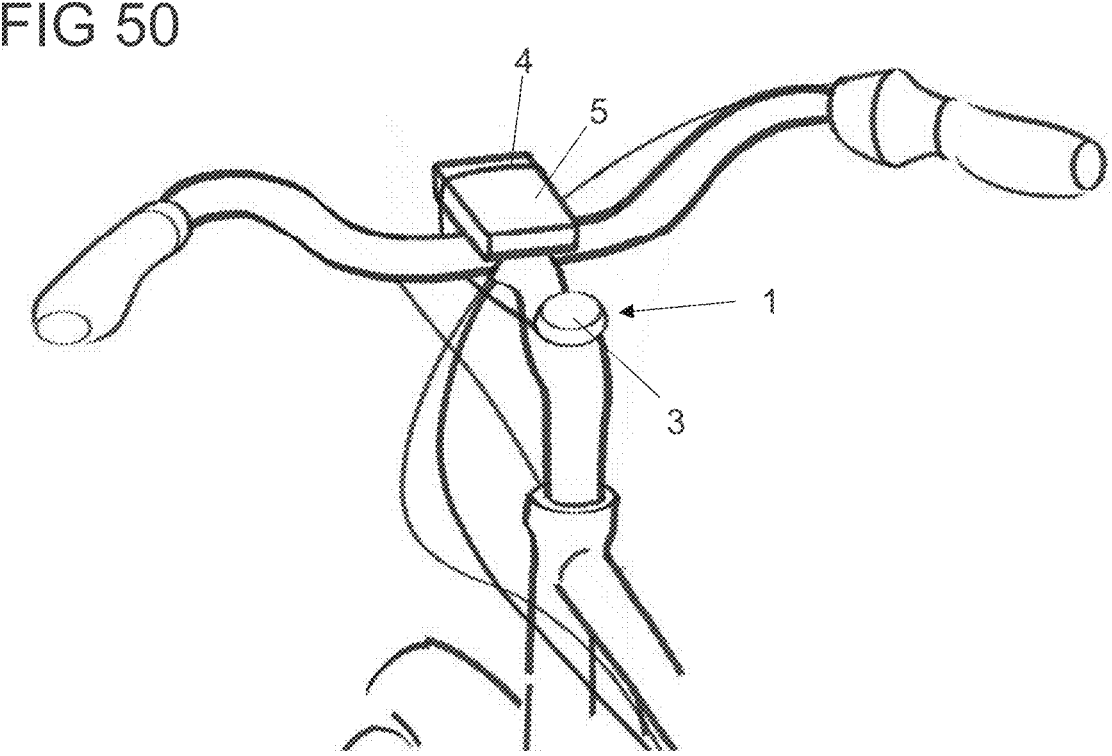
FIG. 50 shows a view of another exemplary embodiment of an application of the fastener device for securing an article on a bicycle.

FIG. 50 shows another exemplary embodiment with different winding of the tension element 4 in order to secure an article 5, for example a mobile telephone, on a bicycle.

Figure 51:
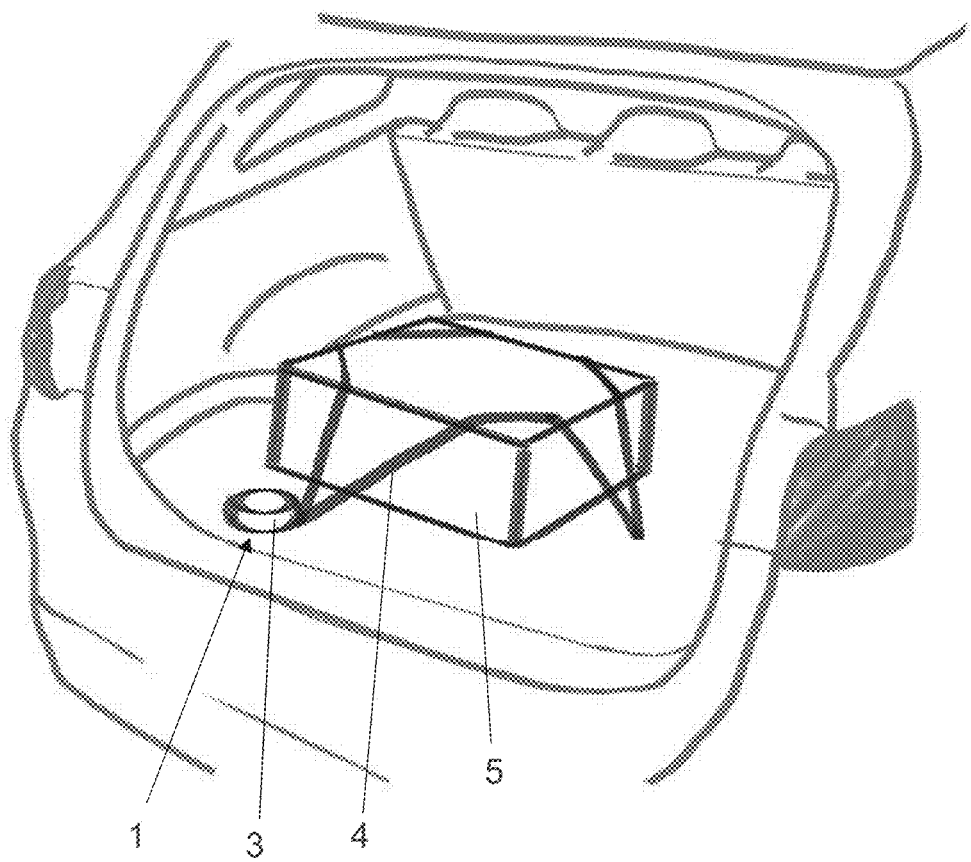
FIG. 51 shows a view of an exemplary embodiment of an application of the fastener device for fixing an article in the luggage compartment of a motor vehicle.

In an exemplary embodiment illustrated in FIG. 51, the fastener device 1 serves for securing an article, for example an article of luggage, in a load compartment of a vehicle. Here, the tension element 4 is laid across the article of luggage and thereby holds the article of luggage positionally fixed on the floor of the load compartment. By means of the fastener device 1, the tension element 4 can be tightened in order to secure the article of luggage.

FIGS. 52 to 56 show a further exemplary embodiment of a fastener device 1, in the case of which the fastener parts 2, 3 can be mounted on one another along a closing direction X and are held against one another in a closed position.

In the exemplary embodiment as per FIGS. 52 to 56, the tension element 4 is in the form of a strap which can be wound up onto a winding element 35 in the form of a sleeve of the fastener part 3. The fastener part 3 can be mounted onto the fastener part 2, which has for example a buckle, such that, by means of the fastener device 1, ends of the tension element 4 can be connected to one another and tightened relative to one another.

The fastener part 3 has an actuating element 34 with a hand lever formed integrally thereon, which hand lever can, by an engagement means 345, be placed in engagement with an engagement means 355 of the winding element 35, such that, by means of the actuating element 34, the winding element 35 can be rotated in a winding direction V relative to the fastener part 2.

As can be seen in particular from the sectional view in FIG. 56, the actuating element 34 has a peg 346 with an engagement opening 347, by means of which the actuating element 34 can be mounted in the closing direction X onto a cylinder portion 201 on a body 20 of the fastener part 2 in order to connect the fastener parts 2, 3 to one another.

For example owing to a spring preload between the actuating element 34 and the winding element 35, the engagement means 345, 355 are not in engagement with one another when the fastener parts 2, 3 are separated from one another. The winding element 35 can thus be freely rotated relative to the actuating element 34, such that the tension element 4 can for example be unwound from the winding element 35. For closing, the fastener part 3 is mounted onto the fastener part 3 such that the engagement opening 347 on the peg 346 of the actuating element 34 engages with the cylinder portion 201 of the fastener part 2, wherein the winding element 35 is supported on the body 20 of the fastener part 2 and, owing to magnetic attraction of magnet elements 23, 33 on the cylinder portion 201, on the one hand, and on the peg 346 of the actuating element 34, on the other hand (see FIG. 56), the actuating element 34 is pulled toward the winding element 35 and the engagement means 345, 355 thus engage with one another in positively locking fashion. In this way, an operative connection is produced between the actuating element 34 and the winding element 35, such that, when the fastener parts 2, 3 have been connected to one another, the actuating element 34 and the winding element 35 can be jointly rotated in order to thereby wind the tension element 4 onto the winding element 35 and thereby tighten the tension element 4.

At an end facing toward the body 20, the winding element 35 has a toothing means 351 in the form of a sawtooth-like toothing which, when the fastener parts 2, 3 have been connected to one another, engages with a toothing means 25 on the body 20. The engagement of the toothing means 25, 351 has the effect that the fastener parts 2, 3 can be rotated relative to one another in the winding direction V, in order to tighten the tension element 4 on the winding element 35, but not counter to the winding direction V.

To release the fastener device 1, the fastener parts 2, 3 can be pulled apart from one another counter to the closing direction X, such that the fastener parts 2, 3 are thereby separated from one another.

Figure 57A:
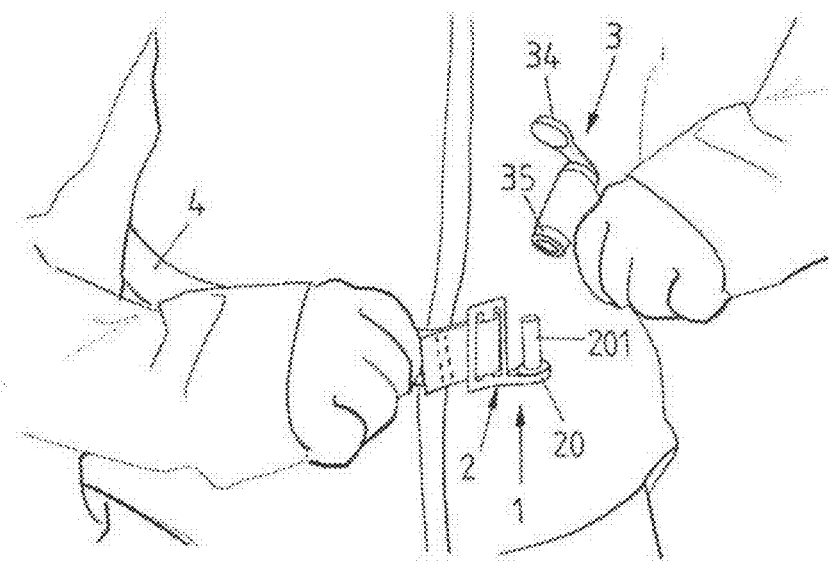
FIG. 57A shows a view of the fastener device for connecting two strap ends together.
Figure 57B:
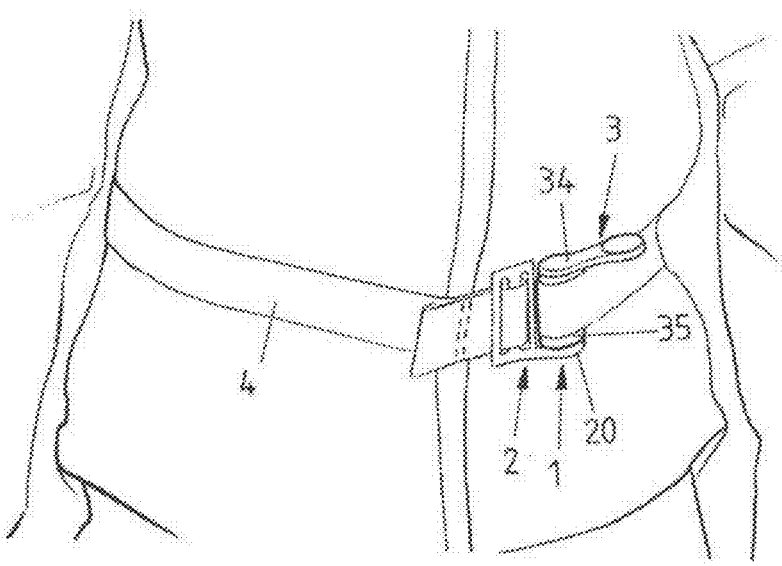
FIG. 57B shows a view of the fastener device in the closed state.

FIGS. 57A and 57B show the fastener device 1 in the case of separated fastener parts 2, 3 (FIG. 57A) and in the case of a closed fastener device 1 (FIG. 57B). The fastener device 1 may for example serve for tightening a strap in the form of a waistbelt.

Figure 58:
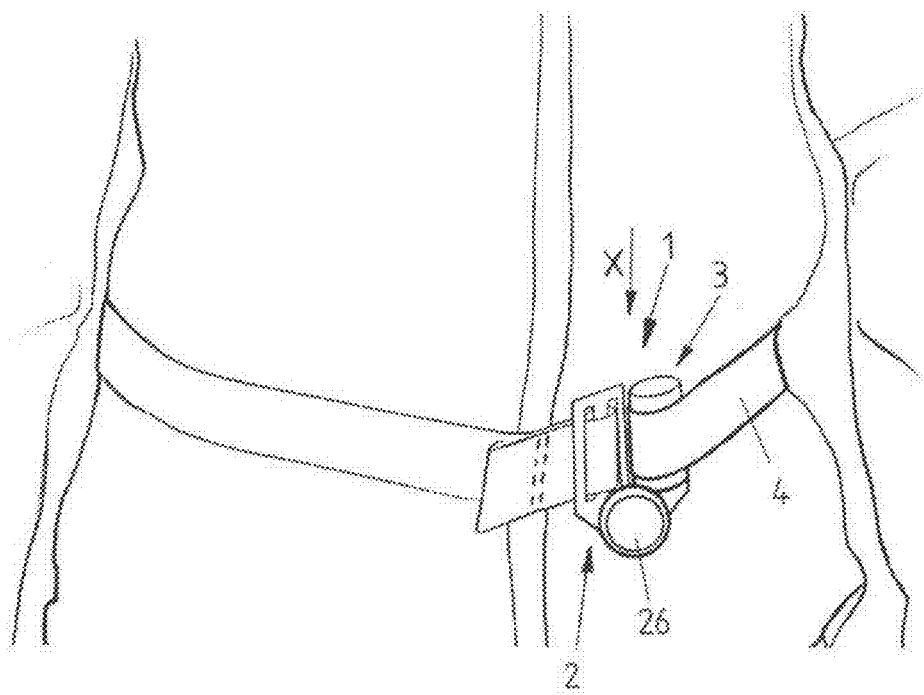
FIG. 58 shows a view of another exemplary embodiment of a fastener device.

FIG. 58 shows a further exemplary embodiment of a fastener device 1, in the case of which fastener parts 2, 3 can be mounted on one another in a closing direction X, in a manner similar to that described above.

Figure 52:
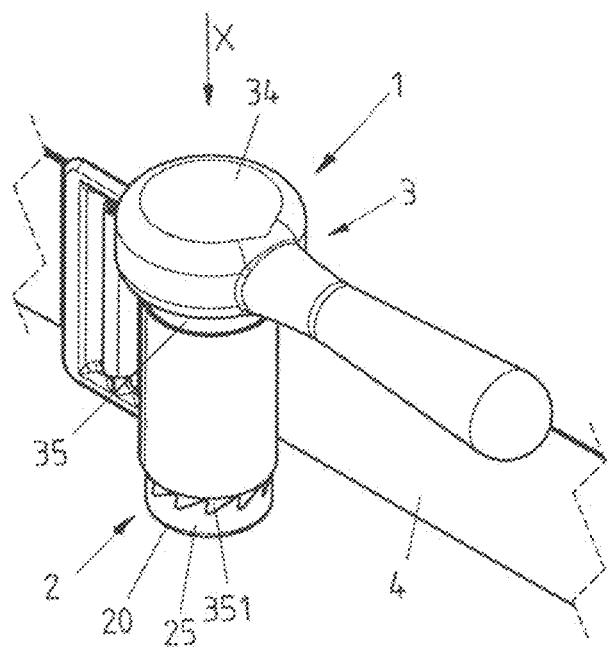
FIG. 52 shows a view of a further exemplary embodiment of a fastener device with a tension element in the form of a strap.
Figure 53:
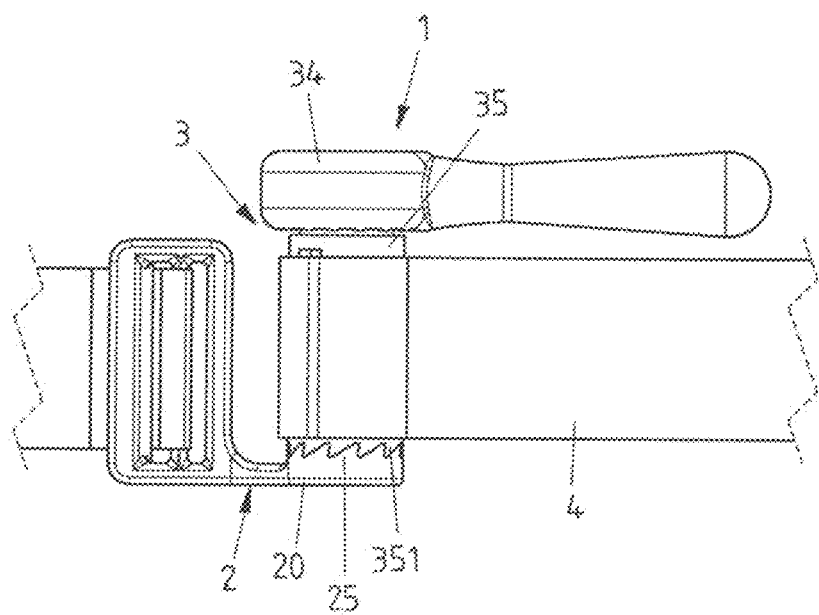
FIG. 53 shows a frontal view of the fastener device as per FIG. 52.

In the exemplary embodiment as per FIG. 58, a gearing 26 is provided on the fastener part 2, which gearing may for example be in the form of a bevel gearing or worm gearing and serves for rotating the fastener part 3 relative to the fastener part 2, in order to thereby tighten the tension element 4, via the toothing means 25 (which, when the fastener parts 2, 3 have been connected to one another, engages with the toothing means 351 of the fastener part 3, as can be seen for example from FIG. 52). In the exemplary embodiment as per FIG. 58, a rotation of the fastener parts 2, 3 relative to one another is thus realized via a gearing provided on the fastener part 2, which can for example be actuated manually.

FIGS. 59 to 62A, 62B show a further exemplary embodiment, in which precisely such a gearing 26 is implemented for the tightening of the winding element 35.

In the exemplary embodiment as per FIGS. 59 to 62A, 62B, the gearing 26 is designed as a tightening gearing, in the case of which a tightening lever 260 is mounted, so as to be pivotable about a pivot axis 265, on the body 20 of the fastener part 2 and is preloaded relative to the body 20 into a basic position (illustrated in FIGS. 62A, 62B) by means of a spring element 261.

In the exemplary embodiment, the fastener part 3 may be mounted with a winding element 35 onto a cylinder portion 201 of the body 20 and, in a connected position, engages by a toothing means 351 with an associated toothing means 25 of the body 20, as has also been described above. On the winding element 35, there is formed a tightening engagement means 356 in the form of a toothing which runs around the winding element 35 and serves for interacting with the gearing 26.

On the tightening lever 260 of the gearing 26, an engagement lever 262 is arranged so as to be pivotable about a pivot axis 263, which engagement lever serves for engaging into the tightening engagement means 356 of the winding element 35.

Figure 61A:
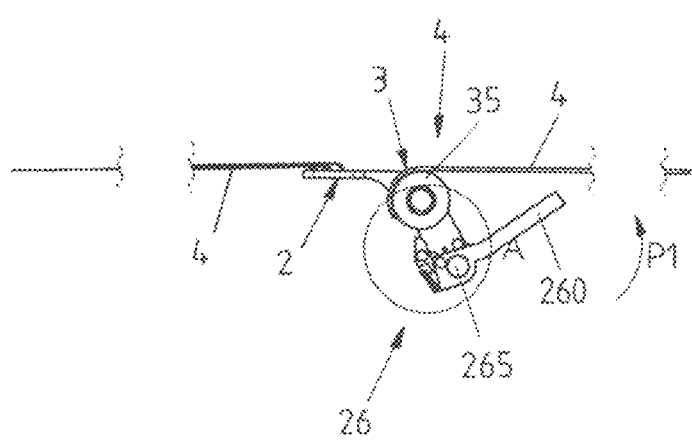
FIG. 61A shows a plan view of the fastener device, with a tightening lever in a position for the mounting of the fastener parts on one another.
Figure 61B:
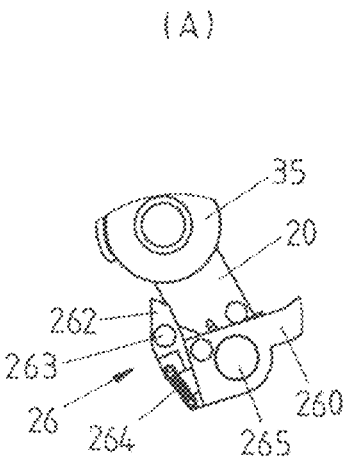
FIG. 61B shows an enlarged view in the detail A as per FIG. 61A.

For the mounting of the fastener parts 2, 3 on one another, the tightening lever 260 can, as illustrated in FIGS. 61A, 61B, be deflected out of the basic position in a pivoting direction P1 in order to thereby move the engagement lever 262 out of a region assumed by the winding element 35 when the fastener parts 2, 3 have been connected to one another. The fastener parts 2, 3 can thus be readily mounted on one another without being impeded by the gearing 26.

Figure 62A:
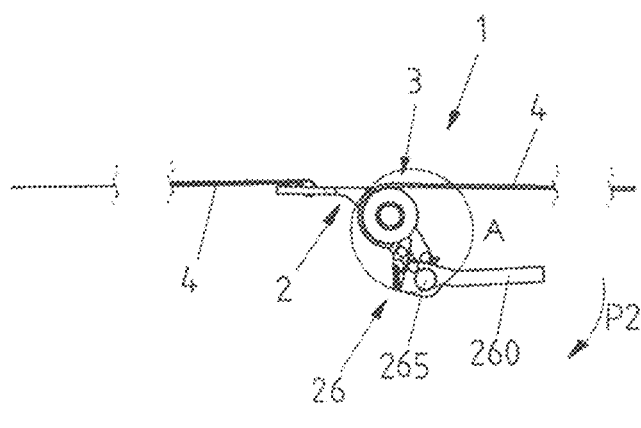
FIG. 62A shows a plan view of the fastener device during the tightening of a tension element.
Figure 62B:
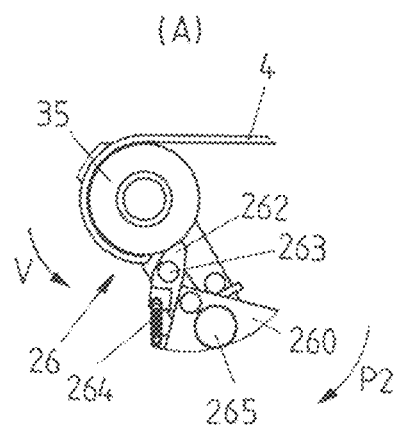
FIG. 62B shows an enlarged view in the detail A as per FIG. 62A.

If the tightening lever 260 is released again, the gearing 26 passes with its tightening lever 260 into the basic position as per FIGS. 62A, 62B, in which the engagement lever 262 engages with the tightening engagement means 256.

If the tightening lever 260 is now deflected in a pivoting direction P2, then the engagement lever 262 is moved jointly and rotates the winding element 35 in the winding direction V, such that the tension element 4 is wound onto the winding element 35. The tension element 4 is thus tightened.

Here, the tightening is performed in stepwise fashion. Owing to the spring element 261 and the spring preload provided by it, the tightening lever 260 is, after an actuation, automatically reset into the basic position, wherein the engagement lever 262 slides over the tightening engagement means 356, with elastic deflection of the spring element 264 by means of which the engagement lever 262 is elastically preloaded relative to the tightening lever 260. The tightening of the tension element 4 is thus performed in stepwise fashion by repeated actuation of the tightening lever 260.

By means of the spring element 264, a freewheel is also provided. The winding element 35 can also be rotated by hand in the winding direction V. Here, the engagement means 262 slides over the tightening engagement means 356 of the winding element 35 with elastic deflection of the spring element 264.

The concept on which the solution is based is not restricted to the embodiments highlighted above, but may in principle also be realized in a fundamentally different form.

A fastener device of the type described here may be used in a very wide variety of applications. In the case of a fastening device of the described type, a tightening device is combined with fastener parts which are separable from one another, which permits a connection of assemblies with simultaneous tightening of the assemblies relative to one another.

LIST OF REFERENCE DESIGNATIONS

1 Fastener device
2 Fastener part
20 Main body
200 Opening
201 Cylinder portion
202 Detent recess (detent groove)
23 Magnet element
25 Toothing means
250 Run-on bevel
251 Tooth flank
252 Projection element 253 Detent lug
26 Gearing means
260 Tightening lever
261 Spring element
262 Engagement lever
263 Pivot axis
264 Spring element
265 Pivot axis
3 Fastener part
32 Cover element
320 Body
321 Opening
322 Receiving space
33 Magnet element
34 Actuating element
340 Base surface
341 Cylinder projection
342 Holding element
343 Spring element
344 Side wall
345 Engagement means
346 Peg
347 Opening
35 Winding element
350 Opening
351 Toothing means
352 Annular collar
353 Channel
354 Annular collar
355 Engagement means
356 Tightening engagement means
36 Detent means
37 Operating element
370 Body
371 Annular collar
372 Unlocking opening
373 Opening
374 Spring element
38 Engagement element
380 Body
381 Annular collar
382 Receiving opening
383 Opening
384 Spring element
385 Detent element
386 Spring element
387 Opening
4 Tension element
5 Assembly
50 Tightening hook
51 Sole
52 Trouser leg
53 Securing point
54 Diverting means
55 Belt
56 Strap
6 Hand
7 Foot
B Loading direction
D Actuating direction
L Release direction
P1, P2 Pivoting direction
V Winding direction
X Closing direction

The invention claimed is:

1. A fastener device, having a first fastener part and a second fastener part which can be mounted on one another along a closing direction, are held against one another in a closed position, and are releasable from one another in order to open the fastener device,
wherein the second fastener part has an actuating element with a first engagement means and has a winding element which is arranged on the actuating element and which is rotatable in a winding direction in order to wind up a tension element and which has a second engagement means, wherein the first engagement means and the second engagement means, in a release position, are not in engagement with one another, such that the winding element is rotatable relative to the actuating element, and can be placed in engagement with one another, such that, in an engagement position, the winding element is rotatable by means of the actuating element, wherein the first fastener part has a first toothing means and the second fastener part has a second toothing means, and the first toothing means and the second toothing means, in the closed position of the fastener device, are in engagement with one another such that the first fastener part and the second fastener part are held in positive locking fashion relative to one another along the winding direction, wherein the first fastener part and the second fastener part each have at least one magnet element for providing a magnetic attraction force during the mounting of the fastener parts on one another.

2. The fastener device as claimed in claim 1, wherein, in the closed position of the fastener device, the first engagement means and the second engagement means are in the engagement position.

3. The fastener device as claimed in claim 1, wherein, in the engagement position of the first engagement means and the second engagement means, in the event of a rotation of the actuating element in the winding direction, the winding element is moved together with the actuating element in the winding direction, but the actuating element is rotatable relative to the winding element counter to the winding direction.

4. The fastener device as claimed in claim 1, wherein the first engagement means and/or the second engagement means have a sawtooth-like toothing extending around the closing direction.

5. The fastener device as claimed in claim 1, wherein the actuating element and the winding element are adjustable relative to one another axially along the closing direction for the movement of the engagement means between the release position and the engagement position.

6. The fastener device as claimed in claim 1, wherein the actuating element and the winding element are spring-preloaded relative to one another in the direction of the release position.

7. The fastener device as claimed in claim 1, wherein the second toothing means is arranged on the actuating element or on the winding element.

8. The fastener device as claimed in claim 1, wherein the second fastener part, in the closed position, is rotatable relative to the first fastener part in the winding direction, but a rotation of the second fastener part relative to the first fastener part counter to the winding direction is locked.

9. The fastener device as claimed in claim 1, wherein the first fastener part has a cylinder portion which, in the closed position, engages into the central opening of the winding element for the rotatable mounting of the winding element on the first fastener part.

10. The fastener device as claimed in claim 1, wherein the first fastener part and the second fastener part are, in the closed position, mechanically detained together in order to hold the fastener parts against one another counter to the closing direction.

11. A fastener device, having a first fastener part and a second fastener part which can be mounted on one another along a closing direction, are held against one another in a closed position, and are releasable from one another in order to open the fastener device, wherein the second fastener part has an actuating element with a first engagement means and has a winding element which is arranged on the actuating element and which is rotatable in a winding direction in order to wind up a tension element and which has a second engagement means, wherein the first engagement means and the second engagement means, in a release position, are not in engagement with one another, such that the winding element is rotatable relative to the actuating element, and can be placed in engagement with one another, such that, in an engagement position, the winding element is rotatable by means of the actuating element, wherein the first fastener part has a first toothing means and the second fastener part has a second toothing means, and the first toothing means and the second toothing means, in the closed position of the fastener device, are in engagement with one another such that the first fastener part and the second fastener part are held in positive locking fashion relative to one another along the winding direction, wherein the first fastener part and the second fastener part are, in the closed position, mechanically detained together in order to hold the fastener parts against one another counter to the closing direction, wherein one of the first and second fastener parts has a detent means with at least one movable detent element which, in a detained position, engages into a detent recess of the other fastener part of the first and second fastener parts and thus holds the first and second fastener parts against one another counter to the closing direction.

12. The fastener device as claimed in claim 11, wherein the detent means moves automatically into the detained position during the mounting of the fastener parts.

13. The fastener device as claimed in claim 11, wherein the at least one movable detent element is spring-preloaded in the direction of the detained position.

14. The fastener device as claimed in claim 11, wherein the detent means has an engagement element which, in the closed position, engages into the other fastener part of the first and second fastener parts and on which the at least one movable detent element is arranged.

15. The fastener device as claimed in claim 14, wherein the detent means is arranged on the second fastener part and the engagement element is adjustable axially along the closing direction relative to the actuating element.

16. The fastener device as claimed in claim 15, wherein the engagement element is spring-preloaded relative to the actuating element along the closing direction.

17. The fastener device as claimed in claim 14, wherein the detent means has an operating element which is arranged adjustably on the engagement element and which can be actuated in order to disengage the at least one detent element from the detent recess.

18. The fastener device as claimed in claim 17, wherein the operating element is guided axially along the closing direction on the engagement element.

* * * * *